US012393977B2

(12) United States Patent
Allen et al.

(10) Patent No.: US 12,393,977 B2
(45) Date of Patent: *Aug. 19, 2025

(54) USER INTERFACE TO AUGMENT AN IMAGE USING GEOLOCATION

(71) Applicant: Snap Inc., Santa Monica, CA (US)

(72) Inventors: Nicholas Richard Allen, Venice, CA (US); Sheldon Chang, Venice, CA (US); Timothy Michael Sehn, Marina Del Rey, CA (US); William Wu, Marina del Rey, CA (US)

(73) Assignee: Snap Inc., Santa Monica, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 17/567,624

(22) Filed: Jan. 3, 2022

(65) Prior Publication Data

US 2022/0237691 A1 Jul. 28, 2022

Related U.S. Application Data

(63) Continuation of application No. 14/494,226, filed on Sep. 23, 2014, now Pat. No. 11,216,869.

(51) Int. Cl.
*G06Q 30/08* (2012.01)

(52) U.S. Cl.
CPC .................................... *G06Q 30/08* (2013.01)

(58) Field of Classification Search
CPC ...................................................... G06Q 30/08
See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |
| 4,654,795 | A | 3/1987 | Shimoni |
| 4,975,690 | A | 12/1990 | Torres |
| 5,072,412 | A | 12/1991 | Henderson, Jr. et al. |
| 5,493,692 | A | 2/1996 | Theimer et al. |
| 5,539,395 | A | 7/1996 | Buss et al. |
| 5,713,073 | A | 1/1998 | Warsta |
| 5,754,939 | A | 5/1998 | Herz et al. |
| 5,855,008 | A | 12/1998 | Goldhaber et al. |
| 5,883,639 | A | 3/1999 | Walton et al. |
| 5,999,932 | A | 12/1999 | Paul |

(Continued)

FOREIGN PATENT DOCUMENTS

| | | | |
|---|---|---|---|
| CA | 2887596 | A1 | 7/2015 |
| CA | 2894332 | C | 8/2018 |

(Continued)

OTHER PUBLICATIONS

US 10,484,394 B2, 11/2019, Allen et al. (withdrawn)

(Continued)

*Primary Examiner* — Sanjiv Shah
*Assistant Examiner* — Ranjit P Doraiswamy
(74) *Attorney, Agent, or Firm* — Schwegman Lundberg & Woessner, P.A.

(57) ABSTRACT

A system and method for a media filter publication application are described. The media filter publication application receives a content item and a selected geolocation, generates a media filter based on the content item and the selected geolocation, and supplies the media filter to a client device located at the selected geolocation.

18 Claims, 30 Drawing Sheets

(56) References Cited

U.S. PATENT DOCUMENTS

| | | | |
|---|---|---|---|
| 6,012,098 | A | 1/2000 | Bayeh et al. |
| 6,014,090 | A | 1/2000 | Rosen et al. |
| 6,029,141 | A | 2/2000 | Bezos et al. |
| 6,038,295 | A | 3/2000 | Mattes |
| 6,049,711 | A | 4/2000 | Yehezkel et al. |
| 6,075,535 | A | 6/2000 | Fitzhugh et al. |
| 6,154,764 | A | 11/2000 | Nitta et al. |
| 6,158,044 | A | 12/2000 | Tibbetts |
| 6,167,435 | A | 12/2000 | Druckenmiller et al. |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,285,381 | B1 | 9/2001 | Sawano et al. |
| 6,285,987 | B1 | 9/2001 | Roth et al. |
| 6,290,504 | B1 | 9/2001 | Benitz et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,363,380 | B1 | 3/2002 | Dimitrova |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,586 | B2 | 11/2002 | Ogilvie et al. |
| 6,487,601 | B1 | 11/2002 | Hubacher et al. |
| 6,499,016 | B1 | 12/2002 | Anderson |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,684,293 | B1 | 1/2004 | Backman et al. |
| 6,698,020 | B1 | 2/2004 | Zigmond et al. |
| 6,700,506 | B1 | 3/2004 | Winkler |
| 6,701,347 | B1 | 3/2004 | Ogilvie |
| 6,711,608 | B1 | 3/2004 | Ogilvie |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,898,626 | B2 | 5/2005 | Ohashi |
| 6,922,634 | B2 | 7/2005 | Odakura et al. |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,004,394 | B2 | 2/2006 | Kim |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,091 | B1 | 10/2006 | Khoo et al. |
| 7,124,164 | B1 | 10/2006 | Chemtob |
| 7,142,823 | B1 | 11/2006 | Logue et al. |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B1 | 6/2007 | Yoakum et al. |
| 7,237,002 | B1 | 6/2007 | Estrada et al. |
| 7,240,025 | B2 | 7/2007 | Stone et al. |
| 7,240,089 | B2 | 7/2007 | Boudreau |
| 7,243,163 | B1 | 7/2007 | Friend et al. |
| 7,254,585 | B2 | 8/2007 | Frieden et al. |
| 7,269,426 | B2 | 9/2007 | Kokkonen et al. |
| 7,278,168 | B1 | 10/2007 | Chaudhury et al. |
| 7,280,658 | B2 | 10/2007 | Amini et al. |
| 7,315,823 | B2 | 1/2008 | Brondrup |
| 7,349,768 | B2 | 3/2008 | Bruce et al. |
| 7,356,564 | B2 | 4/2008 | Hartselle et al. |
| 7,376,715 | B2 | 5/2008 | Cunningham et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,478,402 | B2 | 1/2009 | Christensen et al. |
| 7,496,347 | B2 | 2/2009 | Puranik |
| 7,496,567 | B1 | 2/2009 | Steichen |
| 7,508,419 | B2 | 3/2009 | Toyama et al. |
| 7,512,649 | B2 | 3/2009 | Faybishenko et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,571,244 | B2 | 8/2009 | Costanzo et al. |
| 7,607,096 | B2 | 10/2009 | Oreizy et al. |
| 7,630,724 | B2 | 12/2009 | Beyer, Jr. et al. |
| 7,639,943 | B1 | 12/2009 | Kalajan |
| 7,650,231 | B2 | 1/2010 | Gadler |
| 7,668,537 | B2 | 2/2010 | DeVries |
| 7,703,140 | B2 | 4/2010 | Nath et al. |
| 7,770,137 | B2 | 8/2010 | Forbes et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 7,856,449 | B1 | 12/2010 | Martino et al. |
| 7,912,896 | B2 | 3/2011 | Wolovitz et al. |
| 7,934,156 | B2 | 4/2011 | Forstall et al. |
| 7,991,638 | B1 | 8/2011 | House et al. |
| 8,001,204 | B2 | 8/2011 | Burtner et al. |
| 8,014,762 | B2 | 9/2011 | Chmaytelli et al. |
| 8,032,586 | B2 | 10/2011 | Challenger et al. |
| 8,063,797 | B1 | 11/2011 | Sonnabend et al. |
| 8,073,947 | B1 | 12/2011 | Yeh et al. |
| 8,082,255 | B1 | 12/2011 | Carlson, Jr. et al. |
| 8,090,351 | B2 | 1/2012 | Klein |
| 8,098,904 | B2 | 1/2012 | Ioffe et al. |
| 8,099,109 | B2 | 1/2012 | Altman et al. |
| 8,112,716 | B2 | 2/2012 | Kobayashi |
| 8,127,035 | B1 | 2/2012 | Hood et al. |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,161,115 | B2 | 4/2012 | Yamamoto |
| 8,161,417 | B1 | 4/2012 | Lee |
| 8,170,957 | B2 | 5/2012 | Richard |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |
| 8,229,473 | B1 | 7/2012 | De La Rue |
| 8,234,350 | B1 | 7/2012 | Gu et al. |
| 8,238,947 | B2 | 8/2012 | Lottin et al. |
| 8,244,593 | B2 | 8/2012 | Klinger et al. |
| 8,276,092 | B1 | 9/2012 | Narayanan et al. |
| 8,279,319 | B2 | 10/2012 | Date |
| 8,280,406 | B2 | 10/2012 | Ziskind et al. |
| 8,285,199 | B2 | 10/2012 | Hsu et al. |
| 8,287,380 | B2 | 10/2012 | Nguyen et al. |
| 8,290,513 | B2 | 10/2012 | Forstall et al. |
| 8,301,159 | B2 | 10/2012 | Hamynen et al. |
| 8,306,922 | B1 | 11/2012 | Kunal et al. |
| 8,312,086 | B2 | 11/2012 | Velusamy et al. |
| 8,312,097 | B1 | 11/2012 | Siegel et al. |
| 8,312,380 | B2 | 11/2012 | Churchill et al. |

(56) References Cited

U.S. PATENT DOCUMENTS

| | | | |
|---|---|---|---|
| 8,326,315 | B2 | 12/2012 | Phillips et al. |
| 8,326,327 | B2 | 12/2012 | Hymel et al. |
| 8,332,402 | B2 | 12/2012 | Forstall et al. |
| 8,332,475 | B2 | 12/2012 | Rosen et al. |
| 8,352,494 | B1 | 1/2013 | Badoiu |
| 8,352,546 | B1 | 1/2013 | Dollard |
| 8,369,866 | B2 | 2/2013 | Ashley, Jr. et al. |
| 8,379,130 | B2 | 2/2013 | Forutanpour et al. |
| 8,385,950 | B1 | 2/2013 | Wagner et al. |
| 8,402,097 | B2 | 3/2013 | Szeto |
| 8,405,773 | B2 | 3/2013 | Hayashi et al. |
| 8,418,067 | B2 | 4/2013 | Cheng et al. |
| 8,423,409 | B2 | 4/2013 | Rao |
| 8,428,453 | B1 | 4/2013 | Spiegel et al. |
| 8,433,296 | B2 | 4/2013 | Hardin et al. |
| 8,471,914 | B2 | 6/2013 | Sakiyama et al. |
| 8,472,935 | B1 | 6/2013 | Fujisaki |
| 8,494,481 | B1 | 7/2013 | Bacco et al. |
| 8,510,383 | B2 | 8/2013 | Hurley et al. |
| 8,527,345 | B2 | 9/2013 | Rothschild et al. |
| 8,542,685 | B2 | 9/2013 | Forbes, Jr. et al. |
| 8,548,735 | B2 | 10/2013 | Forstall et al. |
| 8,554,627 | B2 | 10/2013 | Svendsen et al. |
| 8,559,980 | B2 | 10/2013 | Pujol |
| 8,560,612 | B2 | 10/2013 | Kilmer et al. |
| 8,570,907 | B2 | 10/2013 | Garcia, Jr. et al. |
| 8,594,680 | B2 | 11/2013 | Ledlie et al. |
| 8,606,792 | B1 | 12/2013 | Jackson et al. |
| 8,613,089 | B1 | 12/2013 | Holloway et al. |
| 8,626,187 | B2 | 1/2014 | Grosman et al. |
| 8,639,648 | B2 | 1/2014 | Koponen et al. |
| 8,649,803 | B1 | 2/2014 | Hamill |
| 8,660,358 | B1 | 2/2014 | Bergboer et al. |
| 8,660,369 | B2 | 2/2014 | Llano et al. |
| 8,660,793 | B2 | 2/2014 | Ngo et al. |
| 8,666,152 | B1 | 3/2014 | Ramanathan et al. |
| 8,681,178 | B1 | 3/2014 | Tseng |
| 8,682,350 | B2 | 3/2014 | Altman et al. |
| 8,686,962 | B2 | 4/2014 | Christie |
| 8,687,021 | B2 | 4/2014 | Bathiche et al. |
| 8,688,519 | B1 | 4/2014 | Lin et al. |
| 8,694,026 | B2 | 4/2014 | Forstall et al. |
| 8,718,333 | B2 | 5/2014 | Wolf et al. |
| 8,724,622 | B2 | 5/2014 | Rojas |
| 8,732,168 | B2 | 5/2014 | Johnson |
| 8,744,523 | B2 | 6/2014 | Fan et al. |
| 8,745,132 | B2 | 6/2014 | Obradovich |
| 8,751,310 | B2 | 6/2014 | Van Datta et al. |
| 8,761,800 | B2 | 6/2014 | Kuwahara |
| 8,762,201 | B1 | 6/2014 | Noonan |
| 8,768,876 | B2 | 7/2014 | Shim et al. |
| 8,775,401 | B2 | 7/2014 | Zhou et al. |
| 8,775,972 | B2 | 7/2014 | Spiegel |
| 8,788,680 | B1 | 7/2014 | Naik |
| 8,788,947 | B2 | 7/2014 | Putz et al. |
| 8,790,187 | B2 | 7/2014 | Walker et al. |
| 8,797,415 | B2 | 8/2014 | Arnold |
| 8,798,646 | B1 | 8/2014 | Wang et al. |
| 8,812,024 | B2 | 8/2014 | Obermeyer et al. |
| 8,812,027 | B2 | 8/2014 | Obermeyer et al. |
| 8,838,140 | B1 | 9/2014 | Ledet |
| 8,856,349 | B2 | 10/2014 | Jain et al. |
| 8,868,223 | B1 | 10/2014 | Sharifi |
| 8,874,677 | B2 | 10/2014 | Rosen et al. |
| 8,886,227 | B2 | 11/2014 | Schmidt et al. |
| 8,909,679 | B2 | 12/2014 | Root et al. |
| 8,909,714 | B2 | 12/2014 | Agarwal et al. |
| 8,909,725 | B1 | 12/2014 | Sehn |
| 8,914,752 | B1 | 12/2014 | Spiegel |
| 8,923,823 | B1 | 12/2014 | Wilde |
| 8,924,144 | B2 | 12/2014 | Forstall et al. |
| 8,925,106 | B1 | 12/2014 | Steiner et al. |
| 8,943,140 | B1 | 1/2015 | Kothari |
| 8,965,271 | B1 | 2/2015 | Vucurevich |
| 8,972,357 | B2 | 3/2015 | Shim et al. |
| 8,977,296 | B1 | 3/2015 | Briggs et al. |
| 8,995,433 | B2 | 3/2015 | Rojas |
| 9,015,069 | B2 | 4/2015 | Brantley et al. |
| 9,015,285 | B1 | 4/2015 | Ebsen et al. |
| 9,020,745 | B2 | 4/2015 | Johnston et al. |
| 9,026,943 | B1 | 5/2015 | Spiegel |
| 9,037,577 | B1 | 5/2015 | Saylor et al. |
| 9,040,574 | B2 | 5/2015 | Wang et al. |
| 9,043,329 | B1 | 5/2015 | Patton et al. |
| 9,055,416 | B2 | 6/2015 | Rosen et al. |
| 9,063,638 | B1 | 6/2015 | Schrock et al. |
| 9,080,877 | B2 | 7/2015 | Dave et al. |
| 9,083,770 | B1 | 7/2015 | Drose et al. |
| 9,094,137 | B1 | 7/2015 | Sehn et al. |
| 9,098,832 | B1 | 8/2015 | Scardino |
| 9,100,806 | B2 | 8/2015 | Rosen et al. |
| 9,100,807 | B2 | 8/2015 | Rosen et al. |
| 9,113,301 | B1 | 8/2015 | Spiegel et al. |
| 9,119,027 | B2 | 8/2015 | Sharon et al. |
| 9,123,074 | B2 | 9/2015 | Jacobs et al. |
| 9,137,700 | B2 | 9/2015 | Elefant et al. |
| 9,143,382 | B2 | 9/2015 | Bhogal et al. |
| 9,143,681 | B1 | 9/2015 | Ebsen et al. |
| 9,148,424 | B1 | 9/2015 | Yang |
| 9,148,742 | B1 | 9/2015 | Koulomzin et al. |
| 9,152,477 | B1 | 10/2015 | Campbell et al. |
| 9,159,364 | B1 | 10/2015 | Matias et al. |
| 9,175,967 | B2 | 11/2015 | Abramson et al. |
| 9,191,776 | B2 | 11/2015 | Root et al. |
| 9,204,252 | B2 | 12/2015 | Root |
| 9,210,542 | B2 | 12/2015 | Longo et al. |
| 9,225,805 | B2 | 12/2015 | Kujawa et al. |
| 9,225,897 | B1 | 12/2015 | Sehn et al. |
| 9,237,202 | B1 | 1/2016 | Sehn |
| 9,258,459 | B2 | 2/2016 | Hartley |
| 9,264,463 | B2 | 2/2016 | Rubinstein et al. |
| 9,269,011 | B1 | 2/2016 | Sikka et al. |
| 9,276,886 | B1 | 3/2016 | Samaranayake |
| 9,277,365 | B1 | 3/2016 | Wilden et al. |
| 9,294,425 | B1 | 3/2016 | Son |
| 9,319,472 | B2 | 4/2016 | Cathcart et al. |
| 9,344,606 | B2 | 5/2016 | Hartley et al. |
| 9,385,983 | B1 | 7/2016 | Sehn |
| 9,396,354 | B1 | 7/2016 | Murphy et al. |
| 9,407,712 | B1 | 8/2016 | Sehn |
| 9,407,816 | B1 | 8/2016 | Sehn |
| 9,414,422 | B2 | 8/2016 | Belghoul et al. |
| 9,417,754 | B2 | 8/2016 | Smith |
| 9,430,783 | B1 | 8/2016 | Sehn |
| 9,439,041 | B2 | 9/2016 | Parvizi et al. |
| 9,443,227 | B2 | 9/2016 | Evans et al. |
| 9,450,907 | B2 | 9/2016 | Pridmore et al. |
| 9,459,778 | B2 | 10/2016 | Hogeg et al. |
| 9,477,391 | B2 | 10/2016 | Flynn, III et al. |
| 9,482,882 | B1 | 11/2016 | Hanover et al. |
| 9,482,883 | B1 | 11/2016 | Meisenholder |
| 9,489,661 | B2 | 11/2016 | Evans et al. |
| 9,491,134 | B2 | 11/2016 | Rosen et al. |
| 9,532,171 | B2 | 12/2016 | Allen et al. |
| 9,537,811 | B2 | 1/2017 | Allen et al. |
| 9,542,422 | B2 | 1/2017 | Duggal et al. |
| 9,544,379 | B2 | 1/2017 | Gauglitz et al. |
| 9,560,006 | B2 | 1/2017 | Prado et al. |
| 9,591,445 | B2 | 3/2017 | Zises |
| 9,628,950 | B1 | 4/2017 | Noeth et al. |
| 9,635,500 | B1 | 4/2017 | Becker et al. |
| 9,641,572 | B1 | 5/2017 | Yeskel et al. |
| 9,641,972 | B1 | 5/2017 | Hughes |
| 9,645,221 | B1 | 5/2017 | Heizer |
| 9,648,056 | B1 | 5/2017 | Kim et al. |
| 9,648,074 | B2 | 5/2017 | Liu |
| 9,648,581 | B1 | 5/2017 | Vaynblat et al. |
| 9,652,896 | B1 | 5/2017 | Jurgenson et al. |
| 9,659,244 | B2 | 5/2017 | Anderton et al. |
| 9,672,538 | B1 | 6/2017 | Vaynblat et al. |
| 9,674,660 | B1 | 6/2017 | Vaynblat et al. |
| 9,705,831 | B2 | 7/2017 | Spiegel |
| 9,706,355 | B1 | 7/2017 | Cali et al. |
| 9,710,821 | B2 | 7/2017 | Heath |

(56) References Cited

U.S. PATENT DOCUMENTS

| | | | |
|---|---|---|---|
| 9,710,969 | B2 | 7/2017 | Malamud et al. |
| 9,736,627 | B2 | 8/2017 | Holm et al. |
| 9,742,713 | B2 | 8/2017 | Spiegel et al. |
| 9,749,429 | B1 | 8/2017 | Simkhai et al. |
| 9,781,490 | B2 | 10/2017 | Makhlouf |
| 9,785,796 | B1 | 10/2017 | Murphy et al. |
| 9,788,027 | B1 | 10/2017 | Vucurevich |
| 9,802,121 | B2 | 10/2017 | Ackley et al. |
| 9,823,724 | B2 | 11/2017 | Vaccari et al. |
| 9,843,720 | B1 | 12/2017 | Ebsen et al. |
| 9,854,219 | B2 | 12/2017 | Sehn |
| 9,866,999 | B1 | 1/2018 | Noeth |
| 9,881,094 | B2 | 1/2018 | Pavlovskaia |
| 9,894,478 | B1 | 2/2018 | Deluca et al. |
| 9,961,520 | B2 | 5/2018 | Brooks et al. |
| 9,961,535 | B2 | 5/2018 | Bucchieri |
| 10,026,226 | B1 | 7/2018 | Lotto |
| 10,044,818 | B2 | 8/2018 | Wilden et al. |
| 10,080,102 | B1 | 9/2018 | Noeth et al. |
| 10,176,195 | B2 | 1/2019 | Patel |
| 10,186,299 | B2 | 1/2019 | Wang et al. |
| 10,200,813 | B1 | 2/2019 | Allen et al. |
| 10,250,683 | B2 | 4/2019 | Karkkainen et al. |
| 10,271,158 | B1 | 4/2019 | Ledet |
| 10,282,753 | B2 | 5/2019 | Cheung |
| 10,285,002 | B2 | 5/2019 | Colonna et al. |
| 10,285,006 | B2 | 5/2019 | Colonna et al. |
| 10,349,209 | B1 | 7/2019 | Noeth et al. |
| 10,382,372 | B1 | 8/2019 | Chung et al. |
| 10,395,519 | B2 | 8/2019 | Colonna et al. |
| 10,438,094 | B1 | 10/2019 | Ko et al. |
| 10,440,420 | B2 | 10/2019 | Hogeg et al. |
| 10,445,777 | B2 | 10/2019 | McDevitt et al. |
| 10,524,087 | B1 | 12/2019 | Allen et al. |
| 10,565,795 | B2 | 2/2020 | Charlton et al. |
| 10,616,239 | B2 | 4/2020 | Allen et al. |
| 10,616,476 | B1 | 4/2020 | Ebsen et al. |
| 10,616,727 | B2 | 4/2020 | Constantinides |
| 10,659,914 | B1 | 5/2020 | Allen et al. |
| 10,694,317 | B2 | 6/2020 | Cheung |
| 10,771,924 | B2 | 9/2020 | Colonna et al. |
| 10,824,654 | B2 | 11/2020 | Chang et al. |
| 10,880,252 | B2 | 12/2020 | Gauglitz et al. |
| 10,893,055 | B2 | 1/2021 | Allen et al. |
| 10,896,426 | B2 | 1/2021 | Harrington et al. |
| 10,915,911 | B2 | 2/2021 | Ahmed et al. |
| 10,958,607 | B2 | 3/2021 | Gauglitz et al. |
| 10,990,697 | B2 | 4/2021 | Murphy et al. |
| 11,012,398 | B1 | 5/2021 | Allen et al. |
| 11,038,829 | B1 | 6/2021 | Allen et al. |
| 11,166,121 | B2 | 11/2021 | Sehn et al. |
| 11,190,679 | B2 | 11/2021 | Ebsen et al. |
| 11,216,869 | B2 | 1/2022 | Allen et al. |
| 11,281,701 | B2 | 3/2022 | Chang et al. |
| 11,317,240 | B2 | 4/2022 | Allen et al. |
| 11,627,141 | B2 | 4/2023 | Allen et al. |
| 11,741,136 | B2 | 8/2023 | Chang et al. |
| 11,900,418 | B2 | 2/2024 | Azmoodeh et al. |
| 11,902,287 | B2 | 2/2024 | Allen et al. |
| 11,956,533 | B2 | 4/2024 | Ebsen et al. |
| 12,041,508 | B1 | 7/2024 | Noeth et al. |
| 12,127,068 | B2 | 10/2024 | Noeth et al. |
| 12,200,563 | B2 | 1/2025 | Noeth et al. |
| 12,231,437 | B2 | 2/2025 | Allen et al. |
| 2001/0025316 | A1 | 9/2001 | Oh |
| 2001/0028787 | A1 | 10/2001 | Nomura et al. |
| 2002/0023101 | A1 | 2/2002 | Kurihara et al. |
| 2002/0032771 | A1 | 3/2002 | Gledje |
| 2002/0047686 | A1 | 4/2002 | Kodama et al. |
| 2002/0047858 | A1 | 4/2002 | Bayliss et al. |
| 2002/0047868 | A1 | 4/2002 | Miyazawa |
| 2002/0078456 | A1 | 6/2002 | Hudson et al. |
| 2002/0087631 | A1 | 7/2002 | Sharma |
| 2002/0097257 | A1 | 7/2002 | Miller et al. |
| 2002/0098850 | A1 | 7/2002 | Akhteruzzaman et al. |
| 2002/0122659 | A1 | 9/2002 | Mcgrath et al. |
| 2002/0123327 | A1 | 9/2002 | Vataja |
| 2002/0128047 | A1 | 9/2002 | Gates |
| 2002/0141378 | A1 | 10/2002 | Bays et al. |
| 2002/0144154 | A1 | 10/2002 | Tomkow |
| 2002/0146103 | A1 | 10/2002 | Holt et al. |
| 2002/0171669 | A1 | 11/2002 | Meron et al. |
| 2003/0001846 | A1 | 1/2003 | Davis et al. |
| 2003/0016247 | A1 | 1/2003 | Lai et al. |
| 2003/0016253 | A1 | 1/2003 | Aoki et al. |
| 2003/0017823 | A1 | 1/2003 | Mager et al. |
| 2003/0020623 | A1 | 1/2003 | Cao et al. |
| 2003/0023874 | A1 | 1/2003 | Prokupets et al. |
| 2003/0037124 | A1 | 2/2003 | Yamaura et al. |
| 2003/0052925 | A1 | 3/2003 | Daimon et al. |
| 2003/0074404 | A1 | 4/2003 | Parker et al. |
| 2003/0083929 | A1 | 5/2003 | Springer et al. |
| 2003/0101230 | A1 | 5/2003 | Benschoter et al. |
| 2003/0110503 | A1 | 6/2003 | Perkes |
| 2003/0126215 | A1 | 7/2003 | Udell |
| 2003/0131362 | A1 | 7/2003 | Jasinschi et al. |
| 2003/0148773 | A1 | 8/2003 | Spriestersbach et al. |
| 2003/0163370 | A1 | 8/2003 | Chen et al. |
| 2003/0164856 | A1 | 9/2003 | Prager et al. |
| 2003/0210280 | A1 | 11/2003 | Baker et al. |
| 2003/0217106 | A1 | 11/2003 | Adar et al. |
| 2003/0217118 | A1 | 11/2003 | Kobayashi et al. |
| 2003/0229607 | A1 | 12/2003 | Zellweger et al. |
| 2003/0236823 | A1 | 12/2003 | Patzer et al. |
| 2004/0027371 | A1 | 2/2004 | Jaeger |
| 2004/0064429 | A1 | 4/2004 | Hirstius et al. |
| 2004/0078367 | A1 | 4/2004 | Anderson et al. |
| 2004/0091116 | A1 | 5/2004 | Staddon et al. |
| 2004/0111467 | A1 | 6/2004 | Willis |
| 2004/0158739 | A1 | 8/2004 | Wakai et al. |
| 2004/0185877 | A1 | 9/2004 | Asthana et al. |
| 2004/0189465 | A1 | 9/2004 | Capobianco et al. |
| 2004/0193488 | A1 | 9/2004 | Khoo et al. |
| 2004/0199402 | A1 | 10/2004 | Walker et al. |
| 2004/0203959 | A1 | 10/2004 | Coombes |
| 2004/0205480 | A1 | 10/2004 | Moore |
| 2004/0205514 | A1 | 10/2004 | Sommerer et al. |
| 2004/0215625 | A1 | 10/2004 | Svendsen et al. |
| 2004/0243531 | A1 | 12/2004 | Dean |
| 2004/0243688 | A1 | 12/2004 | Wugofski |
| 2004/0243704 | A1 | 12/2004 | Botelho et al. |
| 2005/0019014 | A1 | 1/2005 | Yoo et al. |
| 2005/0021444 | A1 | 1/2005 | Bauer et al. |
| 2005/0022211 | A1 | 1/2005 | Veselov et al. |
| 2005/0032527 | A1 | 2/2005 | Sheha et al. |
| 2005/0048989 | A1 | 3/2005 | Jung |
| 2005/0071435 | A1 | 3/2005 | Karstens |
| 2005/0078804 | A1 | 4/2005 | Yomoda |
| 2005/0097176 | A1 | 5/2005 | Schatz et al. |
| 2005/0102180 | A1 | 5/2005 | Gailey et al. |
| 2005/0102381 | A1 | 5/2005 | Jiang et al. |
| 2005/0104976 | A1 | 5/2005 | Currans |
| 2005/0114783 | A1 | 5/2005 | Szeto |
| 2005/0119936 | A1 | 6/2005 | Buchanan et al. |
| 2005/0122405 | A1 | 6/2005 | Voss et al. |
| 2005/0193340 | A1 | 9/2005 | Amburgey et al. |
| 2005/0193345 | A1 | 9/2005 | Klassen et al. |
| 2005/0198128 | A1 | 9/2005 | Anderson |
| 2005/0223066 | A1 | 10/2005 | Buchheit et al. |
| 2005/0288954 | A1 | 12/2005 | McCarthy et al. |
| 2006/0004630 | A1 | 1/2006 | Criddle et al. |
| 2006/0026067 | A1 | 2/2006 | Nicholas et al. |
| 2006/0107297 | A1 | 5/2006 | Toyama et al. |
| 2006/0109238 | A1 | 5/2006 | Lau et al. |
| 2006/0114338 | A1 | 6/2006 | Rothschild |
| 2006/0119882 | A1 | 6/2006 | Harris et al. |
| 2006/0127054 | A1 | 6/2006 | Matsuyama |
| 2006/0136297 | A1 | 6/2006 | Willis et al. |
| 2006/0199612 | A1 | 9/2006 | Beyer et al. |
| 2006/0242234 | A1 | 10/2006 | Counts et al. |
| 2006/0242239 | A1 | 10/2006 | Morishima et al. |
| 2006/0242550 | A1 | 10/2006 | Rahman et al. |
| 2006/0242554 | A1 | 10/2006 | Gerace et al. |
| 2006/0252438 | A1 | 11/2006 | Ansamaa et al. |

(56) References Cited

U.S. PATENT DOCUMENTS

2006/0259359 A1 11/2006 Gogel
2006/0265417 A1 11/2006 Amato et al.
2006/0270419 A1 11/2006 Crowley et al.
2006/0276184 A1 12/2006 Tretyak et al.
2006/0282819 A1 12/2006 Graham et al.
2006/0287878 A1 12/2006 Wadhwa et al.
2007/0003221 A1 1/2007 Hamada et al.
2007/0004426 A1 1/2007 Pfleging et al.
2007/0028183 A1 2/2007 Ostojic et al.
2007/0032225 A1 2/2007 Konicek et al.
2007/0038715 A1 2/2007 Collins et al.
2007/0040931 A1 2/2007 Nishizawa
2007/0064899 A1 3/2007 Boss et al.
2007/0067317 A1 3/2007 Stevenson
2007/0073517 A1 3/2007 Panje
2007/0073823 A1 3/2007 Cohen et al.
2007/0075898 A1 4/2007 Markhovsky et al.
2007/0082707 A1 4/2007 Flynt et al.
2007/0088832 A1 4/2007 Tsang et al.
2007/0106706 A1 5/2007 Ahrens et al.
2007/0118801 A1 5/2007 Harshbarger et al.
2007/0136228 A1 6/2007 Petersen
2007/0192128 A1 8/2007 Celestini
2007/0198340 A1 8/2007 Lucovsky et al.
2007/0198495 A1 8/2007 Buron et al.
2007/0208751 A1 9/2007 Cowan et al.
2007/0210936 A1 9/2007 Nicholson
2007/0214180 A1 9/2007 Crawford
2007/0214216 A1 9/2007 Carrer et al.
2007/0233556 A1 10/2007 Koningstein
2007/0233801 A1 10/2007 Eren et al.
2007/0233859 A1 10/2007 Zhao et al.
2007/0243887 A1 10/2007 Bandhole et al.
2007/0244750 A1 10/2007 Grannan et al.
2007/0250791 A1 10/2007 Halliday et al.
2007/0255456 A1 11/2007 Funayama
2007/0260741 A1 11/2007 Bezancon
2007/0262860 A1 11/2007 Salinas et al.
2007/0268988 A1 11/2007 Hedayat et al.
2007/0281690 A1 12/2007 Altman et al.
2007/0294735 A1 12/2007 Luo
2007/0299807 A1 12/2007 Lea et al.
2008/0005240 A1 1/2008 Knighton et al.
2008/0012987 A1 1/2008 Hirata et al.
2008/0022329 A1 1/2008 Glad
2008/0025701 A1 1/2008 Ikeda
2008/0032703 A1 2/2008 Krumm et al.
2008/0033795 A1 2/2008 Wishnow et al.
2008/0033930 A1 2/2008 Warren
2008/0043041 A2 2/2008 Hedenstroem et al.
2008/0046476 A1 2/2008 Anderson et al.
2008/0046831 A1 2/2008 Imai et al.
2008/0046956 A1 2/2008 Kulas
2008/0049704 A1 2/2008 Witteman et al.
2008/0055269 A1 3/2008 Lemay et al.
2008/0062141 A1 3/2008 Chandhri
2008/0076505 A1 3/2008 Ngyen et al.
2008/0091723 A1 4/2008 Zuckerberg et al.
2008/0092233 A1 4/2008 Tian et al.
2008/0094387 A1 4/2008 Chen
2008/0104503 A1 5/2008 Beall et al.
2008/0109844 A1 5/2008 Baldeschweiler et al.
2008/0120409 A1 5/2008 Sun et al.
2008/0133336 A1 6/2008 Altman et al.
2008/0147730 A1 6/2008 Lee et al.
2008/0148150 A1 6/2008 Mall
2008/0158230 A1 7/2008 Sharma et al.
2008/0160956 A1 7/2008 Jackson et al.
2008/0167106 A1 7/2008 Lutnick
2008/0168033 A1 7/2008 Ott et al.
2008/0168489 A1 7/2008 Schraga
2008/0172413 A1 7/2008 Chiu
2008/0183485 A1 7/2008 Drabble et al.
2008/0189177 A1 8/2008 Anderton et al.
2008/0193101 A1 8/2008 Agnihotri et al.
2008/0200189 A1 8/2008 Lagerstedt et al.
2008/0207176 A1 8/2008 Brackbill et al.
2008/0208692 A1 8/2008 Garaventi et al.
2008/0214210 A1 9/2008 Rasanen et al.
2008/0222158 A1 9/2008 Saika
2008/0222545 A1 9/2008 Lemay
2008/0244438 A1 10/2008 Peters et al.
2008/0255976 A1 10/2008 Altberg et al.
2008/0256430 A1 10/2008 Gold
2008/0256446 A1 10/2008 Yamamoto
2008/0256450 A1 10/2008 Takakura et al.
2008/0256577 A1 10/2008 Funaki et al.
2008/0263103 A1 10/2008 Mcgregor et al.
2008/0266421 A1 10/2008 Takahata et al.
2008/0270938 A1 10/2008 Carlson
2008/0284587 A1 11/2008 Saigh et al.
2008/0288338 A1 11/2008 Wiseman et al.
2008/0306826 A1 12/2008 Kramer et al.
2008/0313329 A1 12/2008 Wang et al.
2008/0313346 A1 12/2008 Kujawa et al.
2008/0316181 A1 12/2008 Nurmi
2008/0318616 A1 12/2008 Chipalkatti et al.
2009/0006191 A1 1/2009 Arankalle et al.
2009/0006336 A1 1/2009 Forstall et al.
2009/0006565 A1 1/2009 Velusamy et al.
2009/0015703 A1 1/2009 Kim et al.
2009/0019472 A1 1/2009 Cleland et al.
2009/0024956 A1 1/2009 Kobayashi
2009/0030774 A1 1/2009 Rothschild et al.
2009/0030999 A1 1/2009 Gatzke et al.
2009/0040324 A1 2/2009 Nonaka
2009/0042588 A1 2/2009 Lottin et al.
2009/0058822 A1 3/2009 Chaudhri
2009/0063992 A1 3/2009 Gandhi et al.
2009/0079846 A1 3/2009 Chou
2009/0087161 A1 4/2009 Roberts et al.
2009/0089169 A1 4/2009 Gupta et al.
2009/0089378 A1 4/2009 Maresh
2009/0089678 A1 4/2009 Sacco et al.
2009/0089710 A1 4/2009 Wood et al.
2009/0093261 A1 4/2009 Ziskind
2009/0098859 A1 4/2009 Kamdar et al.
2009/0132341 A1 5/2009 Klinger
2009/0132453 A1 5/2009 Hangartner et al.
2009/0132665 A1 5/2009 Thomsen et al.
2009/0148045 A1 6/2009 Lee et al.
2009/0153492 A1 6/2009 Popp
2009/0157450 A1 6/2009 Athsani et al.
2009/0157752 A1 6/2009 Gonzalez
2009/0158183 A1 6/2009 Mccurdy et al.
2009/0160970 A1 6/2009 Fredlund et al.
2009/0163182 A1 6/2009 Gatti et al.
2009/0169062 A1 7/2009 Cheung et al.
2009/0177299 A1 7/2009 Van De Sluis
2009/0177588 A1 7/2009 Marchese
2009/0177730 A1 7/2009 Annamalai et al.
2009/0187825 A1 7/2009 Sandquist et al.
2009/0192900 A1 7/2009 Collision
2009/0197582 A1 8/2009 Lewis et al.
2009/0197616 A1 8/2009 Lewis et al.
2009/0199242 A1 8/2009 Johnson et al.
2009/0215469 A1 8/2009 Fisher et al.
2009/0232354 A1 9/2009 Camp, Jr. et al.
2009/0234815 A1 9/2009 Boerries et al.
2009/0235155 A1 9/2009 Ueda
2009/0239552 A1 9/2009 Churchill et al.
2009/0249222 A1 10/2009 Schmidt et al.
2009/0249244 A1 10/2009 Robinson et al.
2009/0254840 A1 10/2009 Churchill et al.
2009/0260010 A1 10/2009 Burkhart et al.
2009/0265647 A1 10/2009 Martin et al.
2009/0284658 A1 11/2009 Cho
2009/0288022 A1 11/2009 Almstrand et al.
2009/0291665 A1 11/2009 Gaskarth et al.
2009/0291672 A1 11/2009 Treves et al.
2009/0292608 A1* 11/2009 Polachek ........... G06Q 30/0245
715/810
2009/0299857 A1 12/2009 Brubaker
2009/0300139 A1 12/2009 Shoemaker et al.

(56) References Cited

U.S. PATENT DOCUMENTS

2009/0319607 A1 12/2009 Belz et al.
2009/0327073 A1 12/2009 Li
2010/0001980 A1 1/2010 Kim et al.
2010/0004003 A1 1/2010 Duggal et al.
2010/0011316 A1 1/2010 Sar et al.
2010/0014833 A1 1/2010 Pjanovic et al.
2010/0039505 A1 2/2010 Inoue et al.
2010/0041378 A1 2/2010 Aceves et al.
2010/0062794 A1 3/2010 Han
2010/0073509 A1 3/2010 Shioji
2010/0075638 A1 3/2010 Carlson et al.
2010/0082427 A1 4/2010 Burgener et al.
2010/0082693 A1 4/2010 Hugg et al.
2010/0100568 A1 4/2010 Papin et al.
2010/0100729 A1 4/2010 Read et al.
2010/0113065 A1 5/2010 Narayan et al.
2010/0113066 A1 5/2010 Dingler et al.
2010/0115281 A1 5/2010 Camenisch et al.
2010/0130233 A1 5/2010 Parker
2010/0131880 A1 5/2010 Lee et al.
2010/0131895 A1 5/2010 Wohlert
2010/0153144 A1 6/2010 Miller et al.
2010/0153197 A1 6/2010 Byon
2010/0156933 A1 6/2010 Jones et al.
2010/0159944 A1 6/2010 Pascal et al.
2010/0161635 A1 6/2010 Dey
2010/0161658 A1 6/2010 Hamynen et al.
2010/0161831 A1 6/2010 Haas et al.
2010/0162149 A1 6/2010 Sheleheda et al.
2010/0178939 A1 7/2010 Kang et al.
2010/0183280 A1 7/2010 Beauregard et al.
2010/0185552 A1 7/2010 Deluca et al.
2010/0185665 A1 7/2010 Horn et al.
2010/0185750 A1 7/2010 Nakayama
2010/0185987 A1 7/2010 Yang et al.
2010/0191631 A1 7/2010 Weidmann
2010/0197318 A1 8/2010 Petersen et al.
2010/0197319 A1 8/2010 Petersen et al.
2010/0198683 A1 8/2010 Aarabi
2010/0198694 A1 8/2010 Muthukrishnan
2010/0198826 A1 8/2010 Petersen et al.
2010/0198828 A1 8/2010 Petersen et al.
2010/0198862 A1 8/2010 Jennings et al.
2010/0198870 A1 8/2010 Petersen et al.
2010/0198917 A1 8/2010 Petersen et al.
2010/0199166 A1 8/2010 Fisk, III
2010/0199227 A1 8/2010 Xiao et al.
2010/0201482 A1 8/2010 Robertson et al.
2010/0201536 A1 8/2010 Robertson et al.
2010/0211431 A1 8/2010 Lutnick et al.
2010/0214436 A1 8/2010 Kim et al.
2010/0216491 A1 8/2010 Winkler et al.
2010/0223128 A1 9/2010 Dukellis et al.
2010/0223343 A1 9/2010 Bosan et al.
2010/0247064 A1 9/2010 Yeh et al.
2010/0250109 A1 9/2010 Johnston et al.
2010/0251143 A1 9/2010 Thomas et al.
2010/0255865 A1 10/2010 Karmarkar
2010/0257196 A1 10/2010 Waters et al.
2010/0259386 A1 10/2010 Holley et al.
2010/0262461 A1 10/2010 Bohannon
2010/0273463 A1 10/2010 Bonnefoy
2010/0273509 A1 10/2010 Sweeney et al.
2010/0281045 A1 11/2010 Dean
2010/0293105 A1 11/2010 Blinn et al.
2010/0299763 A1 11/2010 Marcus et al.
2010/0306669 A1 12/2010 Della Pasqua
2010/0318628 A1 12/2010 Pacella et al.
2010/0323666 A1 12/2010 Cai et al.
2010/0332958 A1 12/2010 Weinberger et al.
2011/0004071 A1 1/2011 Faiola et al.
2011/0010205 A1 1/2011 Richards
2011/0029512 A1 2/2011 Folgner et al.
2011/0035284 A1 2/2011 Moshfeghi
2011/0037605 A1 2/2011 Robison, Jr. et al.
2011/0040783 A1 2/2011 Uemichi et al.
2011/0040804 A1 2/2011 Peirce et al.
2011/0044563 A1* 2/2011 Blose .................... G06F 16/58
382/306
2011/0050909 A1 3/2011 Ellenby et al.
2011/0050915 A1 3/2011 Wang et al.
2011/0064388 A1 3/2011 Brown et al.
2011/0066743 A1 3/2011 Hurley et al.
2011/0083101 A1 4/2011 Sharon et al.
2011/0085059 A1 4/2011 Noh
2011/0098061 A1 4/2011 Yoon
2011/0099507 A1 4/2011 Nesladek et al.
2011/0099519 A1 4/2011 Ma et al.
2011/0102630 A1 5/2011 Rukes
2011/0106882 A1 5/2011 Takakura et al.
2011/0119133 A1 5/2011 Igelman et al.
2011/0131633 A1 6/2011 Macaskill et al.
2011/0137881 A1 6/2011 Cheng et al.
2011/0141025 A1 6/2011 Tsai
2011/0145564 A1 6/2011 Moshir et al.
2011/0159890 A1 6/2011 Fortescue et al.
2011/0161423 A1 6/2011 Pratt et al.
2011/0164163 A1 7/2011 Bilbrey et al.
2011/0170838 A1 7/2011 Rosengart et al.
2011/0184980 A1 7/2011 Jeong et al.
2011/0191368 A1 8/2011 Muzatko
2011/0197194 A1 8/2011 D'Angelo et al.
2011/0202598 A1 8/2011 Evans et al.
2011/0202968 A1 8/2011 Nurmi
2011/0211534 A1 9/2011 Schmidt et al.
2011/0213845 A1 9/2011 Logan et al.
2011/0215966 A1 9/2011 Kim et al.
2011/0225048 A1 9/2011 Nair
2011/0238300 A1 9/2011 Schenken
2011/0238762 A1 9/2011 Soni et al.
2011/0238763 A1 9/2011 Shin et al.
2011/0249551 A1 10/2011 Rollins
2011/0251790 A1 10/2011 Liotopoulos et al.
2011/0255736 A1 10/2011 Thompson et al.
2011/0256881 A1 10/2011 Huang et al.
2011/0258260 A1 10/2011 Isaacson
2011/0269479 A1 11/2011 Ledlie
2011/0273575 A1 11/2011 Lee
2011/0276637 A1 11/2011 Thornton et al.
2011/0282799 A1 11/2011 Huston
2011/0283172 A1 11/2011 Berger et al.
2011/0283188 A1 11/2011 Farrenkopf
2011/0286586 A1 11/2011 Saylor et al.
2011/0288917 A1 11/2011 Wanek
2011/0294541 A1 12/2011 Zheng et al.
2011/0295577 A1 12/2011 Ramachandran
2011/0295677 A1 12/2011 Dhingra et al.
2011/0295719 A1 12/2011 Chen et al.
2011/0296474 A1 12/2011 Babic
2011/0302525 A1 12/2011 Jeon
2011/0306387 A1 12/2011 Moon
2011/0314084 A1 12/2011 Saretto et al.
2011/0314419 A1 12/2011 Dunn et al.
2011/0320373 A1 12/2011 Lee et al.
2012/0004956 A1 1/2012 Hustan
2012/0011031 A1* 1/2012 Lewis .................... G06Q 30/08
705/26.1
2012/0019722 A1 1/2012 Kwisthout et al.
2012/0023522 A1 1/2012 Anderson et al.
2012/0028659 A1 2/2012 Whitney et al.
2012/0033718 A1 2/2012 Kauffman et al.
2012/0036015 A1 2/2012 Sheikh
2012/0036443 A1 2/2012 Ohmori et al.
2012/0054001 A1 3/2012 Zivkovic et al.
2012/0054797 A1 3/2012 Skog et al.
2012/0054811 A1 3/2012 Spears
2012/0059722 A1 3/2012 Rao
2012/0062805 A1 3/2012 Candelore
2012/0070045 A1 3/2012 Vesper et al.
2012/0084731 A1 4/2012 Filman et al.
2012/0084835 A1 4/2012 Thomas et al.
2012/0098836 A1 4/2012 Kim et al.
2012/0099800 A1* 4/2012 Llano .................... G06F 16/58
382/224

(56) References Cited

U.S. PATENT DOCUMENTS

2012/0108293 A1 5/2012 Law et al.
2012/0110096 A1 5/2012 Smarr et al.
2012/0113143 A1 5/2012 Adhikari et al.
2012/0113272 A1 5/2012 Hata
2012/0117456 A1 5/2012 Koskimies
2012/0123830 A1 5/2012 Svendsen et al.
2012/0123867 A1 5/2012 Hannan
2012/0123871 A1 5/2012 Svendsen et al.
2012/0123875 A1 5/2012 Svendsen et al.
2012/0124126 A1 5/2012 Alcazar et al.
2012/0124147 A1 5/2012 Hamlin et al.
2012/0124176 A1 5/2012 Curtis et al.
2012/0124458 A1 5/2012 Cruzada
2012/0127196 A1 5/2012 Landry
2012/0129548 A1 5/2012 Rao et al.
2012/0131507 A1 5/2012 Sparandara et al.
2012/0131512 A1 5/2012 Takeuchi et al.
2012/0136998 A1 5/2012 Hough et al.
2012/0137340 A1 5/2012 Jakobsson et al.
2012/0143760 A1 6/2012 Abulafia et al.
2012/0143963 A1 6/2012 Kennberg et al.
2012/0150978 A1 6/2012 Monaco
2012/0158532 A1 6/2012 Fitzsimmons
2012/0163664 A1 6/2012 Zhu
2012/0165100 A1 6/2012 Lalancette et al.
2012/0166462 A1 6/2012 Pathak et al.
2012/0166468 A1 6/2012 Gupta et al.
2012/0166971 A1 6/2012 Sachson et al.
2012/0169855 A1 7/2012 Oh
2012/0172062 A1 7/2012 Altman et al.
2012/0173991 A1 7/2012 Roberts et al.
2012/0176401 A1 7/2012 Hayward et al.
2012/0179549 A1 7/2012 Sigmund et al.
2012/0184248 A1 7/2012 Speede
2012/0197690 A1 8/2012 Agulnek
2012/0197724 A1* 8/2012 Kendall ............. G06Q 30/0261
705/14.58
2012/0200743 A1 8/2012 Blanchflower et al.
2012/0201362 A1 8/2012 Crossan et al.
2012/0202525 A1 8/2012 Pettini
2012/0203849 A1 8/2012 Collins et al.
2012/0208564 A1 8/2012 Clark et al.
2012/0209892 A1 8/2012 Macaskill et al.
2012/0209921 A1 8/2012 Adafin et al.
2012/0209924 A1 8/2012 Evans et al.
2012/0210244 A1 8/2012 De Francisco et al.
2012/0212632 A1 8/2012 Mate et al.
2012/0214568 A1 8/2012 Herrmann
2012/0220264 A1 8/2012 Kawabata
2012/0221687 A1 8/2012 Hunter et al.
2012/0226663 A1 9/2012 Valdez et al.
2012/0226748 A1 9/2012 Bosworth et al.
2012/0233000 A1 9/2012 Fisher et al.
2012/0236162 A1 9/2012 Imamura
2012/0239761 A1 9/2012 Linner et al.
2012/0250951 A1 10/2012 Chen
2012/0252418 A1 10/2012 Kandekar et al.
2012/0254324 A1 10/2012 Majeti et al.
2012/0254325 A1 10/2012 Majeti et al.
2012/0259815 A1 10/2012 Olson
2012/0263439 A1 10/2012 Lassman et al.
2012/0270563 A1 10/2012 Sayed
2012/0271684 A1 10/2012 Shutter
2012/0278387 A1 11/2012 Garcia et al.
2012/0278692 A1 11/2012 Shi
2012/0281129 A1 11/2012 Wang et al.
2012/0288147 A1 11/2012 Fujitani
2012/0290637 A1 11/2012 Perantatos et al.
2012/0299954 A1 11/2012 Wada et al.
2012/0302259 A1 11/2012 Busch
2012/0304052 A1 11/2012 Tanaka et al.
2012/0304080 A1 11/2012 Wormald et al.
2012/0307096 A1 12/2012 Ford et al.
2012/0307112 A1 12/2012 Kunishige et al.
2012/0311465 A1 12/2012 Nealer et al.
2012/0311623 A1 12/2012 Davis et al.
2012/0319904 A1 12/2012 Lee et al.
2012/0323933 A1 12/2012 He et al.
2012/0324018 A1 12/2012 Metcalf et al.
2013/0004014 A1 1/2013 Hickman
2013/0006759 A1 1/2013 Srivastava et al.
2013/0006777 A1 1/2013 Krishnareddy et al.
2013/0017802 A1 1/2013 Adibi et al.
2013/0018960 A1 1/2013 Knysz et al.
2013/0023284 A1 1/2013 Stanger
2013/0024292 A1 1/2013 David
2013/0024757 A1 1/2013 Doll et al.
2013/0035114 A1 2/2013 Holden et al.
2013/0036364 A1 2/2013 Johnson
2013/0045753 A1 2/2013 Obermeyer et al.
2013/0050260 A1 2/2013 Reitan
2013/0055083 A1 2/2013 Fino
2013/0057489 A1 3/2013 Morton
2013/0057587 A1 3/2013 Leonard et al.
2013/0059607 A1 3/2013 Herz et al.
2013/0060690 A1 3/2013 Oskolkov et al.
2013/0063369 A1 3/2013 Malhotra et al.
2013/0067027 A1 3/2013 Song et al.
2013/0071093 A1 3/2013 Hanks et al.
2013/0076758 A1 3/2013 Li et al.
2013/0080254 A1* 3/2013 Thramann ............... B60L 53/68
705/14.57
2013/0080256 A1 3/2013 Piccionelli
2013/0082959 A1 4/2013 Shimazu et al.
2013/0085790 A1 4/2013 Palmer et al.
2013/0086072 A1 4/2013 Peng et al.
2013/0090171 A1 4/2013 Holton et al.
2013/0091452 A1 4/2013 Sorden et al.
2013/0095857 A1 4/2013 Garcia et al.
2013/0099977 A1 4/2013 Sheshadri et al.
2013/0103766 A1 4/2013 Gupta
2013/0104053 A1 4/2013 Thornton et al.
2013/0110885 A1 5/2013 Brundrett, III
2013/0111514 A1 5/2013 Slavin et al.
2013/0115872 A1 5/2013 Huang et al.
2013/0117261 A1 5/2013 Sambrani
2013/0117365 A1 5/2013 Padmanabhan et al.
2013/0122862 A1 5/2013 Horn et al.
2013/0122929 A1 5/2013 Al-mufti et al.
2013/0124297 A1 5/2013 Hegeman et al.
2013/0128059 A1 5/2013 Kristensson
2013/0129252 A1 5/2013 Lauper
2013/0132194 A1 5/2013 Rajaram
2013/0132477 A1 5/2013 Bosworth et al.
2013/0132908 A1 5/2013 Lee et al.
2013/0144637 A1 6/2013 Bertha et al.
2013/0144979 A1 6/2013 Kansal et al.
2013/0145286 A1 6/2013 Feng et al.
2013/0147837 A1 6/2013 Stroila
2013/0157684 A1 6/2013 Moser
2013/0159110 A1 6/2013 Rajaram et al.
2013/0159919 A1 6/2013 Leydon
2013/0169822 A1 7/2013 Zhu et al.
2013/0173380 A1 7/2013 Akbari et al.
2013/0173467 A1 7/2013 Nuzzi et al.
2013/0173729 A1 7/2013 Starenky et al.
2013/0182133 A1 7/2013 Tanabe
2013/0185131 A1 7/2013 Sinha et al.
2013/0191198 A1 7/2013 Carlson et al.
2013/0194301 A1 8/2013 Robbins et al.
2013/0198176 A1 8/2013 Kim
2013/0203373 A1 8/2013 Edge
2013/0210518 A1 8/2013 Barclay et al.
2013/0217366 A1 8/2013 Kolodziej
2013/0218965 A1 8/2013 Abrol et al.
2013/0218968 A1* 8/2013 McEvilly .............. H04L 67/306
709/204
2013/0222323 A1 8/2013 Mckenzie
2013/0226453 A1 8/2013 Trussel et al.
2013/0227476 A1 8/2013 Frey
2013/0231144 A1 9/2013 Daniel et al.
2013/0232194 A1 9/2013 Knapp et al.
2013/0254227 A1 9/2013 Shim et al.
2013/0263031 A1 10/2013 Oshiro et al.

(56) References Cited

U.S. PATENT DOCUMENTS

2013/0265450 A1 10/2013 Barnes, Jr.
2013/0267253 A1 10/2013 Case et al.
2013/0275505 A1 10/2013 Gauglitz et al.
2013/0283167 A1 10/2013 Xu
2013/0285855 A1 10/2013 Dupray et al.
2013/0290337 A1 10/2013 Lansford et al.
2013/0290443 A1 10/2013 Collins et al.
2013/0304243 A1 11/2013 Iseli
2013/0304527 A1 11/2013 Santos, III
2013/0304646 A1 11/2013 De Geer
2013/0311255 A1* 11/2013 Cummins .......... G06Q 30/0235 705/14.1
2013/0325964 A1 12/2013 Berberat
2013/0339489 A1 12/2013 Katara et al.
2013/0344896 A1 12/2013 Kirmse et al.
2013/0346205 A1 12/2013 Hogg et al.
2013/0346869 A1 12/2013 Asver et al.
2013/0346877 A1 12/2013 Borovoy et al.
2014/0003739 A1 1/2014 S V et al.
2014/0006129 A1 1/2014 Heath
2014/0009499 A1 1/2014 Gardenfors et al.
2014/0011538 A1 1/2014 Mulcahy et al.
2014/0013243 A1 1/2014 Flynn, III et al.
2014/0019246 A1 1/2014 Fraccaroli
2014/0019264 A1 1/2014 Wachman et al.
2014/0028589 A1 1/2014 Reilly
2014/0029034 A1 1/2014 Toriyama
2014/0032682 A1 1/2014 Prado et al.
2014/0040712 A1 2/2014 Chang et al.
2014/0043204 A1 2/2014 Basnayake et al.
2014/0043355 A1 2/2014 Kim et al.
2014/0045530 A1 2/2014 Gordon et al.
2014/0047016 A1 2/2014 Rao
2014/0047045 A1 2/2014 Baldwin et al.
2014/0047074 A1 2/2014 Chung et al.
2014/0047335 A1 2/2014 Lewis et al.
2014/0049652 A1 2/2014 Moon et al.
2014/0051436 A1 2/2014 Yan et al.
2014/0052281 A1 2/2014 Eronen et al.
2014/0052485 A1 2/2014 Shidfar
2014/0052633 A1 2/2014 Gandhi
2014/0057648 A1 2/2014 Lyman et al.
2014/0057660 A1 2/2014 Wager
2014/0059479 A1 2/2014 Hamburg et al.
2014/0066106 A1 3/2014 Ngo et al.
2014/0068692 A1 3/2014 Archibong et al.
2014/0082651 A1 3/2014 Sharifi
2014/0086562 A1 3/2014 Lassman et al.
2014/0089264 A1 3/2014 Talagala et al.
2014/0089314 A1 3/2014 Iizuka et al.
2014/0092130 A1 4/2014 Anderson et al.
2014/0095296 A1 4/2014 Angell et al.
2014/0096029 A1 4/2014 Schultz
2014/0114565 A1 4/2014 Aziz et al.
2014/0122502 A1 5/2014 Kalmes et al.
2014/0122658 A1 5/2014 Haeger et al.
2014/0122787 A1 5/2014 Shalvi et al.
2014/0129627 A1 5/2014 Baldwin et al.
2014/0129953 A1 5/2014 Spiegel
2014/0136985 A1 5/2014 Albir et al.
2014/0143064 A1 5/2014 Tran
2014/0143143 A1 5/2014 Fasoli et al.
2014/0149519 A1 5/2014 Redfern et al.
2014/0153837 A1 6/2014 Steiner
2014/0153902 A1 6/2014 Pearson et al.
2014/0155102 A1 6/2014 Cooper et al.
2014/0156410 A1 6/2014 Wuersch et al.
2014/0164118 A1 6/2014 Polachi
2014/0164557 A1 6/2014 Keskitalo et al.
2014/0164979 A1 6/2014 Deeter et al.
2014/0172542 A1 6/2014 Poncz et al.
2014/0172877 A1 6/2014 Rubinstein et al.
2014/0173003 A1 6/2014 Van et al.
2014/0173424 A1 6/2014 Hogeg et al.
2014/0173457 A1 6/2014 Wang et al.
2014/0173460 A1 6/2014 Kim
2014/0180829 A1 6/2014 Umeda
2014/0181193 A1 6/2014 Narasimhan et al.
2014/0181934 A1 6/2014 Mayblum et al.
2014/0188815 A1 7/2014 Mentz et al.
2014/0189592 A1 7/2014 Benchenaa et al.
2014/0192737 A1 7/2014 Belghoul et al.
2014/0194101 A1 7/2014 Mullen et al.
2014/0201527 A1 7/2014 Krivorot
2014/0207679 A1 7/2014 Cho
2014/0207860 A1 7/2014 Wang et al.
2014/0214471 A1 7/2014 Schreiner, III
2014/0222564 A1 8/2014 Kranendonk et al.
2014/0222570 A1 8/2014 Devolites et al.
2014/0222913 A1 8/2014 Cathcart et al.
2014/0236468 A1 8/2014 Dave et al.
2014/0240125 A1 8/2014 Burch et al.
2014/0244765 A1 8/2014 Smith et al.
2014/0250465 A1 9/2014 Mulholland et al.
2014/0258405 A1 9/2014 Perkin
2014/0265359 A1 9/2014 Cheng et al.
2014/0266703 A1 9/2014 Dalley, Jr. et al.
2014/0279040 A1 9/2014 Kuboyama
2014/0279061 A1 9/2014 Elimeliah et al.
2014/0279128 A1 9/2014 Sagebin
2014/0279269 A1 9/2014 Brantley et al.
2014/0279436 A1 9/2014 Dorsey et al.
2014/0279540 A1 9/2014 Jackson
2014/0280140 A1 9/2014 Ling et al.
2014/0280537 A1 9/2014 Pridmore et al.
2014/0282068 A1 9/2014 Levkovitz et al.
2014/0282096 A1 9/2014 Rubinstein et al.
2014/0286566 A1 9/2014 Rhoads
2014/0287779 A1 9/2014 O'keefe et al.
2014/0289077 A1 9/2014 Osman
2014/0289157 A1 9/2014 Kenna, III et al.
2014/0289603 A1 9/2014 Subrahmanya et al.
2014/0289833 A1 9/2014 Briceno
2014/0298210 A1 10/2014 Park et al.
2014/0304622 A1 10/2014 Jorasch et al.
2014/0306986 A1 10/2014 Gottesman et al.
2014/0317302 A1 10/2014 Naik
2014/0320662 A1 10/2014 Mcnamee et al.
2014/0324627 A1 10/2014 Haver et al.
2014/0324629 A1 10/2014 Jacobs
2014/0325383 A1 10/2014 Brown et al.
2014/0325569 A1 10/2014 Suzuki et al.
2014/0331188 A1 11/2014 Sandstrom et al.
2014/0337123 A1 11/2014 Nuernberg et al.
2014/0344698 A1 11/2014 Hohteri et al.
2014/0359024 A1 12/2014 Spiegel
2014/0359032 A1 12/2014 Spiegel et al.
2014/0359656 A1 12/2014 Banica et al.
2014/0372844 A1 12/2014 Zumkhawala
2014/0372850 A1 12/2014 Campbell et al.
2014/0379683 A1 12/2014 Bazaz
2015/0012603 A1 1/2015 Saito
2015/0013016 A1 1/2015 Kanter et al.
2015/0015680 A1 1/2015 Wang et al.
2015/0018649 A1 1/2015 Lisogurski et al.
2015/0020086 A1 1/2015 Chen et al.
2015/0040011 A1 2/2015 Chun
2015/0042572 A1 2/2015 Lombardi et al.
2015/0043033 A1 2/2015 Sugimoto
2015/0046278 A1 2/2015 Pei et al.
2015/0055197 A1 2/2015 Romanoff et al.
2015/0058957 A1 2/2015 Halliday et al.
2015/0063724 A1 3/2015 Ikeda et al.
2015/0071619 A1 3/2015 Brough
2015/0081630 A1 3/2015 Linsalata et al.
2015/0087263 A1 3/2015 Branscomb et al.
2015/0088622 A1 3/2015 Ganschow et al.
2015/0094083 A1 4/2015 Ngo
2015/0094093 A1 4/2015 Pierce et al.
2015/0094106 A1 4/2015 Grossman et al.
2015/0095020 A1 4/2015 Leydon
2015/0096042 A1 4/2015 Mizrachi
2015/0103097 A1 4/2015 Li
2015/0116529 A1 4/2015 Wu et al.

(56) References Cited

U.S. PATENT DOCUMENTS

2015/0127643 A1 5/2015 Cohen et al.
2015/0127754 A1 5/2015 Clark et al.
2015/0130178 A1 5/2015 Clements
2015/0134318 A1 5/2015 Cuthbert et al.
2015/0142753 A1 5/2015 Soon-Shiong
2015/0149091 A1 5/2015 Milton et al.
2015/0154650 A1 6/2015 Umeda
2015/0161178 A1 6/2015 B Doiu
2015/0161822 A1 6/2015 Basu
2015/0163629 A1 6/2015 Cheung
2015/0168174 A1 6/2015 Abramson et al.
2015/0168175 A1 6/2015 Abramson et al.
2015/0169827 A1 6/2015 Laborde
2015/0172534 A1 6/2015 Miyakawa et al.
2015/0177937 A1 6/2015 Poletto et al.
2015/0178260 A1 6/2015 Brunson
2015/0185990 A1 7/2015 Thompson
2015/0186497 A1 7/2015 Patton et al.
2015/0188869 A1 7/2015 Gilad et al.
2015/0189475 A1 7/2015 Schillings
2015/0193685 A1 7/2015 Srinivasan et al.
2015/0199082 A1 7/2015 Scholler et al.
2015/0206349 A1 7/2015 Rosenthal et al.
2015/0220492 A1 8/2015 Simeonov et al.
2015/0222814 A1 8/2015 Li et al.
2015/0227602 A1 8/2015 Ramu et al.
2015/0237472 A1 8/2015 Alsina et al.
2015/0237473 A1 8/2015 Koepke
2015/0241231 A1 8/2015 Abramson et al.
2015/0248683 A1 9/2015 Walkingshaw
2015/0249710 A1 9/2015 Stefansson et al.
2015/0254704 A1 9/2015 Kothe et al.
2015/0261917 A1 9/2015 Smith
2015/0262208 A1 9/2015 Bjontegard
2015/0269624 A1 9/2015 Cheng et al.
2015/0271779 A1 9/2015 Alavudin
2015/0287072 A1 10/2015 Golden et al.
2015/0294367 A1 10/2015 Oberbrunner et al.
2015/0312184 A1 10/2015 Langholz et al.
2015/0325268 A1 11/2015 Berger et al.
2015/0326510 A1 11/2015 Tomlinson et al.
2015/0332310 A1 11/2015 Cui et al.
2015/0332317 A1 11/2015 Cui et al.
2015/0332325 A1 11/2015 Sharma et al.
2015/0332329 A1 11/2015 Luo et al.
2015/0334077 A1 11/2015 Feldman
2015/0334347 A1 11/2015 Kang et al.
2015/0341747 A1 11/2015 Barrand et al.
2015/0350136 A1 12/2015 Flynn, III et al.
2015/0356190 A1 12/2015 Rotem et al.
2015/0358806 A1 12/2015 Salqvist
2015/0365795 A1 12/2015 Allen et al.
2015/0367233 A1 12/2015 Hicks et al.
2015/0378502 A1 12/2015 Hu et al.
2015/0381682 A1 12/2015 Rao et al.
2015/0381688 A1 12/2015 Jenkins et al.
2016/0006927 A1 1/2016 Sehn
2016/0014063 A1 1/2016 Hogeg et al.
2016/0019592 A1 1/2016 Muttineni et al.
2016/0021153 A1 1/2016 Hull et al.
2016/0034253 A1 2/2016 Bang et al.
2016/0034712 A1 2/2016 Patton et al.
2016/0034786 A1 2/2016 Suri et al.
2016/0048369 A1 2/2016 Zenoff
2016/0050704 A1 2/2016 von Sneidern et al.
2016/0055250 A1 2/2016 Rush
2016/0085773 A1 3/2016 Chang et al.
2016/0085863 A1 3/2016 Allen et al.
2016/0085994 A1 3/2016 Pereira
2016/0086670 A1 3/2016 Gross et al.
2016/0092561 A1 3/2016 Liu et al.
2016/0092962 A1 3/2016 Wasserman et al.
2016/0098742 A1 4/2016 Minicucci et al.
2016/0099901 A1 4/2016 Allen et al.
2016/0105387 A1 4/2016 Jackson
2016/0119272 A1 4/2016 Rubinstein et al.
2016/0127871 A1 5/2016 Smith et al.
2016/0134941 A1 5/2016 Selvaraj
2016/0139748 A1 5/2016 Iwaizumi et al.
2016/0149843 A1 5/2016 Spicer et al.
2016/0180887 A1 6/2016 Sehn
2016/0182422 A1 6/2016 Sehn et al.
2016/0182875 A1 6/2016 Sehn
2016/0196584 A1 7/2016 Franklin et al.
2016/0210657 A1 7/2016 Chittilappilly et al.
2016/0219402 A1 7/2016 Zimerman et al.
2016/0234023 A1 8/2016 Mozer et al.
2016/0234556 A1 8/2016 Berridge
2016/0239248 A1 8/2016 Sehn
2016/0239457 A1 8/2016 Gross et al.
2016/0247537 A1 8/2016 Ricciardi
2016/0253833 A1 9/2016 Lew
2016/0253912 A1 9/2016 Heilman et al.
2016/0274705 A1 9/2016 Kapadia et al.
2016/0277419 A1 9/2016 Allen et al.
2016/0286244 A1 9/2016 Chang et al.
2016/0292735 A1 10/2016 Kim
2016/0321708 A1 11/2016 Sehn
2016/0321765 A1 11/2016 Malone et al.
2016/0352659 A1 12/2016 Krishnamoorth
2016/0359957 A1 12/2016 Laliberte
2016/0359987 A1 12/2016 Laliberte
2016/0364668 A1 12/2016 Young et al.
2017/0006094 A1 1/2017 Abou Mahmoud et al.
2017/0026786 A1 1/2017 Barron et al.
2017/0061308 A1 3/2017 Chen et al.
2017/0078760 A1 3/2017 Christoph et al.
2017/0091795 A1 3/2017 Mansour et al.
2017/0111617 A1 4/2017 Kuwahara et al.
2017/0127233 A1 5/2017 Liang et al.
2017/0132647 A1 5/2017 Bostick et al.
2017/0134821 A1 5/2017 D'Amelio et al.
2017/0149717 A1 5/2017 Sehn
2017/0161382 A1 6/2017 Ouimet et al.
2017/0164161 A1 6/2017 Gupta et al.
2017/0185256 A1 6/2017 Bennett
2017/0186038 A1 6/2017 Glover et al.
2017/0222962 A1 8/2017 Gauglitz et al.
2017/0230315 A1 8/2017 Zubas et al.
2017/0263029 A1 9/2017 Yan et al.
2017/0287006 A1 10/2017 Azmoodeh et al.
2017/0295250 A1 10/2017 Samaranayake et al.
2017/0310888 A1 10/2017 Wright et al.
2017/0329481 A1 11/2017 Stoop et al.
2017/0339521 A1 11/2017 Colonna et al.
2017/0359686 A1 12/2017 Colonna et al.
2017/0374003 A1 12/2017 Allen et al.
2017/0374508 A1 12/2017 Davis et al.
2018/0013975 A1 1/2018 Tang
2018/0069817 A1 3/2018 Constantinides
2018/0103002 A1 4/2018 Sehn
2018/0121957 A1 5/2018 Cornwall et al.
2018/0131663 A1 5/2018 Halliday et al.
2018/0189835 A1 7/2018 Deluca et al.
2018/0225687 A1 8/2018 Ahmed et al.
2018/0278562 A1 9/2018 Tang
2018/0279016 A1 9/2018 Tang
2018/0301169 A1 10/2018 Ricciardi
2018/0315133 A1 11/2018 Brody et al.
2018/0315134 A1 11/2018 Amitay et al.
2018/0316575 A1 11/2018 Son et al.
2019/0097812 A1 3/2019 Toth
2019/0220932 A1 7/2019 Amitay et al.
2019/0222657 A1 7/2019 Simkhai et al.
2019/0237106 A1 8/2019 Sehn
2019/0342699 A1 11/2019 Sehn et al.
2019/0372991 A1 12/2019 Allen et al.
2020/0057590 A1 2/2020 Sehn
2020/0105304 A1 4/2020 Sehn
2020/0112531 A1 4/2020 Tang
2020/0193053 A1 6/2020 Murphy et al.
2020/0204726 A1 6/2020 Ebsen et al.
2020/0213804 A1 7/2020 Sehn et al.
2020/0288270 A1 9/2020 Allen et al.

(56) References Cited

U.S. PATENT DOCUMENTS

| | | | |
|---|---|---|---|
| 2020/0329336 | A1 | 10/2020 | Sehn et al. |
| 2020/0359166 | A1 | 11/2020 | Noeth et al. |
| 2020/0359167 | A1 | 11/2020 | Noeth et al. |
| 2020/0411058 | A1 | 12/2020 | Sehn |
| 2021/0006526 | A1 | 1/2021 | Allen et al. |
| 2021/0006527 | A1 | 1/2021 | Allen et al. |
| 2021/0006528 | A1 | 1/2021 | Allen et al. |
| 2021/0014238 | A1 | 1/2021 | Allen et al. |
| 2021/0073249 | A1 | 3/2021 | Chang et al. |
| 2021/0273903 | A1 | 9/2021 | Allen et al. |
| 2021/0342473 | A1 | 11/2021 | Murphy et al. |
| 2022/0086340 | A1 | 3/2022 | Ebsen et al. |
| 2022/0318281 | A1 | 10/2022 | Chang et al. |
| 2023/0171261 | A1 | 6/2023 | Allen et al. |
| 2024/0086968 | A1 | 3/2024 | Azmoodeh et al. |
| 2024/0098096 | A1 | 3/2024 | Allen et al. |
| 2024/0323642 | A1 | 9/2024 | Noeth et al. |
| 2025/0016523 | A1 | 1/2025 | Noeth et al. |
| 2025/0106585 | A1 | 3/2025 | Noeth et al. |

FOREIGN PATENT DOCUMENTS

| | | | | |
|---|---|---|---|---|
| CA | 2910158 | C | 6/2019 | |
| CN | 1879071 | | 12/2006 | |
| CN | 101635763 | A | 1/2010 | |
| CN | 101981987 | A | 2/2011 | |
| CN | 102118419 | A | 7/2011 | |
| CN | 102236848 | A | 11/2011 | |
| CN | 102238107 | A | 11/2011 | |
| CN | 102572575 | A | 7/2012 | |
| CN | 102930107 | A | 2/2013 | |
| CN | 102945276 | | 2/2013 | |
| CN | 103020303 | A | 4/2013 | |
| CN | 103095768 | A | 5/2013 | |
| CN | 103200238 | A | 7/2013 | |
| CN | 103248761 | A | 8/2013 | |
| CN | 103297936 | A | 9/2013 | |
| CN | 103391368 | A | 11/2013 | |
| CN | 103440767 | | 12/2013 | |
| CN | 103533501 | | 1/2014 | |
| CN | 103699662 | A | 4/2014 | |
| CN | 103947229 | A | 7/2014 | |
| CN | 104969219 | A | 10/2015 | |
| CN | 105760466 | A | 7/2016 | |
| CN | 106165463 | | 11/2016 | |
| CN | 106663264 | A | 5/2017 | |
| CN | 107004225 | A | 8/2017 | |
| CN | 107111828 | A | 8/2017 | |
| CN | 107251006 | A | 10/2017 | |
| CN | 107637099 | A | 1/2018 | |
| CN | 107710772 | A | 2/2018 | |
| CN | 109247071 | A | 1/2019 | |
| CN | 106663264 | B | 5/2019 | |
| CN | 110163663 | A | 8/2019 | |
| CN | 110249359 | A | 9/2019 | |
| CN | 110462616 | A | 11/2019 | |
| CN | 107637099 | B | 10/2020 | |
| CN | 112040410 | A | 12/2020 | |
| CN | 107111828 | B | 5/2021 | |
| CN | 113112306 | A | 7/2021 | |
| CN | 112040410 | | 10/2022 | |
| CN | 110249359 | B | 9/2023 | |
| CN | 117252637 | | 12/2023 | |
| DE | 202015009885 | U1 | 1/2021 | |
| EP | 2051480 | A1 | 4/2009 | |
| EP | 2151797 | A1 | 2/2010 | |
| EP | 3234794 | B1 | 5/2020 | |
| EP | 3272078 | | 1/2022 | |
| EP | 3941000 | | 2/2024 | |
| GB | 2399928 | A | 9/2004 | |
| JP | 2012104106 | A | 5/2012 | |
| KR | 19990073076 | A | 10/1999 | |
| KR | 20010078417 | A | 8/2001 | |
| KR | 20060008469 | A | 1/2006 | |
| KR | 20060043137 | A | 5/2006 | |
| KR | 1020060038872 | A | 5/2006 | |
| KR | 20060102677 | A | 9/2006 | |
| KR | 20070121728 | A | 12/2007 | |
| KR | 1020080006729 | A | 1/2008 | |
| KR | 1020080017854 | A | 2/2008 | |
| KR | 20080028962 | A | 4/2008 | |
| KR | 20100006371 | A | 1/2010 | |
| KR | 20120121452 | A | 11/2012 | |
| KR | 20120125381 | A | 11/2012 | |
| KR | 1020120140404 | A | 12/2012 | |
| KR | 20130061724 | A | 6/2013 | |
| KR | 20130091878 | A | 8/2013 | |
| KR | 20140066278 | A | 6/2014 | |
| KR | 1020140066795 | A | 6/2014 | |
| KR | 1020140115413 | A | 10/2014 | |
| KR | 101457964 | B1 | 11/2014 | |
| KR | 20150091381 | A | 8/2015 | |
| KR | 1020150100781 | | 9/2015 | |
| KR | 20160019900 | A | 2/2016 | |
| KR | 20160086909 | | 7/2016 | |
| KR | 10-1822920 | | 1/2018 | |
| KR | 101869473 | | 6/2018 | |
| KR | 101933840 | B1 | 12/2018 | |
| KR | 101983523 | B1 | 5/2019 | |
| KR | 102017508 | B1 | 8/2019 | |
| KR | 102021727 | B1 | 9/2019 | |
| KR | 102035405 | B1 | 10/2019 | |
| KR | 102051788 | B1 | 12/2019 | |
| KR | 102057592 | B1 | 12/2019 | |
| KR | 102077441 | B1 | 2/2020 | |
| KR | 102094065 | B1 | 3/2020 | |
| KR | 20177014135 | A | 3/2020 | |
| KR | 102111446 | B1 | 5/2020 | |
| KR | 102163528 | B1 | 9/2020 | |
| KR | 102207784 | B1 | 1/2021 | |
| KR | 102217723 | B1 | 2/2021 | |
| KR | 102344482 | B1 | 12/2021 | |
| KR | 102371138 | | 3/2022 | |
| KR | 102495686 | | 2/2023 | |
| KR | 102524426 | | 4/2023 | |
| KR | 102662169 | | 4/2024 | |
| KR | 102700067 | | 8/2024 | |
| WO | WO-1996024213 | A1 | 8/1996 | |
| WO | WO-1999063453 | A1 | 12/1999 | |
| WO | WO-2000058882 | A1 | 10/2000 | |
| WO | WO-2001029642 | A1 | 4/2001 | |
| WO | WO-2001050703 | A3 | 7/2001 | |
| WO | WO-2006118755 | A2 | 11/2006 | |
| WO | WO-2007092668 | A2 | 8/2007 | |
| WO | WO-2009043020 | A2 | 4/2009 | |
| WO | WO-2011040821 | A1 | 4/2011 | |
| WO | WO-2011119407 | A1 * | 9/2011 | ............ G06Q 10/00 |
| WO | WO-2012000107 | A1 | 1/2012 | |
| WO | WO-2013006584 | A1 | 1/2013 | |
| WO | WO-2013008238 | A1 | 1/2013 | |
| WO | WO-2013008251 | A2 | 1/2013 | |
| WO | WO-2013045753 | A1 | 4/2013 | |
| WO | WO-2013058897 | A1 | 4/2013 | |
| WO | WO-2013126784 | A2 | 8/2013 | |
| WO | 2013155143 | | 10/2013 | |
| WO | WO-2014006129 | A1 | 1/2014 | |
| WO | WO-2014031562 | A1 | 2/2014 | |
| WO | WO-2014031899 | A1 | 2/2014 | |
| WO | WO-2014068573 | A1 | 5/2014 | |
| WO | WO-2014093668 | A1 | 6/2014 | |
| WO | WO-2014115136 | A1 | 7/2014 | |
| WO | WO-2014172388 | A1 | 10/2014 | |
| WO | WO-2014194262 | A2 | 12/2014 | |
| WO | WO-2015085176 | A1 | 6/2015 | |
| WO | WO-2015192026 | A1 | 12/2015 | |
| WO | WO-2016007285 | A1 | 1/2016 | |
| WO | WO-2016044424 | A1 | 3/2016 | |
| WO | WO-2016054562 | A1 | 4/2016 | |
| WO | WO-2016065131 | A1 | 4/2016 | |
| WO | WO-2016100318 | A2 | 6/2016 | |
| WO | WO-2016100318 | A3 | 6/2016 | |
| WO | WO-2016100342 | A1 | 6/2016 | |
| WO | WO-2016/112299 | A1 | 7/2016 | |
| WO | WO-2016123381 | A1 | 8/2016 | |

(56) References Cited

FOREIGN PATENT DOCUMENTS

| | | | |
|---|---|---|---|
| WO | WO-2016149594 | A1 | 9/2016 |
| WO | WO-2016179166 | A1 | 11/2016 |
| WO | WO-2016179235 | A1 | 11/2016 |
| WO | WO-2016202890 | A1 | 12/2016 |
| WO | WO-2017106529 | A1 | 6/2017 |
| WO | WO-2017176739 | A1 | 10/2017 |
| WO | WO-2017176992 | A1 | 10/2017 |
| WO | WO-2018005644 | A1 | 1/2018 |
| WO | WO-2018144931 | A1 | 8/2018 |
| WO | WO-2018183119 | A1 | 10/2018 |

OTHER PUBLICATIONS

US 10,542,011 B2, 01/2020, Allen et al. (withdrawn)
"U.S. Appl. No. 17/035,575, Non Final Office Action mailed May 26, 2022", 31 pgs.
"U.S. Appl. No. 15/474,821, Response filed May 31, 2022 to Final Office Action mailed Apr. 1, 2022", 10 pgs.
"U.S. Appl. No. 17/112,676, Response filed Jun. 16, 2022 to Non Final Office Action mailed Apr. 25, 2022", 12 pgs.
"U.S. Appl. No. 15/474,821, Non Final Office Action mailed Jun. 20, 2022", 43 pgs.
"U.S. Appl. No. 16/428,210, Examiner Interview Summary mailed Jun. 23, 2022", 2 pgs.
"U.S. Appl. No. 16/943,706, Examiner Interview Summary mailed Jun. 23, 2022", 2 pgs.
"U.S. Appl. No. 16/943,804, Examiner Interview Summary mailed Jun. 23, 2022", 2 pgs.
"U.S. Appl. No. 17/112,676, Final Office Action mailed Jun. 29, 2022", 35 pgs.
"Korean Application Serial No. 10-2022-7007037, Notice of Preliminary Rejection mailed Jul. 5, 2022", W English Translation, 7 pgs.
"U.S. Appl. No. 17/699,985, Non Final Office Action mailed Jul. 25, 2022", 7 pgs.
"Chinese Application Serial No. 202010978249.5, Office Action mailed Mar. 11, 2022", With English translation, 8 pgs.
"U.S. Appl. No. 17/112,676, Non Final Office Action mailed Apr. 25, 2022".
"European Application Serial No. 21218403.0, Extended European Search Report mailed Apr. 20, 2022", 13 pgs.
"A Whole New Story", Snap, Inc., [Online] Retrieved from the Internet: <URL: https://www.snap.com/en-us/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"U.S. Appl. No. 14/304,855, Corrected Notice of Allowance mailed Jun. 26, 2015", 8 pgs.
"U.S. Appl. No. 14/304,855, Final Office Action mailed Feb. 18, 2015", 10 pgs.
"U.S. Appl. No. 14/304,855, Non Final Office Action mailed Mar. 18, 2015", 9 pgs.
"U.S. Appl. No. 14/304,855, Non Final Office Action mailed Oct. 22, 2014", 11 pgs.
"U.S. Appl. No. 14/304,855, Notice of Allowance mailed Jun. 1, 2015", 11 pgs.
"U.S. Appl. No. 14/304,855, Response filed Feb. 25, 2015 to Final Office Action mailed Feb. 18, 2015", 5 pgs.
"U.S. Appl. No. 14/304,855, Response filed Apr. 1, 2015 to Non Final Office Action mailed Mar. 18, 2015", 4 pgs.
"U.S. Appl. No. 14/304,855, Response filed Nov. 7, 2014 to Non Final Office Action mailed Oct. 22, 2014", 5 pgs.
"U.S. Appl. No. 14/494,226, Appeal Brief filed Mar. 1, 2019 in response to Final Office Action mailed Jun. 1, 2018", 29 pgs.
"U.S. Appl. No. 14/494,226, Appeal Decision mailed Feb. 26, 2021", 8 pgs.
"U.S. Appl. No. 14/494,226, Corrected Notice of Allowability mailed Sep. 28, 2021", 2 pgs.
"U.S. Appl. No. 14/494,226, Corrected Notice of Allowability mailed Dec. 6, 2021", 2 pgs.
"U.S. Appl. No. 14/494,226, Examiner Interview Summary mailed Oct. 27, 2016", 3 pgs.
"U.S. Appl. No. 14/494,226, Examiner Interview Summary mailed Dec. 20, 2017", 2 pgs.
"U.S. Appl. No. 14/494,226, Final Office Action mailed Mar. 7, 2017", 34 pgs.
"U.S. Appl. No. 14/494,226, Final Office Action mailed Jun. 1, 2018", 33 pgs.
"U.S. Appl. No. 14/494,226, Non Final Office Action mailed Sep. 7, 2017", 36 pgs.
"U.S. Appl. No. 14/494,226, Non Final Office Action mailed Sep. 12, 2016", 32 pgs.
"U.S. Appl. No. 14/494,226, Notice of Allowance mailed Jun. 9, 2021", 7 pgs.
"U.S. Appl. No. 14/494,226, Notice of Allowance mailed Aug. 25, 2021", 5 pgs.
"U.S. Appl. No. 14/494,226, Response filed Jan. 8, 2018 to Non Final Office Action mailed Sep. 7, 2017", 15 pgs.
"U.S. Appl. No. 14/494,226, Response filed Jul. 7, 2017 to Final Office Action mailed Mar. 7, 2017", 13 pgs.
"U.S. Appl. No. 14/494,226, Response filed Dec. 12, 2016 to Non Final Office Action mailed Sep. 12, 2016", 16 pgs.
"U.S. Appl. No. 14/505,478, Advisory Action mailed Apr. 14, 2015", 3 pgs.
"U.S. Appl. No. 14/505,478, Corrected Notice of Allowance mailed May 18, 2016", 2 pgs.
"U.S. Appl. No. 14/505,478, Corrected Notice of Allowance mailed Jul. 22, 2016", 2 pgs.
"U.S. Appl. No. 14/505,478, Final Office Action mailed Mar. 17, 2015", 16 pgs.
"U.S. Appl. No. 14/505,478, Non Final Office Action mailed Jan. 27, 2015", 13 pgs.
"U.S. Appl. No. 14/505,478, Non Final Office Action mailed Sep. 4, 2015", 19 pgs.
"U.S. Appl. No. 14/505,478, Notice of Allowance mailed Apr. 28, 2016", 11 pgs.
"U.S. Appl. No. 14/505,478, Notice of Allowance mailed Aug. 26, 2016", 11 pgs.
"U.S. Appl. No. 14/505,478, Response filed Jan. 30, 2015 to Non Final Office Action mailed Jan. 27, 2015", 10 pgs.
"U.S. Appl. No. 14/505,478, Response filed Mar. 4, 2016 to Non Final Office Action mailed Sep. 4, 2015", 12 pgs.
"U.S. Appl. No. 14/505,478, Response filed Apr. 1, 2015 to Final Office Action mailed Mar. 17, 2015", 6 pgs.
"U.S. Appl. No. 14/506,478, Response filed Aug. 17, 2015 to Advisory Action mailed Apr. 14, 2015", 10 pgs.
"U.S. Appl. No. 14/523,728, Non Final Office Action mailed Dec. 12, 2014", 10 pgs.
"U.S. Appl. No. 14/523,728, Notice of Allowance mailed Mar. 24, 2015", 8 pgs.
"U.S. Appl. No. 14/523,728, Notice of Allowance mailed Apr. 15, 2015", 8 pgs.
"U.S. Appl. No. 14/523,728, Notice of Allowance mailed Jun. 5, 2015", 8 pgs.
"U.S. Appl. No. 14/523,728, Response filed Aug. 25, 2014 to Non Final Office Action mailed Jan. 16, 2015", 5 pgs.
"U.S. Appl. No. 14/529,064, Examiner Interview Summary mailed May 23, 2016", 3 pgs.
"U.S. Appl. No. 14/529,064, Examiner Interview Summary mailed Nov. 17, 2016", 3 pgs.
"U.S. Appl. No. 14/529,064, Final Office Action mailed Jan. 25, 2018", 39 pgs.
"U.S. Appl. No. 14/529,064, Final Office Action mailed Aug. 11, 2015", 23 pgs.
"U.S. Appl. No. 14/529,064, Final Office Action mailed Aug. 24, 2016", 23 pgs.
"U.S. Appl. No. 14/529,064, Non Final Office Action mailed Mar. 12, 2015", 20 pgs.
"U.S. Appl. No. 14/529,064, Non Final Office Action mailed Apr. 6, 2017", 25 pgs.

(56) References Cited

OTHER PUBLICATIONS

"U.S. Appl. No. 14/529,064, Non Final Office Action mailed Apr. 18, 2016", 21 pgs.
"U.S. Appl. No. 14/529,064, Non Final Office Action mailed Jul. 13, 2018", 38 pgs.
"U.S. Appl. No. 14/529,064, Response filed Feb. 5, 2015 to Restriction Requirement mailed Feb. 2, 2015", 6 pgs.
"U.S. Appl. No. 14/529,064, Response filed Mar. 26, 2015 to Non Final Office Action mailed Mar. 12, 2015", 8 pgs.
"U.S. Appl. No. 14/529,064, Response filed May 25, 2018 to Final Office Action mailed Jan. 25, 2018", 20 pgs.
"U.S. Appl. No. 14/529,064, Response filed Jul. 18, 2016 to Non Final Office Action mailed Apr. 18, 2016", 20 pgs.
"U.S. Appl. No. 14/529,064, Response filed Sep. 6, 2017 to Non Final Office Action mailed Apr. 6, 2017", 19 pgs.
"U.S. Appl. No. 14/529,064, Response filed Oct. 12, 2015 to Final Office Action mailed Aug. 11, 2015", 19 pgs.
"U.S. Appl. No. 14/529,064, Response filed Dec. 21, 2016 to Final Office Action mailed Aug. 24, 2016", 17 pgs.
"U.S. Appl. No. 14/529,064, Restriction Requirement mailed Feb. 2, 2015", 5 pgs.
"U.S. Appl. No. 14/539,391, Notice of Allowance mailed Mar. 5, 2015", 17 pgs.
"U.S. Appl. No. 14/548,590, Advisory Action mailed Apr. 19, 2018", 2 pgs.
"U.S. Appl. No. 14/548,590, Advisory Action mailed Nov. 18, 2016", 3 pgs.
"U.S. Appl. No. 14/548,590, Appeal Brief Filed Apr. 20, 2018", 28 pgs.
"U.S. Appl. No. 14/548,590, Appeal Decision mailed Mar. 26, 2020", 13 pgs.
"U.S. Appl. No. 14/548,590, Final Office Action mailed Jul. 5, 2016", 16 pgs.
"U.S. Appl. No. 14/548,590, Final Office Action mailed Jul. 18, 2017", 20 pgs.
"U.S. Appl. No. 14/548,590, Final Office Action mailed Sep. 16, 2015", 15 pgs.
"U.S. Appl. No. 14/548,590, Non Final Office Action mailed Jan. 9, 2017", 14 pgs.
"U.S. Appl. No. 14/548,590, Non Final Office Action mailed Feb. 11, 2016", 16 pgs.
"U.S. Appl. No. 14/548,590, Non Final Office Action mailed Apr. 20, 2015", 14 pgs.
"U.S. Appl. No. 14/548,590, Notice of Allowance mailed Jun. 17, 2020", 9 pgs.
"U.S. Appl. No. 14/548,590, Response filed May 9, 2017 to Non Final Office Action mailed Jan. 9, 2017", 17 pgs.
"U.S. Appl. No. 14/548,590, Response filed May 10, 2016 to Non Final Office Action mailed Feb. 11, 2016", 14 pgs.
"U.S. Appl. No. 14/548,590, Response filed Nov. 7, 2016 to Final Office Action mailed Jul. 5, 2016", 14 pgs.
"U.S. Appl. No. 14/548,590, Response filed Dec. 16, 2015 to Final Office Action mailed Sep. 16, 2015", 13 pgs.
"U.S. Appl. No. 14/548,590, Response filed Jun. 16, 2015 to Non Final Office Action mailed Apr. 20, 2015", 19 pgs.
"U.S. Appl. No. 14/578,258, Examiner Interview Summary mailed Nov. 25, 2015", 3 pgs.
"U.S. Appl. No. 14/578,258, Non Final Office Action mailed Jun. 10, 2015", 12 pgs.
"U.S. Appl. No. 14/578,258, Notice of Allowance mailed Feb. 26, 2016", 5 pgs.
"U.S. Appl. No. 14/578,258, Response filed Dec. 10, 2015 to Non Final Office Action mailed Jun. 10, 2015", 11 pgs.
"U.S. Appl. No. 14/578,271, Final Office Action mailed Dec. 3, 2015", 15 pgs.
"U.S. Appl. No. 14/578,271, Non Final Office Action mailed Aug. 7, 2015", 12 pgs.
"U.S. Appl. No. 14/578,271, Notice of Allowance mailed Dec. 7, 2016", 7 pgs.
"U.S. Appl. No. 14/578,271, Response filed Feb. 9, 2016 to Final Office Action mailed Dec. 3, 2015", 10 pgs.
"U.S. Appl. No. 14/578,271, Response filed Jun. 19, 2015 to Restriction Requirement mailed Apr. 23, 2015", 6 pgs.
"U.S. Appl. No. 14/578,271, Response filed Oct. 28, 2015 to Non Final Office Action mailed Aug. 7, 2015", 9 pgs.
"U.S. Appl. No. 14/578,271, Restriction Requirement mailed Apr. 23, 2015", 8 pgs.
"U.S. Appl. No. 14/594,410, Non Final Office Action mailed Jan. 4, 2016", 10 pgs.
"U.S. Appl. No. 14/594,410, Notice of Allowance mailed Aug. 2, 2016", 5 pgs.
"U.S. Appl. No. 14/594,410, Notice of Allowance mailed Dec. 15, 2016", 6 pgs.
"U.S. Appl. No. 14/594,410, Response filed Jul. 1, 2016 to Non Final Office Action mailed Jan. 4, 2016", 10 pgs.
"U.S. Appl. No. 14/612,692, Examiner Interview Summary mailed Jan. 29, 2016", 5 pgs.
"U.S. Appl. No. 14/612,692, Examiner Interview Summary mailed Jul. 6, 2016", 4 pgs.
"U.S. Appl. No. 14/612,692, Examiner Interview Summary mailed Aug. 14, 2015", 3 pgs.
"U.S. Appl. No. 14/612,692, Examiner Interview Summary mailed Sep. 8, 2016", 3 pgs.
"U.S. Appl. No. 14/612,692, Final Office Action mailed Aug. 15, 2016", 18 pgs.
"U.S. Appl. No. 14/612,692, Final Office Action mailed Nov. 23, 2015", 15 pgs.
"U.S. Appl. No. 14/612,692, Non Final Office Action mailed Jan. 3, 2017", 17 pgs.
"U.S. Appl. No. 14/612,692, Non Final Office Action mailed Mar. 28, 2016", 15 pgs.
"U.S. Appl. No. 14/612,692, Non Final Office Action mailed Jul. 20, 2015", 25 pgs.
"U.S. Appl. No. 14/612,692, Response filed Feb. 23, 2016 to Final Office Action mailed Nov. 23, 2015", 10 pgs.
"U.S. Appl. No. 14/612,692, Response filed May 3, 2017 to Non Final Office Action mailed Jan. 3, 2017", 18 pgs.
"U.S. Appl. No. 14/612,692, Response filed Nov. 14, 2016 to Final Office Action mailed Aug. 15, 2016", 15 pgs.
"U.S. Appl. No. 14/612,692, Response filed Jun. 28, 2016 to Non Final Office Action mailed Mar. 28, 2016", 14 pgs.
"U.S. Appl. No. 14/612,692. Response filed Oct. 19, 2015 to Non Final Office Action mailed Jul. 20, 2015", 11 pgs.
"U.S. Appl. No. 14/634,417, Advisory Action mailed Mar. 14, 2017", 3 pgs.
"U.S. Appl. No. 14/634,417, Final Office Action mailed Jan. 31, 2017", 27 pgs.
"U.S. Appl. No. 14/634,417, Non Final Office Action mailed Aug. 30, 2016", 23 pgs.
"U.S. Appl. No. 14/634,417, Response filed Mar. 2, 2017 to Final Office Action mailed Jan. 31, 2017", 23 pgs.
"U.S. Appl. No. 14/634,417, Response filed Nov. 30, 2016 to Non Final Office Action mailed Aug. 30, 2016", 18 pgs.
"U.S. Appl. No. 14/682,259, Notice of Allowance mailed Jul. 27, 2015", 17 pgs.
"U.S. Appl. No. 14/704,212, Final Office Action mailed Jun. 17, 2016", 12 pgs.
"U.S. Appl. No. 14/704,212, Non Final Office Action mailed Dec. 4, 2015", 17 pgs.
"U.S. Appl. No. 14/704,212, Response filed Mar. 4, 2016 to Non Final Office Action mailed Dec. 4, 2015", 11 pgs.
"U.S. Appl. No. 14/738,069, Non Final Office Action mailed Mar. 21, 2016", 12 pgs.
"U.S. Appl. No. 14/738,069, Notice of Allowance mailed Aug. 17, 2016", 6 pgs.
"U.S. Appl. No. 14/738,069, Response filed Jun. 10, 2016 to Non Final Office Action mailed Mar. 21, 2016", 10 pgs.
"U.S. Appl. No. 14/808,283, Notice of Allowance mailed Apr. 12, 2016", 9 pgs.
"U.S. Appl. No. 14/808,283, Notice of Allowance mailed Jul. 14, 2016", 8 pgs.

(56) References Cited

OTHER PUBLICATIONS

"U.S. Appl. No. 14/808,283, Preliminary Amendment filed Jul. 24, 2015", 8 pgs.
"U.S. Appl. No. 14/841,987, Notice of Allowance mailed Mar. 29, 2017", 17 pgs.
"U.S. Appl. No. 14/841,987, Notice of Allowance mailed Aug. 7, 2017", 8 pgs.
"U.S. Appl. No. 14/967,472, Final Office Action mailed Mar. 10, 2017", 15 pgs.
"U.S. Appl. No. 14/967,472, Non Final Office Action mailed Sep. 8, 2016", 11 pgs.
"U.S. Appl. No. 14/967,472, Preliminary Amendment filed Dec. 15, 2015", 6 pgs.
"U.S. Appl. No. 14/967,472, Response filed Dec. 5, 2016 to Non Final Office Action mailed Sep. 8, 2016", 11 pgs.
"U.S. Appl. No. 15/074,029, Advisory Action mailed Oct. 11, 2018", 3 pgs.
"U.S. Appl. No. 15/074,029, Corrected Notice of Allowability mailed Feb. 5, 2020", 4 pgs.
"U.S. Appl. No. 15/074,029, Corrected Notice of Allowability mailed Aug. 20, 2019", 10 pgs.
"U.S. Appl. No. 15/074,029, Final Office Action mailed Jun. 28, 2018", 22 pgs.
"U.S. Appl. No. 15/074,029, Non Final Office Action mailed Jan. 23, 2019", 19 pgs.
"U.S. Appl. No. 15/074,029, Non Final Office Action mailed Nov. 30, 2017", 16 pgs.
"U.S. Appl. No. 15/074,029, Notice of Allowance mailed Jun. 19, 2019", 14 pgs.
"U.S. Appl. No. 15/074,029, Response filed Feb. 28, 2018 to Non Final Office Action mailed Nov. 30, 2017", 12 pgs.
"U.S. Appl. No. 15/074,029, Response filed Aug. 28, 2018 to Final Office Action mailed Jun. 28, 2018", 21 pgs.
"U.S. Appl. No. 15/074,029, Response filed Apr. 23, 2019 to Non Final Office Action mailed Jan. 23, 2019", 15 pgs.
"U.S. Appl. No. 15/137,608, Preliminary Amendment filed Apr. 26, 2016", 6 pgs.
"U.S. Appl. No. 15/152,975, Non Final Office Action mailed Jan. 12, 2017", 36 pgs.
"U.S. Appl. No. 15/152,975, Preliminary Amendment filed May 19, 2016", 8 pgs.
"U.S. Appl. No. 15/208,460, Notice of Allowance mailed Feb. 27, 2017", 8 pgs.
"U.S. Appl. No. 15/208,460, Notice of Allowance mailed Dec. 30, 2016", 9 pgs.
"U.S. Appl. No. 15/208,460, Supplemental Preliminary Amendment filed Jul. 18, 2016", 8 pgs.
"U.S. Appl. No. 15/224,312, Preliminary Amendment filed Feb. 1, 2017", 11 pgs.
"U.S. Appl. No. 15/224,343, Preliminary Amendment filed Jan. 31, 2017", 10 pgs.
"U.S. Appl. No. 15/224,355, Preliminary Amendment filed Apr. 3, 2017", 12 pgs.
"U.S. Appl. No. 15/224,372, Preliminary Amendment filed May 5, 2017", 10 pgs.
"U.S. Appl. No. 15/224.359, Preliminary Amendment filed Apr. 19, 2017", 8 pgs.
"U.S. Appl. No. 15/298,806, Advisory Action mailed Jan. 29, 2018", 4 pgs.
"U.S. Appl. No. 15/298,806, Examiner Interview Summary mailed Jan. 12, 2018", 3 pgs.
"U.S. Appl. No. 15/298,806, Examiner Interview Summary mailed Aug. 13, 2018", 3 pgs.
"U.S. Appl. No. 15/298,806, Final Office Action mailed Oct. 24, 2017", 15 pgs.
"U.S. Appl. No. 15/298,806, Non Final Office Action mailed May 17, 2018", 16 pgs.
"U.S. Appl. No. 15/298,806, Non Final Office Action mailed Jun. 12, 2017", 26 pgs.
"U.S. Appl. No. 15/298,806, Notice of Allowance mailed Sep. 19, 2018", 5 pgs.
"U.S. Appl. No. 15/298,806, Preliminary Amendment filed Oct. 21, 2016", 8 pgs.
"U.S. Appl. No. 15/298,806, Response filed Jan. 9, 2018 to Final Office Action mailed Oct. 24, 2017", 17 pgs.
"U.S. Appl. No. 15/298,806, Response filed Aug. 10, 2018 to Non Final Office Action mailed May 17, 2018", 15 pgs.
"U.S. Appl. No. 15/298,806, Response filed Sep. 12, 2017 to Non Final Office Action mailed Jun. 12, 2017", 12 pgs.
"U.S. Appl. No. 15/416,846, Preliminary Amendment filed Feb. 18, 2017", 10 pgs.
"U.S. Appl. No. 15/424,184, Advisory Action mailed May 26, 2020", 6 pgs.
"U.S. Appl. No. 15/424,184, Advisory Action mailed Aug. 25, 2020", 5 pgs.
"U.S. Appl. No. 15/424,184, Examiner Interview Summary mailed Jan. 10, 2019", 3 pgs.
"U.S. Appl. No. 15/424,184, Examiner Interview Summary mailed Jul. 30, 2019", 2 pgs.
"U.S. Appl. No. 15/424,184, Final Office Action mailed Jan. 29, 2019", 14 pgs.
"U.S. Appl. No. 15/424,184, Final Office Action mailed Mar. 9, 2020", 19 pgs.
"U.S. Appl. No. 15/424,184, Final Office Action mailed Jul. 27, 2020", 18 pgs.
"U.S. Appl. No. 15/424,184, Final Office Action mailed Sep. 9, 2019", 13 pgs.
"U.S. Appl. No. 15/424,184, Non Final Office Action mailed May 21, 2019", 16 pgs.
"U.S. Appl. No. 15/424,184, Non Final Office Action mailed Jun. 29, 2020", 19 pgs.
"U.S. Appl. No. 15/424,184, Non Final Office Action mailed Nov. 30, 2018", 22 pgs.
"U.S. Appl. No. 15/424,184, Non Final Office Action mailed Dec. 2, 2019", 16 pgs.
"U.S. Appl. No. 15/424,184, Notice of Allowance mailed Sep. 25, 2020", 10 pgs.
"U.S. Appl. No. 15/424,184, Response filed Mar. 2, 2020 to Non Final Office Action mailed Dec. 2, 2019", 11 pgs.
"U.S. Appl. No. 15/424,184, Response filed May 11, 2020 to Final Office Action mailed Mar. 9, 2020", 14 pgs.
"U.S. Appl. No. 15/424,184, Response filed Jul. 13, 2020 to Non Final Office Action mailed May 5, 2020", 11 pgs.
"U.S. Appl. No. 15/424,184, Response filed Aug. 5, 2020 to Final Office Action mailed Jul. 27, 2020", 12 pgs.
"U.S. Appl. No. 15/424,184, Response filed Aug. 21, 2019 to Non Final Office Action mailed May 21, 2019", 12 pgs.
"U.S. Appl. No. 15/424,184, Response filed Sep. 1, 2020 to Advisory Action mailed Aug. 25, 2020", 9 pgs.
"U.S. Appl. No. 15/424,184, Response filed Nov. 11, 2019 to Final Office Action mailed Sep. 9, 2019", 12 pgs.
"U.S. Appl. No. 15/424,184, Response filed Apr. 29, 2019 to Final Office Action mailed Jan. 29, 2019", 11 pgs.
"U.S. Appl. No. 15/424,184 k, Response filed Jan. 4, 2019 to Non Final Office Action mailed Nov. 30, 2018", 17 pgsl.
"U.S. Appl. No. 15/474,821, Advisory Action mailed Dec. 19, 2019", 3 pgs.
"U.S. Appl. No. 15/474,821, Final Office Action mailed Aug. 19, 2021", 18 pgs.
"U.S. Appl. No. 15/474,821, Final Office Action mailed Sep. 3, 2019", 19 pgs.
"U.S. Appl. No. 15/474,821, Non Final Office Action mailed Jan. 25, 2019", 17 pgs.
"U.S. Appl. No. 15/474,821, Non Final Office Action mailed Mar. 18, 2021", 17 pgs.
"U.S. Appl. No. 15/474,821, Notice of Non-Compliant Amendment mailed Sep. 8, 2020", 6 pgs.
"U.S. Appl. No. 15/474,821, Response filed Jan. 7, 2021 to Notice of Non-Compliant Amendment mailed Sep. 8, 2020", 9 pgs.
"U.S. Appl. No. 15/474,821, Response filed May 11, 2021 to Non Final Office Action mailed Mar. 18, 2021", 10 pgs.

(56) References Cited

OTHER PUBLICATIONS

"U.S. Appl. No. 15/474,821, Response filed Oct. 20, 2021 to Final Office Action mailed Aug. 19, 2021", 10 pgs.
"U.S. Appl. No. 15/474,821, Response filed Apr. 25, 2019 to Non Final Office Action mailed Jan. 25, 2019", 16 pgs.
"U.S. Appl. No. 15/474,821, Response filed on Dec. 2, 2019 to Final Office Action mailed Sep. 3, 2019", 10 pgs.
"U.S. Appl. No. 15/486,111, Corrected Notice of Allowance mailed Sep. 7, 2017", 3 pgs.
"U.S. Appl. No. 15/486,111, Non Final Office Action mailed May 9, 2017", 17 pgs.
"U.S. Appl. No. 15/486,111, Notice of Allowance mailed Aug. 30, 2017", 5 pgs.
"U.S. Appl. No. 15/486,111, Response filed Aug. 9, 2017 to Non Final Office Action mailed May 9, 2017", 11 pgs.
"U.S. Appl. No. 15/835,100, Non Final Office Action mailed Jan. 23, 2018", 18 pgs.
"U.S. Appl. No. 15/835,100, Notice of Allowance mailed May 22, 2018", 5 pgs.
"U.S. Appl. No. 15/835,100, Response Filed Apr. 23, 2018 to Non Final Office Action mailed Jan. 23, 2018", 11 pgs.
"U.S. Appl. No. 15/837,935, Notice of Allowance mailed Nov. 25, 2019", 18 pgs.
"U.S. Appl. No. 15/946,990, Final Office Action mailed May 9, 2019", 11 pgs.
"U.S. Appl. No. 15/946,990, Non Final Office Action mailed Dec. 3, 2018", 10 pgs.
"U.S. Appl. No. 15/946,990, Notice of Allowance mailed Sep. 24, 2019", 5 pgs.
"U.S. Appl. No. 15/946,990, Response filed Feb. 20, 2019 to Non Final Office Action mailed Dec. 3, 2018", 11 pgs.
"U.S. Appl. No. 15/946,990, Response filed Jul. 9, 2019 to Final Office Action mailed May 9, 2019", 12 pgs.
"U.S. Appl. No. 16/105,687, Non Final Office Action mailed Sep. 14, 2018", 11 pgs.
"U.S. Appl. No. 16/105,687, Notice of Allowance mailed Feb. 25, 2019", 8 pgs.
"U.S. Appl. No. 16/105,687, Response filed Dec. 14, 2018 to Non Final Office Action mailed Sep. 14, 2018", 12 pgs.
"U.S. Appl. No. 16/219,577, Non Final Office Action mailed Oct. 29, 2019", 7 pgs.
"U.S. Appl. No. 16/219,577, Notice of Allowance mailed Jan. 15, 2020", 7 pgs.
"U.S. Appl. No. 16/219,577, Response filed Oct. 3, 2019 to Restriction Requirement mailed Aug. 7, 2019", 6 pgs.
"U.S. Appl. No. 16/219,577, Response filed Dec. 5, 2019 to Non Final Office Action mailed Oct. 29, 2019", 6 pgs.
"U.S. Appl. No. 16/219,577, Restriction Requirement mailed Aug. 7, 2019", 6 pgs.
"U.S. Appl. No. 16/428,210, Advisory Action mailed Sep. 9, 2020", 3 pgs.
"U.S. Appl. No. 16/428,210, Examiner Interview Summary mailed Aug. 28, 2020", 3 pgs.
"U.S. Appl. No. 16/428,210, Examiner Interview Summary mailed Nov. 5, 2021", 2 pgs.
"U.S. Appl. No. 16/428,210, Final Office Action mailed Jun. 29, 2020", 16 pgs.
"U.S. Appl. No. 16/428,210, Final Office Action mailed Jul. 9, 2021", 18 pgs.
"U.S. Appl. No. 16/428,210, Non Final Office Action mailed Apr. 6, 2020", 16 pgs.
"U.S. Appl. No. 16/428,210, Non Final Office Action mailed Nov. 27, 2020", 17 pgs.
"U.S. Appl. No. 16/428,210, Preliminary Amendment filed Aug. 8, 2019", 8 pgs.
"U.S. Appl. No. 16/428,210, Response filed Apr. 27, 2021 to Non Final Office Action mailed Nov. 27, 2020", 11 pgs.
"U.S. Appl. No. 16/428,210, Response filed Jun. 3, 2020 to Non Final Office Action mailed Apr. 6, 2020", 10 pgs.
"U.S. Appl. No. 16/428,210, Response filed Aug. 27, 2020 to Final Office Action mailed Jun. 29, 2020", 12 pgs.
"U.S. Appl. No. 16/428,210, Response filed Nov. 9, 2021 to Final Office Action mailed Jul. 9, 2021", 12 pgs.
"U.S. Appl. No. 16/541,919, Non Final Office Action mailed Apr. 14, 2020", 18 pgs.
"U.S. Appl. No. 16/541,919, Notice of Allowance mailed Jun. 30, 2020", 8 pgs.
"U.S. Appl. No. 16/541,919, Notice of Allowance mailed Oct. 15, 2020", 8 pgs.
"U.S. Appl. No. 16/541,919, Response filed Jun. 12, 2020 to Non Final Office Action mailed Apr. 14, 2020", 8 pgs.
"U.S. Appl. No. 16/808,101, Notice of Allowance mailed Jul. 27, 2021", 16 pgs.
"U.S. Appl. No. 16/808,101, Preliminary Amendment filed Mar. 10, 2020", 8 pgs.
"U.S. Appl. No. 16/808,101, Supplemental Notice of Allowability mailed Aug. 9, 2021", 3 pgs.
"U.S. Appl. No. 16/841,817, Corrected Notice of Allowability mailed Sep. 16, 2021", 2 pgs.
"U.S. Appl. No. 16/841,817, Non Final Office Action mailed May 26, 2021", 7 pgs.
"U.S. Appl. No. 16/841,817, Notice of Allowance mailed Sep. 3, 2021", 7 pgs.
"U.S. Appl. No. 16/841,817, Response filed Aug. 26, 2021 to Non Final Office Action mailed May 26, 2021", 6 pgs.
"U.S. Appl. No. 16/943,706, Examiner Interview Summary mailed Mar. 31, 2021", 2 pgs.
"U.S. Appl. No. 16/943,706, Examiner Interview Summary mailed Nov. 5, 2021", 2 pgs.
"U.S. Appl. No. 16/943,706, Final Office Action mailed Feb. 24, 2021", 17 pgs.
"U.S. Appl. No. 16/943,706, Non Final Office Action mailed Jul. 9, 2021", 17 pgs.
"U.S. Appl. No. 16/943,706, Non Final Office Action mailed Sep. 8, 2020", 16 pgs.
"U.S. Appl. No. 16/943,706, Response filed Feb. 8, 2021 to Non Final Office Action mailed Sep. 8, 2020", 9 pgs.
"U.S. Appl. No. 16/943,706, Response filed Jun. 24, 2021 to Final Office Action mailed Feb. 24, 2021", 11 pgs.
"U.S. Appl. No. 16/943,706, Response filed Nov. 8, 2021 to Non Final Office Action mailed Jul. 9, 2021", 11 pgs.
"U.S. Appl. No. 16/943,804, Examiner Interview Summary mailed Mar. 31, 2021", 2 pgs.
"U.S. Appl. No. 16/943,804, Examiner Interview Summary mailed Oct. 21, 2021", 2 pgs.
"U.S. Appl. No. 16/943,804, Final Office Action mailed Feb. 24, 2021", 15 pgs.
"U.S. Appl. No. 16/943,804, Non Final Office Action mailed Jul. 21, 2021", 16 pgs.
"U.S. Appl. No. 16/943,804, Non Final Office Action mailed Sep. 8, 2020", 14 pgs.
"U.S. Appl. No. 16/943,804, Response filed Feb. 8, 2021 to Non Final Office Action mailed Sep. 8, 2020", 7 pgs.
"U.S. Appl. No. 16/943,804, Response filed Jun. 24, 2021 to Final Office Action mailed Feb. 24, 2021", 8 pgs.
"U.S. Appl. No. 16/943,804, Response filed Nov. 4, 2021 to Non Final Office Action mailed Jul. 21, 2021", 9 pgs.
"U.S. Appl. No. 17/031,310, Notice of Allowance mailed Nov. 15, 2021", 9 pgs.
"U.S. Appl. No. 17/031,310, Preliminary Amendment filed Jan. 22, 2021", 8 pgs.
"U.S. Appl. No. 17/112,676, Non Final Office Action mailed Sep. 23, 2021", 26 pgs.
"BlogStomp", StompSoftware, [Online] Retrieved from the Internet: <URL: http://stompsoftware.com/blogstomp>, (accessed May 24, 2017), 12 pgs.
"Canadian Application Serial No. 2,894,332 Response filed Jan. 24, 2017 to Office Action mailed Aug. 16, 2016", 15 pgs.
"Canadian Application Serial No. 2,894,332, Office Action mailed Aug. 16, 2016", 4 pgs.
"Canadian Application Serial No. 2,910,158, Office Action mailed Dec. 15, 2016", 5 pgs.

(56) References Cited

OTHER PUBLICATIONS

"Canadian Application Serial No. 2,910,158, Response filed Apr. 11, 2017 to Office Action mailed Dec. 15, 2016", 21 pgs.
"Chinese Application Serial No. 201680027177.8, Office Action mailed Oct. 28, 2019", W/English Translation, 15 pgs.
"Chinese Application Serial No. 201680027177.8, Response filed Mar. 5, 2020 to Office Action mailed Oct. 28, 2019", w/ English Claims, 11 pgs.
"Connecting To Your Customers In the Triangle and Beyond", Newsobserver.com, (2013), 16 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Demystifying Location Data Accuracy", Mobile Marketing Association, (Nov. 2015), 18 pgs.
"European Application Serial No. 16716090.2, Communication Pursuant to Article 94(3) EPC mailed Jan. 15, 2020", 6 pgs.
"European Application Serial No. 16716090.2, Response filed Apr. 15, 2020 to Communication Pursuant to Article 94(3) EPC mailed Jan. 15, 2020", 10 pgs.
"European Application Serial No. 16716090.2, Response filed May 21, 2018 to Communication pursuant to Rules 161(1) and 162 EPC mailed Nov. 10, 2017", w/ English Claims, 89 pgs.
"European Application Serial No. 18747246.9, Communication Pursuant to Article 94(3) EPC mailed Jun. 25, 2020", 10 pgs.
"European Application Serial No. 18747246.9, Extended European Search Report mailed Nov. 7, 2019", 7 pgs.
"European Application Serial No. 18747246.9, Response Filed Jun. 3, 2020 to Extended European Search Report mailed Nov. 7, 2019", 15 pgs.
"European Application Serial No. 18747246.9, Response filed Oct. 15, 2020 to Communication Pursuant to Article 94(3) EPC mailed Jun. 25, 2020", 16 pgs.
"European Application Serial No. 18747246.9, Summons to Attend Oral Proceedings mailed Jun. 29, 2021", 12 pgs.
"Geofencing and the event industry", Goodbarber Blog, [Online] Retrieved from the internet by the examiner on May 16, 2019: <URL: https://www.goodbarber.com/blog/geofencing-and-the-event-industry-a699/>, (Nov. 9, 2015), 7 pgs.
"How Snaps Are Stored And Deleted", Snapchat, [Online] Retrieved from the Internet: <URL: https://www.snap.com/en-us/news/post/how-snaps-are-stored-and-deleted/>, (May 9, 2013), 2 pgs.
"IAB Platform Status Report: A Mobile Advertising Review", Interactive Advertising Bureau, (Jul. 2008), 24 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/EP2008/063682, International Search Report mailed Nov. 24, 2008", 3 pgs.
"International Application Serial No. PCT/US2014/040346, International Search Report mailed Mar. 23, 2015", 2 pgs.
"International Application Serial No. PCT/US2014/040346, Written Opinion mailed Mar. 23, 2015", 6 pgs.
"International Application Serial No. PCT/US2015/035591, International Preliminary Report on Patentability mailed Dec. 22, 2016", 7 pgs.
"International Application Serial No. PCT/US2015/035591, International Search Report mailed Aug. 11, 2015", 5 pgs.
"International Application Serial No. PCT/US2015/035591, International Written Opinion mailed Aug. 11, 2015", 5 pgs.
"International Application Serial No. PCT/US2015/037251, International Search Report mailed Sep. 29, 2015", 2 pgs.
"International Application Serial No. PCT/US2015/050424, International Search Report mailed Dec. 4, 2015", 2 pgs.
"International Application Serial No. PCT/US2015/050424, Written Opinion mailed Dec. 4, 2015", 10 pgs.
"International Application Serial No. PCT/US2015/053811, International Preliminary Report on Patentability mailed Apr. 13, 2017", 9 pgs.
"International Application Serial No. PCT/US2015/053811, International Search Report mailed Nov. 23, 2015", 5 pgs.
"International Application Serial No. PCT/US2015/053811, Written Opinion mailed Nov. 23, 2015", 8 pgs.
"International Application Serial No. PCT/US2015/056884, International Preliminary Report on Patentability mailed May 4, 2017", 8 pgs.
"International Application Serial No. PCT/US2015/056884, International Search Report mailed Dec. 22, 2015", 5 pgs.
"International Application Serial No. PCT/US2015/056884, Written Opinion mailed Dec. 22, 2015", 6 pgs.
"International Application Serial No. PCT/US2015/065785, International Search Report mailed Jul. 21, 2016", 5 pgs.
"International Application Serial No. PCT/US2015/065785, Written Opinion mailed Jul. 21, 2016", 5 pgs.
"International Application Serial No. PCT/US2015/065821, International Search Report mailed Mar. 3, 2016", 2 pgs.
"International Application Serial No. PCT/US2015/065821, Written Opinion mailed Mar. 3, 2016", 3 pgs.
"International Application Serial No. PCT/US2016/023085, International Preliminary Report on Patentability mailed Sep. 28, 2017", 8 pgs.
"International Application Serial No. PCT/US2016/023085, International Search Report mailed Jun. 17, 2016", 5 pgs.
"International Application Serial No. PCT/US2016/023085, Written Opinion mailed Jun. 17, 2016", 6 pgs.
"International Application Serial No. PCT/US2018/016723, International Preliminary Report on Patentability mailed Aug. 15, 2019", 19 pgs.
"International Application Serial No. PCT/US2018/016723, International Search Report mailed Apr. 5, 2018", 2 pgs.
"International Application Serial No. PCT/US2018/016723, Written Opinion mailed Apr. 5, 2018", 17 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"iVisit Mobile: Getting Started", IVISIT, [Online] Retrieved from the Internet: <URL: http://web.archive.org/web/20140830174355/http://ivisit.com/support_mobile>, (Dec. 4, 2013), 16 pgs.
"Korean Application Serial No. 10-2017-7029861, Notice of Preliminary Rejection mailed Jan. 17, 2019", w/ English Translation, 9 pgs.
"Korean Application Serial No. 10-2017-7029861, Response filed Mar. 15, 2019 to Notice of Preliminary Rejection mailed Jan. 17, 2019", w/ English Claims, 20 pgs.
"Korean Application Serial No. 10-2019-7025443, Notice of Preliminary Rejection mailed Feb. 2, 2021", w/ English Translation, 11 pgs.
"Korean Application Serial No. 10-2019-7030235, Final Office Action mailed May 20, 2020", w/ English Translation, 5 pgs.
"Korean Application Serial No. 10-2019-7030235, Notice of Preliminary Rejection mailed Nov. 28, 2019", w/ English Translation, 10 pgs.
"Korean Application Serial No. 10-2019-7030235, Response filed Jan. 28, 2020 to Notice of Preliminary Rejection mailed Nov. 28, 2019", w/ English Claims, 12 pgs.
"Korean Application Serial No. 10-2019-7030235, Response filed Jun. 22, 2020 to Final Office Action mailed May 20, 2020", w/ English Claims, 16 pgs.
"Korean Application Serial No. 10-2021-7004376, Notice of Preliminary Rejection mailed May 31, 2021", w/ English translation, 9 pgs.
"Korean Application Serial No. 10-2021-7004376, Response filed Aug. 12, 2021 to Notice of Preliminary Rejection mailed May 31, 2021", w/ English Translation, 47 pgs.
"Macy's Believe-o-Magic", [Online] Retrieved from the Internet: <URL: https://web.archive.org/web/20190422101854/https://www.youtube.com/watch?v=xvzRXy3J 0Z0&feature=youtu.be>, (Nov. 7, 2011), 102 pgs.; 00:51 min.

(56) References Cited

OTHER PUBLICATIONS

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Mobile Location User Cases and Case Studies", Interactive Advertising Bureau, (Mar. 2014), 25 pgs.
"Pluraleyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"WIPO; International Preliminary Report; WO201776739", (Sep. 10, 2018), 5 pgs.
"WIPO; Search Strategy; WO201776739", (Dec. 10, 2017), 6 pgs.
Carr, Dale, "Mobile Ad Targeting: A Labor of Love", Ad Week, [Online] Retrieved from the Internet on Feb. 11, 2019: <URL: https://www.adweek.com/digital/mobile-ad-targeting-a-labor-of-love/>, (Feb. 12, 2016), 7 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Kumar, S, "Optimization Issues in Web and Mobile Advertising", Chapter 2—Pricing Models in Web Advertising, SpringerBriefs in Operations Management, (2016), 6 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Naylor, Joseph, "Geo-Precise Targeting: It's time to Get off the Fence", Be In The Know Blog, [Online] Retrieved from the internet by the examiner on May 16, 2019: <URL: http://blog.cmglocalsolutions.com/geo-precise-targeting-its-time-to-get-off-the-fence>, (May 15, 2015), 6 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=. bkQ9qVZWe#.nv58YXpkV>, (Dec. 22, 2013), 13 pgs.
Palmer, Alex, "Geofencing at events: how to reach potential customers live and on-site", Streetfight Mag, [Online] Retrieved form the internet by the examiner on May 16, 2019: <URL: http://streetfightmag.com/2015/08/20/geofencing-at-events-how-to-reach-potential-customers-live-and-on-site>, (Aug. 20, 2015), 6 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Peterson, Lisa, et al., "Location-Based Advertising", Peterson Mobility Solutions, (Dec. 2009), 39 pgs.
Quercia, Daniele, et al., "Mobile Phones and Outdoor Advertising: Measurable Advertising", IEEE Persuasive Computing, (2011), 9 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.
Shein, Esther, "Ephemeral Data", Communications of the ACM, vol. 56, No. 9, (Sep. 2013), 3 pgs.
Simonite, Tom, "Mobile Data: A Gold Mine for Telcos", MIT Technology Review, (May 27, 2010), 6 pgs.
Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
Virgillito, Dan, "Facebook Introduces Mobile Geo-Fencing With Local Awareness Ads", Adespresso, [Online] Retrieved from the internet by the examiner on May 16, 2019: <URL: https://adespresso.com/blog/facebook-local-business-ads-geo-fencing/>, (Oct. 8, 2014), 14 pgs.
"Android Getting Started Guide", Voxer Business, [Online] Retrieved from the Internet: <URL: https://voxer.com/assets/AndroidGuide.pdf>, (Feb. 1, 2014), 18 pgs.
"U.S. Appl. No. 14/510,016, Advisory Action mailed Nov. 30, 2017", 7 pgs.
"U.S. Appl. No. 14/510,016, Final Office Action mailed May 22, 2018", 36 pgs.
"U.S. Appl. No. 14/510,016, Final Office Action mailed Sep. 7, 2018", 34 pgs.
"U.S. Appl. No. 14/510,016, Final Office Action mailed Sep. 8, 2017", 21 pgs.
"U.S. Appl. No. 14/510,016, Non Final Office Action mailed Feb. 7, 2018", 36 pgs.
"U.S. Appl. No. 14/510,016, Non Final Office Action mailed Apr. 21, 2017", 55 pgs.
"U.S. Appl. No. 14/510,016, Response filed Jan. 8, 2017 to Final Office Action mailed Sep. 8, 2017", 22 pgs.
"U.S. Appl. No. 14/510,016, Response Filed May 7, 2018 to Non Final Office Action mailed Feb. 7, 2018", 13 pgs.
"U.S. Appl. No. 14/510,016, Response Filed Jul. 21, 2017 to Non Final Office Action mailed Apr. 21, 2017", 21 pgs.
"U.S. Appl. No. 14/510,016, Response filed Aug. 23, 2018 to Final Office Action mailed May 22, 2018", 16 pgs.
"U.S. Appl. No. 14/510,016, Response filed Nov. 8, 2017 to Final Office Action mailed Sep. 8, 2017", 24 pgs.
"U.S. Appl. No. 14/529,064, Response filed Sep. 6, 2017 to Non Final Office Action mailed Apr. 6, 2017", 24 pgs.
"U.S. Appl. No. 14/578,271, Corrected Notice of Allowance mailed Oct. 30, 2017", 2 pgs.
"U.S. Appl. No. 14/578,271, Notice of Allowability mailed Nov. 29, 2017", 3 pgs.
"U.S. Appl. No. 14/578,271, Notice of Allowance mailed Aug. 1, 2017", 5 pgs.
"U.S. Appl. No. 14/612,692, Examiner Interview Summary mailed May 14, 2018", 3 pgs.

(56) References Cited

OTHER PUBLICATIONS

"U.S. Appl. No. 14/612,692, Examiner Interview Summary mailed Nov. 13, 2017", 13 pgs.
"U.S. Appl. No. 14/612,692, Final Office Action mailed Aug. 25, 2017", 18 pgs.
"U.S. Appl. No. 14/612,692, Non Final Office Action mailed Jan. 9, 2018", 19 pgs.
"U.S. Appl. No. 14/612,692, Notice of Allowance mailed Jul. 5, 2018", 11 pgs.
"U.S. Appl. No. 14/612,692, Response Filed May 9, 2018 to Non Final Office Action mailed Jan. 9, 2018", 15 pgs.
"U.S. Appl. No. 14/612,692, Response Filed Nov. 22, 2017 to Final Office Action mailed Aug. 25, 2017", 11 pgs.
"U.S. Appl. No. 14/634,417, Corrected Notice of Allowability mailed Mar. 11, 2019", 3 pgs.
"U.S. Appl. No. 14/634,417, Corrected Notice of Allowability mailed Mar. 20, 2019", 3 pgs.
"U.S. Appl. No. 14/634,417, Examiner Interview Summary mailed Aug. 7, 2017", 3 pgs.
"U.S. Appl. No. 14/634,417, Non Final Office Action mailed Jun. 8, 2017", 17 pgs.
"U.S. Appl. No. 14/634,417, Notice of Allowance mailed May 22, 2018", 9 pgs.
"U.S. Appl. No. 14/634,417, Notice of Allowance mailed Oct. 25, 2017", 9 pgs.
"U.S. Appl. No. 14/634,417, Response filed Sep. 21, 2017 to Non Final Office Action mailed Jun. 8, 2017", 16 pgs.
"U.S. Appl. No. 14/704,212, Non Final Office Action mailed Mar. 12, 2018", 7 pgs.
"U.S. Appl. No. 14/704,212, Non Final Office Action mailed Jun. 16, 2017", 13 pgs.
"U.S. Appl. No. 14/704,212, Non Final Office Action mailed Nov. 25, 2016", 13 pgs.
"U.S. Appl. No. 14/704,212, Notice of Allowance mailed Jul. 2, 2018", 7 pgs.
"U.S. Appl. No. 14/704,212, Response filed Feb. 27, 2017 to Non Final Office Action mailed Nov. 25, 2016", 14 pgs.
"U.S. Appl. No. 14/704,212, Response Filed Jun. 12, 2018 to Non Final Office Action mailed Mar. 12, 2018", 9 pgs.
"U.S. Appl. No. 14/704,212, Response filed Oct. 17, 2016 to Final Office Action mailed Jun. 17, 2016", 12 pgs.
"U.S. Appl. No. 14/723,400, Final Office Action mailed Jan. 4, 2016", 14 pgs.
"U.S. Appl. No. 14/723,400, Non Final Office Action mailed Jul. 20, 2015", 14 pgs.
"U.S. Appl. No. 14/723,400, Notice of Allowance mailed Mar. 28, 2016", 12 pgs.
"U.S. Appl. No. 14/723,400, Notice of Non Compliant Amendment mailed Sep. 21, 2015", 2 pgs.
"U.S. Appl. No. 14/723,400, Notice of Non Compliant Amendment mailed Nov. 10, 2015", 2 pgs.
"U.S. Appl. No. 14/723,400, Response filed Jan. 29, 2016 to Final Office Action mailed Jan. 4, 2016", 8 pgs.
"U.S. Appl. No. 14/723,400, Response filed Aug. 13, 2015 to Non Final Office Action mailed Jul. 20, 2015", 7 pgs.
"U.S. Appl. No. 14/723,400, Response filed Sep. 23, 2015 to Notice of Non Compliant Amendment mailed Sep. 21, 2015", 5 pgs.
"U.S. Appl. No. 14/723,400, Response filed Nov. 19, 2015 to Notice of Non Compliant Amendment mailed Nov. 10, 2015", 5 pgs.
"U.S. Appl. No. 14/967,472, Corrected Notice of Allowability mailed Mar. 18, 2019", 3 pgs.
"U.S. Appl. No. 14/967,472, Corrected Notice of Allowability mailed Apr. 24, 2019", 3 pgs.
"U.S. Appl. No. 14/967,472, Final Office Action mailed Jun. 25, 2018", 14 pgs.
"U.S. Appl. No. 14/967,472, Non Final Office Action mailed Jan. 12, 2018", 17 pgs.
"U.S. Appl. No. 14/967,472, Notice of Allowance mailed Jan. 24, 2019", 6 pgs.
"U.S. Appl. No. 14/967,472, Response filed Mar. 16, 2018 Non Final Office Action mailed Jan. 12, 2018", 13 pgs.
"U.S. Appl. No. 14/967,472, Response filed Jun. 7, 2017 to Final Office Action mailed Mar. 10, 2017", 12 pgs.
"U.S. Appl. No. 14/967,472, Response filed Sep. 21, 2018 to Final Office Action mailed Jun. 25, 2018", 11 pgs.
"U.S. Appl. No. 14/974,321, Corrected Notice of Allowability mailed Feb. 13, 2019", 6 pgs.
"U.S. Appl. No. 14/974,321, Corrected Notice of Allowability mailed Apr. 19, 2019", 6 pgs.
"U.S. Appl. No. 14/974,321, Corrected Notice of Allowability mailed Jun. 12, 2019", 6 pgs.
"U.S. Appl. No. 14/974,321, Examiner Interview Summary mailed Dec. 5, 2017", 3 pgs.
"U.S. Appl. No. 14/974,321, Final Office Action mailed Oct. 26, 2017", 16 pgs.
"U.S. Appl. No. 14/974,321, Non Final Office Action mailed May 31, 2018", 14 pgs.
"U.S. Appl. No. 14/974,321, Non Final Office Action mailed Jun. 29, 2017", 36 pgs.
"U.S. Appl. No. 14/974,321, Notice of Allowance mailed Jan. 3, 2019", 9 pgs.
"U.S. Appl. No. 14/974,321, Response filed Aug. 30, 2018 to Non Final Office Action mailed May 31, 2018", 14 pgs.
"U.S. Appl. No. 14/974,321, Response filed Sep. 27, 2017 to Non Final Office Action mailed Jun. 29, 2017", 13 pgs.
"U.S. Appl. No. 15/137,608, Amendment and Response filed Jan. 25, 2019 to Non Final Office Action mailed Nov. 2, 2018", 13 pgs.
"U.S. Appl. No. 15/137,608, Corrected Notice of Allowability mailed Oct. 2, 2019", 3 pgs.
"U.S. Appl. No. 15/137,608, Final Office Action mailed May 13, 2019", 10 pgs.
"U.S. Appl. No. 15/137,608, Non Final Office Action mailed Nov. 2, 2018", 10 pgs.
"U.S. Appl. No. 15/137,608, Notice of Allowance mailed Aug. 8, 2019", 7 pgs.
"U.S. Appl. No. 15/137,608, Response filed Jul. 12, 2019 to Final Office Action mailed May 13, 2019", 10 pgs.
"U.S. Appl. No. 15/152,975, Examiner Interview Summary mailed Feb. 4, 2019", 7 pgs.
"U.S. Appl. No. 15/152,975, Examiner Interview Summary mailed May 14, 2018", 3 pgs.
"U.S. Appl. No. 15/152,975, Examiner Interview Summary mailed Nov. 13, 2017", 13 pgs.
"U.S. Appl. No. 15/152,975, Final Office Action mailed Jun. 30, 2017", 17 pgs.
"U.S. Appl. No. 15/152,975, Final Office Action mailed Jul. 2, 2018", 19 pgs.
"U.S. Appl. No. 15/152,975, Non Final Office Action mailed Jan. 10, 2018", 18 pgs.
"U.S. Appl. No. 15/152,975, Non Final Office Action mailed Sep. 28, 2018", 28 pgs.
"U.S. Appl. No. 15/152,975, Notice of Allowance mailed May 17, 2019", 13 pgs.
"U.S. Appl. No. 15/152,975, Response filed Jan. 28, 2019 to Non Final Office Action mailed Sep. 28, 2018", 17 pgs.
"U.S. Appl. No. 15/152,975, Response Filed May 10, 2018 to Non Final Office Action mailed Jan. 10, 2018", 13 pgs.
"U.S. Appl. No. 15/152,975, Response filed Jun. 12, 2017 to Non Final Office Action mailed Jan. 12, 2017", 13 pgs.
"U.S. Appl. No. 15/152,975, Response filed Sep. 19, 2018 to Final Office Action mailed Jul. 2, 2018", 14 pgs.
"U.S. Appl. No. 15/152,975, Response filed Nov. 30, 2017 to Final Office Action mailed Jun. 30, 2017", 9 pgs.
"U.S. Appl. No. 15/212,095, Final Office Action mailed Mar. 14, 2017", 9 pgs.
"U.S. Appl. No. 15/212,095, Non Final Office Action mailed Feb. 2, 2017", 8 pgs.
"U.S. Appl. No. 15/212,095, Notice of Allowance mailed Jun. 1, 2017", 8 pgs.
"U.S. Appl. No. 15/212,095, Notice of Allowance mailed Sep. 8, 2017", 2 pgs.

(56) References Cited

OTHER PUBLICATIONS

"U.S. Appl. No. 15/212,095, Response filed Feb. 28, 2017 to Non Final Office Action mailed Feb. 2, 2017", 2 pgs.
"U.S. Appl. No. 15/212,095, Response filed May 15, 2017 to Final Office Action mailed Mar. 14, 2017", 2 pgs.
"U.S. Appl. No. 15/224,262, Notice of Allowance mailed Mar. 2, 2017", 14 pgs.
"U.S. Appl. No. 15/224,312, Advisory Action mailed Aug. 27, 2019", 3 pgs.
"U.S. Appl. No. 15/224,312, Final Office Action mailed Apr. 11, 2019", 15 pgs.
"U.S. Appl. No. 15/224,312, Final Office Action mailed Apr. 20, 2018", 22 pgs.
"U.S. Appl. No. 15/224,312, Final Office Action mailed May 1, 2020", 18 pgs.
"U.S. Appl. No. 15/224,312, Final Office Action mailed May 12, 2021", 21 pgs.
"U.S. Appl. No. 15/224,312, Non Final Office Action mailed Oct. 11, 2017", 29 pgs.
"U.S. Appl. No. 15/224,312, Non Final Office Action mailed Oct. 22, 2018", 15 pgs.
"U.S. Appl. No. 15/224,312, Non Final Office Action mailed Nov. 9, 2020", 18 pgs.
"U.S. Appl. No. 15/224,312, Non Final Office Action mailed Dec. 16, 2019", 14 pgs.
"U.S. Appl. No. 15/224,312, Response filed Feb. 22, 2019 to Non Final Office Action mailed Oct. 22, 2018", 14 pgs.
"U.S. Appl. No. 15/224,312, Response filed Apr. 9, 2021 to Non Final Office Action mailed Nov. 9, 2020", 17 pgs.
"U.S. Appl. No. 15/224,312, Response filed Apr. 16, 2020 to Non Final Office Action mailed Dec. 16, 2019", 14 pgs.
"U.S. Appl. No. 15/224,312, Response filed Aug. 20, 2018 to Final Office Action mailed Apr. 20, 2018", 16 pgs.
"U.S. Appl. No. 15/224,312, Response filed Oct. 1, 2020 to Final Office Action mailed May 1, 2020", 18 pgs.
"U.S. Appl. No. 15/224,312, Response filed Oct. 11, 2019 to Advisory Action mailed Aug. 27, 2019", 17 pgs.
"U.S. Appl. No. 15/224,312, Response filed Aug. 12, 2019 to Final Office Action mailed Apr. 11, 2019", 14 pgs.
"U.S. Appl. No. 15/224,343, Amendment and Response filed Feb. 4, 2019 to Non Final Office Action mailed Sep. 4, 2018", 18 pgs.
"U.S. Appl. No. 15/224,343, Final Office Action mailed Mar. 22, 2019", 17 pgs.
"U.S. Appl. No. 15/224,343, Final Office Action mailed Apr. 7, 2020", 16 pgs.
"U.S. Appl. No. 15/224,343, Final Office Action mailed Apr. 19, 2018", 20 pgs.
"U.S. Appl. No. 15/224,343, Non Final Office Action mailed Sep. 4, 2018", 20 pgs.
"U.S. Appl. No. 15/224,343, Non Final Office Action mailed Oct. 4, 2017", 26 pgs.
"U.S. Appl. No. 15/224,343, Non Final Office Action mailed Nov. 12, 2019", 16 pgs.
"U.S. Appl. No. 15/224,343, Notice of Allowance mailed Jul. 29, 2020", 7 pgs.
"U.S. Appl. No. 15/224,343, Notice of Allowance mailed Nov. 16, 2020", 7 pgs.
"U.S. Appl. No. 15/224,343, Response filed Mar. 2, 2020 to Non Final Office Action mailed Nov. 12, 2019", 17 pgs.
"U.S. Appl. No. 15/224,343, Response filed Jun. 3, 2020 to Final Office Action mailed Apr. 7, 2020", 12 pgs.
"U.S. Appl. No. 15/224,343, Response filed Jul. 19, 2018 to Final Office Action mailed Apr. 19, 2018", 16 pgs.
"U.S. Appl. No. 15/224,343, Response filed Mar. 5, 2018 to Non Final Office Action mailed Oct. 4, 2017", 23 pgs.
"U.S. Appl. No. 15/224,343, Response filed Aug. 22, 2019 to Final Office Action mailed Mar. 22, 2019", 16 pgs.
"U.S. Appl. No. 15/224,355, Corrected Notice of Allowability mailed Nov. 18, 2021", 3 pgs.
"U.S. Appl. No. 15/224,355, Examiner Interview Summary mailed Oct. 25, 2017", 3 pgs.
"U.S. Appl. No. 15/224,355, Final Office Action mailed Apr. 24, 2018", 20 pgs.
"U.S. Appl. No. 15/224,355, Final Office Action mailed May 1, 2020", 15 pgs.
"U.S. Appl. No. 15/224,355, Final Office Action mailed Aug. 9, 2019", 15 pgs.
"U.S. Appl. No. 15/224,355, Non Final Office Action mailed Jan. 22, 2020", 13 pgs.
"U.S. Appl. No. 15/224,355, Non Final Office Action mailed Sep. 6, 2017", 30 pgs.
"U.S. Appl. No. 15/224,355, Non Final Office Action mailed Dec. 20, 2018", 14 pgs.
"U.S. Appl. No. 15/224,355, Notice of Allowability mailed Jul. 21, 2021", 13 pgs.
"U.S. Appl. No. 15/224,355, Notice of Allowance mailed Jul. 13, 2021", 16 pgs.
"U.S. Appl. No. 15/224,355, Notice of Allowance mailed Nov. 3, 2021", 10 pgs.
"U.S. Appl. No. 15/224,355, Response filed Mar. 6, 2018 to Non Final Office Action mailed Sep. 6, 2017", 25 pgs.
"U.S. Appl. No. 15/224,355, Response filed Apr. 22, 2020 to Non Final Office Action mailed Jan. 22, 2020", 13 pgs.
"U.S. Appl. No. 15/224,355, Response filed May 20, 2019 to Non Final Office Action mailed Dec. 20, 2018", 13 pgs.
"U.S. Appl. No. 15/224,355, Response filed Sep. 1, 2020 to Final Office Action mailed May 1, 2020", 16 pgs.
"U.S. Appl. No. 15/224,355, Response filed Sep. 24, 2018 to Final Office Action mailed Apr. 24, 2018", 19 pgs.
"U.S. Appl. No. 15/224,355, Response filed Nov. 11, 2019 to Final Office Action mailed Aug. 9, 2019", 14 pgs.
"U.S. Appl. No. 15/224,359, Final Office Action mailed Apr. 2, 2018", 18 pgs.
"U.S. Appl. No. 15/224,359, Final Office Action mailed Apr. 11, 2019", 15 pgs.
"U.S. Appl. No. 15/224,359, Final Office Action mailed May 1, 2020", 13 pgs.
"U.S. Appl. No. 15/224,359, Non Final Office Action mailed Jul. 20, 2017", 33 pgs.
"U.S. Appl. No. 15/224,359, Non Final Office Action mailed Sep. 28, 2018", 15 pgs.
"U.S. Appl. No. 15/224,359, Non Final Office Action mailed Dec. 10, 2019", 12 pgs.
"U.S. Appl. No. 15/224,359, Notice of Allowance mailed Nov. 3, 2020", 15 pgs.
"U.S. Appl. No. 15/224,359, Response filed Jan. 22, 2018 to Non Final Office Action mailed Jul. 20, 2017", 13 pgs.
"U.S. Appl. No. 15/224,359, Response filed Feb. 28, 2019 to Non Final Office Action mailed Aug. 28, 2018", 16 pgs.
"U.S. Appl. No. 15/224,359, Response filed Apr. 10, 2020 to Non Final Office Action mailed Dec. 10, 2019", 11 pgs.
"U.S. Appl. No. 15/224,359, Response filed Sep. 1, 2020 to Final Office Action mailed May 1, 2020", 13 pgs.
"U.S. Appl. No. 15/224,359, Response filed Sep. 4, 2018 to Final Office Action mailed Apr. 2, 2018", 14 pgs.
"U.S. Appl. No. 15/224,359, Response filed Sep. 11, 2019 to Final Office Action mailed Apr. 11, 2019", 18 pgs.
"U.S. Appl. No. 15/224,365, Appeal Brief filed Nov. 10, 2021", 15 pgs.
"U.S. Appl. No. 15/224,365, Examiner's Answer to Appeal Brief mailed Dec. 15, 2021", 2 pgs.
"U.S. Appl. No. 15/224,365, Final Office Action mailed Apr. 2, 2018", 19 pgs.
"U.S. Appl. No. 15/224,365, Final Office Action mailed Jul. 2, 2020", 11 pgs.
"U.S. Appl. No. 15/224,365, Final Office Action mailed Aug. 23, 2019", 12 pgs.
"U.S. Appl. No. 15/224,365, Non Final Office Action mailed Jan. 3, 2019", 11 pgs.
"U.S. Appl. No. 15/224,365, Non Final Office Action mailed Mar. 13, 2020", 9 pgs.

(56) References Cited

OTHER PUBLICATIONS

"U.S. Appl. No. 15/224,365, Non Final Office Action mailed Aug. 8, 2017", 41 pgs.
"U.S. Appl. No. 15/224,365, Non Final Office Action mailed Dec. 10, 2020", 16 pgs.
"U.S. Appl. No. 15/224,365, Response filed Jan. 23, 2020 to Final Office Action mailed Aug. 23, 2019", 13 pgs.
"U.S. Appl. No. 15/224,365, Response filed Feb. 8, 2018 to Non Final Office Action mailed Aug. 8, 2017", 14 pgs.
"U.S. Appl. No. 15/224,365, Response filed Jun. 15, 2020 to Non Final Office Action mailed Mar. 13, 2020", 12 pgs.
"U.S. Appl. No. 15/224,365, Response filed Oct. 2, 2018 to Final Office Action mailed Apr. 2, 2018", 15 pgs.
"U.S. Appl. No. 15/224,365, Response filed Oct. 2, 2020 to Final Office Action mailed Jul. 2, 2020", 13 pgs.
"U.S. Appl. No. 15/224,365, Response filed Jun. 3, 2019 to Non-Final Office Action mailed Jan. 3, 2019", 12 pgs.
"U.S. Appl. No. 15/224,372, Final Office Action mailed Mar. 6, 2019", 17 pgs.
"U.S. Appl. No. 15/224,372, Final Office Action mailed Apr. 3, 2018", 18 pgs.
"U.S. Appl. No. 15/224,372, Final Office Action mailed May 4, 2020", 15 pgs.
"U.S. Appl. No. 15/224,372, Non Final Office Action mailed Aug. 7, 2017", 40 pgs.
"U.S. Appl. No. 15/224,372, Non Final Office Action mailed Sep. 14, 2018", 20 pgs.
"U.S. Appl. No. 15/224,372, Non Final Office Action mailed Oct. 16, 2019", 14 pgs.
"U.S. Appl. No. 15/224,372, Notice of Allowance mailed Jan. 12, 2021", 8 pgs.
"U.S. Appl. No. 15/224,372, Response filed Jan. 8, 2017 to Non Final Office Action mailed Aug. 7, 2017", 22 pgs.
"U.S. Appl. No. 15/224,372, Response filed Jan. 16, 2019 to Non Final Office Action mailed Sep. 14, 2018", 18 pgs.
"U.S. Appl. No. 15/224,372, Response filed Apr. 16, 2020 to Non Final Office Action mailed Oct. 16, 2019", 14 pgs.
"U.S. Appl. No. 15/224,372, Response filed Jul. 8, 2019 to Final Office Action mailed Mar. 6, 2019", 14 pgs.
"U.S. Appl. No. 15/224,372, Response filed Aug. 3, 2018 to Final Office Action mailed Apr. 3, 2018", 14 pgs.
"U.S. Appl. No. 15/224,372, Response filed Oct. 5, 2020 to Final Office Action mailed May 4, 2020", 17 pgs.
"U.S. Appl. No. 15/224,377, Corrected Notice of Allowability mailed Oct. 26, 2021", 2 pgs.
"U.S. Appl. No. 15/224,377, Examiner Interview Summary mailed Mar. 4, 2019", 5 pgs.
"U.S. Appl. No. 15/224,377, Final Office Action mailed Jan. 2, 2018", 29 pgs.
"U.S. Appl. No. 15/224,377, Final Office Action mailed Feb. 6, 2019", 14 pgs.
"U.S. Appl. No. 15/224,377, Final Office Action mailed Apr. 14, 2021", 14 pgs.
"U.S. Appl. No. 15/224,377, Final Office Action mailed May 5, 2020", 15 pgs.
"U.S. Appl. No. 15/224,377, Non Final Office Action mailed Jun. 15, 2018", 19 pgs.
"U.S. Appl. No. 15/224,377, Non Final Office Action mailed Aug. 4, 2017", 41 pgs.
"U.S. Appl. No. 15/224,377, Non Final Office Action mailed Oct. 15, 2019", 12 pgs.
"U.S. Appl. No. 15/224,377, Non Final Office Action mailed Oct. 30, 2020", 15 pgs.
"U.S. Appl. No. 15/224,377, Notice of Allowance mailed Oct. 13, 2021", 14 pgs.
"U.S. Appl. No. 15/224,377, Response filed Mar. 30, 2021 to Non Final Office Action mailed Oct. 30, 2020", 14 pgs.
"U.S. Appl. No. 15/224,377, Response filed Apr. 15, 2020 to Non Final Office Action mailed Oct. 15, 2019", 13 pgs.
"U.S. Appl. No. 15/224,377, Response filed Jun. 6, 2019 to Final Office Action mailed Feb. 6, 2019", 10 pgs.
"U.S. Appl. No. 15/224,377, Response filed Sep. 8, 2020 to Final Office Action mailed May 5, 2020", 15 pgs.
"U.S. Appl. No. 15/224,377, Response filed Sep. 14, 2021 to Final Office Action mailed Apr. 14, 2021", 13 pgs.
"U.S. Appl. No. 15/224,377, Response filed Dec. 17, 2018 to Non Final Office Action mailed Jun. 15, 2018", 13 pgs.
"U.S. Appl. No. 15/224,377, Response filed Dec. 6, 2017 to Non Final Office Action mailed Aug. 4, 2017", 22 pgs.
"U.S. Appl. No. 15/224,383, Examiner Interview Summary mailed Aug. 15, 2018", 4 pgs.
"U.S. Appl. No. 15/224,383, Examiner Interview Summary mailed Oct. 25, 2017", 3 pgs.
"U.S. Appl. No. 15/224,383, Final Office Action mailed Jan. 14, 2019", 15 pgs.
"U.S. Appl. No. 15/224,383, Final Office Action mailed Feb. 14, 2018", 25 pgs.
"U.S. Appl. No. 15/224,383, Non Final Office Action mailed Jul. 5, 2018", 19 pgs.
"U.S. Appl. No. 15/224,383, Non Final Office Action mailed Aug. 30, 2017", 26 pgs.
"U.S. Appl. No. 15/224,383, Non-Final Office Action mailed Sep. 23, 2019", 13 pgs.
"U.S. Appl. No. 15/224,383, Notice of Allowance mailed Feb. 27, 2020", 7 pgs.
"U.S. Appl. No. 15/224,383, Preliminary Amendment filed May 9, 2017", 13 pgs.
"U.S. Appl. No. 15/224,383, Response filed Jan. 3, 2018 to Non Final Office Action mailed Aug. 30, 2017", 25 pgs.
"U.S. Appl. No. 15/224,383, Response filed Jan. 23, 2020 to Non Final Office Action mailed Sep. 23, 2019", 14 pgs.
"U.S. Appl. No. 15/224,383, Response filed May 14, 2019 to Final Office Action mailed Jan. 14, 2019", 15 pgs.
"U.S. Appl. No. 15/224,383, Response filed Jun. 14, 2018 to Final Office Action mailed Feb. 14, 2018", 14 pgs.
"U.S. Appl. No. 15/224,383, Response Filed Dec. 5, 2018 to Non Final Office Action mailed Jul. 5, 2018", 16 pgs.
"U.S. Appl. No. 15/416,846, Notice of Allowance mailed Jul. 19, 2017", 9 pgs.
"U.S. Appl. No. 15/470,004, Examiner Interview Summary mailed Sep. 12, 2019", 3 pgs.
"U.S. Appl. No. 15/470,004, Final Office Action mailed May 20, 2019", 9 pgs.
"U.S. Appl. No. 15/470,004, Non Final Office Action mailed Jan. 31, 2019", 9 pgs.
"U.S. Appl. No. 15/470,004, Notice of Allowance mailed Oct. 22, 2019", 10 pgs.
"U.S. Appl. No. 15/470,004, Response filed Apr. 29, 2019 to Non Final Office Action mailed Jan. 31, 2019", 12 pgs.
"U.S. Appl. No. 15/470,004, Response filed Sep. 9, 2019 to Final Office Action mailed May 20, 2019", 13 pgs.
"U.S. Appl. No. 15/470,025, Final Office Action mailed May 20, 2019", 10 pgs.
"U.S. Appl. No. 15/470,025, Non Final Office Action mailed Jan. 30, 2019", 10 pgs.
"U.S. Appl. No. 15/470,025, Notice of Allowance mailed Oct. 22, 2019", 10 pgs.
"U.S. Appl. No. 15/470,025, Response filed Apr. 24, 2019 to Non Final Office Action mailed Jan. 30, 2019", 13 pgs.
"U.S. Appl. No. 15/470,025, Response filed Sep. 12, 2019 to Final Office Action mailed May 20, 2019", 14 pgs.
"U.S. Appl. No. 15/474,821, Final Office Action mailed Apr. 1, 2022", 23 pgs.
"U.S. Appl. No. 15/474,821, Non Final Office Action mailed Jan. 21, 2022", 19 pgs.
"U.S. Appl. No. 15/474,821, Response filed Mar. 17, 2022 to Non Final Office Action mailed Jan. 21, 2022", 10 pgs.
"U.S. Appl. No. 15/673,137, Final Office Action mailed Jan. 27, 2020", 11 pgs.
"U.S. Appl. No. 15/673,137, Final Office Action mailed May 16, 2019", 8 pgs.

(56) References Cited

OTHER PUBLICATIONS

"U.S. Appl. No. 15/673,137, Non Final Office Action mailed May 12, 2020", 14 pgs.
"U.S. Appl. No. 15/673,137, Non Final Office Action mailed Aug. 30, 2019", 10 pgs.
"U.S. Appl. No. 15/673,137, Non Final Office Action mailed Oct. 5, 2018", 7 pgs.
"U.S. Appl. No. 15/673,137, Response filed Jan. 31, 2019 to Non Final Office Action mailed Oct. 5, 2018", 10 pgs.
"U.S. Appl. No. 15/673,137, Response filed Apr. 6, 2020 to Final Office Action mailed Jan. 27, 2020", 14 pgs.
"U.S. Appl. No. 15/673,137, Response filed Jul. 8, 2020 to Non Final Office Action mailed May 12, 2020", 15 pgs.
"U.S. Appl. No. 15/673,137, Response filed Oct. 18, 2019 to Non-Final Office Action mailed Aug. 30, 2019", 12 pgs.
"U.S. Appl. No. 15/673,137, Response filed Aug. 1, 2019 to Final Office Action mailed May 16, 2019", 10 pgs.
"U.S. Appl. No. 15/702,511, 312 Amendment filed Jun. 26, 2019", 11 pgs.
"U.S. Appl. No. 15/702,511, Notice of Allowability mailed Sep. 30, 2019", 2 pgs.
"U.S. Appl. No. 15/702,511, Notice of Allowance mailed Mar. 26, 2019", 7 pgs.
"U.S. Appl. No. 15/702,511, Notice of Allowance mailed Oct. 26, 2018", 7 pgs.
"U.S. Appl. No. 15/702,511, Preliminary Amendment filed Sep. 15, 2017", 13 pgs.
"U.S. Appl. No. 15/702,511, PTO Response to Rule 312 Communication mailed Aug. 13, 2019", 2 pgs.
"U.S. Appl. No. 15/729,582, Corrected Notice of Allowability mailed Oct. 2, 2019", 3 pgs.
"U.S. Appl. No. 15/729,582, Corrected Notice of Allowability mailed Oct. 30, 2019", 3 pgs.
"U.S. Appl. No. 15/729,582, Corrected Notice of Allowability mailed Dec. 18, 2019", 3 pgs.
"U.S. Appl. No. 15/729,582, Final Office Action mailed Dec. 13, 2018", 14 pgs.
"U.S. Appl. No. 15/729,582, Non Final Office Action mailed May 25, 2018", 14 pgs.
"U.S. Appl. No. 15/729,582, Notice of Allowance mailed Jul. 22, 2019", 9 pgs.
"U.S. Appl. No. 15/729,582, Response filed May 13, 2019 to Final Office Action mailed Dec. 13, 2018", 9 pgs.
"U.S. Appl. No. 15/787,467, Corrected Notice of Allowability mailed Sep. 24, 2018", 2 pgs.
"U.S. Appl. No. 15/787,467, Non Final Office Action mailed Apr. 18, 2018", 17 pgs.
"U.S. Appl. No. 15/787,467, Notice of Allowance mailed Aug. 31, 2018", 8 pgs.
"U.S. Appl. No. 15/787,467, Preliminary Amendment filed Oct. 26, 2017", 11 pgs.
"U.S. Appl. No. 15/787,467, Response filed Jul. 18, 2018 to Non-Final Office Action mailed Apr. 18, 2018", 12 pgs.
"U.S. Appl. No. 15/947,350, Appeal Brief filed Dec. 8, 2021", 23 pgs.
"U.S. Appl. No. 15/947,350, Examiner Interview Summary mailed Jul. 20, 2020", 4 pgs.
"U.S. Appl. No. 15/947,350, Final Office Action mailed Apr. 8, 2021", 13 pgs.
"U.S. Appl. No. 15/947,350, Final Office Action mailed May 4, 2020", 12 pgs.
"U.S. Appl. No. 15/947,350, Non Final Office Action mailed Sep. 28, 2020", 13 pgs.
"U.S. Appl. No. 15/947,350, Non Final Office Action mailed Dec. 13, 2019", 20 pgs.
"U.S. Appl. No. 15/947,350, Response filed Mar. 1, 2021 to Non Final Office Action mailed Sep. 28, 2020", 12 pgs.
"U.S. Appl. No. 15/947,350, Response filed Apr. 13, 2020 to Non Final Office Action mailed Dec. 13, 2019", 12 pgs.
"U.S. Appl. No. 15/947,350, Response filed Sep. 4, 2020 to Final Office Action mailed May 4, 2020", 12 pgs.
"U.S. Appl. No. 16/000,657, 312 Amendment filed Apr. 30, 2021", 8 pgs.
"U.S. Appl. No. 16/000,657, Advisory Action mailed Oct. 19, 2020", 3 pgs.
"U.S. Appl. No. 16/000,657, Examiner Interview Summary mailed Jun. 12, 2020", 4 pgs.
"U.S. Appl. No. 16/000,657, Examiner Interview Summary mailed Sep. 25, 2020", 3 pgs.
"U.S. Appl. No. 16/000,657, Final Office Action mailed Jul. 27, 2020", 17 pgs.
"U.S. Appl. No. 16/000,657, Non Final Office Action mailed Mar. 6, 2020", 30 pgs.
"U.S. Appl. No. 16/000,657, Notice of Allowance mailed Feb. 4, 2021", 8 pgs.
"U.S. Appl. No. 16/000,657, Preliminary Amendment filed Jun. 6, 2018", 8 pgs.
"U.S. Appl. No. 16/000,657, PTO Response to Rule 312 Communication mailed May 11, 2021", 3 pgs.
"U.S. Appl. No. 16/000,657, Response filed Jul. 6, 2020 to Non Final Office Action mailed Mar. 6, 2020", 13 pgs.
"U.S. Appl. No. 16/000,657, Response filed Sep. 28, 2020 to Final Office Action mailed Jul. 27, 2020", 12 pgs.
"U.S. Appl. No. 16/155,782, Final Office Action mailed Jan. 3, 2020", 14 pgs.
"U.S. Appl. No. 16/155,782, Non Final Office Action mailed May 14, 2020", 14 pgs.
"U.S. Appl. No. 16/155,782, Non Final Office Action mailed Jul. 10, 2019", 7 pgs.
"U.S. Appl. No. 16/155,782, Notice of Allowance mailed Sep. 21, 2020", 5 pgs.
"U.S. Appl. No. 16/155,782, Response filed Apr. 3, 2020 to Final Office Action mailed Jan. 3, 2020", 10 pgs.
"U.S. Appl. No. 16/155,782, Response filed Aug. 14, 2020 to Non Final Office Action mailed May 14, 2020", 9 pgs.
"U.S. Appl. No. 16/155,782, Response filed Oct. 8, 2019 to Non-Final Office Action mailed Jul. 10, 2019", 10 pgs.
"U.S. Appl. No. 16/204,886, Corrected Notice of Allowability mailed Jul. 15, 2019", 2 pgs.
"U.S. Appl. No. 16/204,886, Corrected Notice of Allowability mailed Aug. 6, 2019", 2 pgs.
"U.S. Appl. No. 16/204,886, Corrected Notice of Allowability mailed Sep. 10, 2019", 2 pgs.
"U.S. Appl. No. 16/204,886, Non Final Office Action mailed Jan. 4, 2019", 8 pgs.
"U.S. Appl. No. 16/204,886, Notice of Allowance mailed May 15, 2019", 9 pgs.
"U.S. Appl. No. 16/204,886, Response filed Apr. 2, 2019 to Non Final Office Action mailed Jan. 4, 2019", 8 pgs.
"U.S. Appl. No. 16/212,313, Final Office Action mailed Jun. 22, 2020", 20 pgs.
"U.S. Appl. No. 16/212,313, Non Final Office Action mailed Feb. 4, 2020", 20 pgs.
"U.S. Appl. No. 16/212,313, Non Final Office Action mailed Aug. 30, 2019", 18 pgs.
"U.S. Appl. No. 16/212,313, Preliminary Amendment filed Dec. 12, 2018", 6 pgs.
"U.S. Appl. No. 16/212,313, Response filed May 4, 2020 to Non Final Office Action mailed Feb. 4, 2020", 12 pgs.
"U.S. Appl. No. 16/212,313, Response filed Dec. 2, 2019 to Non Final Office Action mailed Aug. 30, 2019", 11 pgs.
"U.S. Appl. No. 16/376,598, Non Final Office Action mailed Jul. 25, 2019", 7 pgs.
"U.S. Appl. No. 16/376,598, Notice of Allowability mailed Jan. 23, 2020", 2 pgs.
"U.S. Appl. No. 16/376,598, Notice of Allowance mailed Oct. 18, 2019", 5 pgs.
"U.S. Appl. No. 16/376,598, Response filed Oct. 7, 2019 to Non-Final Office Action mailed Jul. 25, 2019", 2 pgs.
"U.S. Appl. No. 16/428,210, Examiner Interview Summary mailed Feb. 15, 2022", 2 pgs.

(56) References Cited

OTHER PUBLICATIONS

"U.S. Appl. No. 16/428,210, Final Office Action mailed Apr. 1, 2022", 16 pgs.
"U.S. Appl. No. 16/428,210, Non Final Office Action mailed Nov. 29, 2021", 14 pgs.
"U.S. Appl. No. 16/428,210, Response filed Feb. 28, 2022 to Non Final Office Action mailed Nov. 29, 2021", 11 pgs.
"U.S. Appl. No. 16/511,834, Corrected Notice of Allowability mailed Jan. 27, 2020", 2 pgs.
"U.S. Appl. No. 16/511,834, Non-Final Office Action mailed Aug. 20, 2019", 11 pgs.
"U.S. Appl. No. 16/511,834, Notice of Allowance mailed Oct. 23, 2019", 8 pgs.
"U.S. Appl. No. 16/511,834, Response filed Oct. 7, 2019 to Non-Final Office Action mailed Aug. 20, 2019", 3 pgs.
"U.S. Appl. No. 16/529,461, Advisory Action mailed Jan. 8, 2021", 4 pgs.
"U.S. Appl. No. 16/529,461, Examiner Interview Summary mailed Jul. 31, 2020", 3 pgs.
"U.S. Appl. No. 16/529,461, Final Office Action mailed Oct. 20, 2020", 24 pgs.
"U.S. Appl. No. 16/529,461, Non Final Office Action mailed Feb. 22, 2021", 27 pgs.
"U.S. Appl. No. 16/529,461, Non Final Office Action mailed May 21, 2020", 19 pgs.
"U.S. Appl. No. 16/529,461, Notice of Allowance mailed Jun. 23, 2021", 9 pgs.
"U.S. Appl. No. 16/529,461, Notice of Allowance mailed Oct. 1, 2021", 8 pgs.
"U.S. Appl. No. 16/529,461, Response filed Apr. 29, 2021 to Non Final Office Action mailed Feb. 22, 2021", 12 pgs.
"U.S. Appl. No. 16/529,461, Response filed Jul. 29, 2020 to Non Final Office Action mailed May 21, 2020", 11 pgs.
"U.S. Appl. No. 16/529,461, Response filed Dec. 18, 2020 to Final Office Action mailed Oct. 20, 2020", 10 pgs.
"U.S. Appl. No. 16/662,956, Final Office Action mailed Mar. 29, 2021", 17 pgs.
"U.S. Appl. No. 16/662,956, Final Office Action mailed Oct. 27, 2021", 15 pgs.
"U.S. Appl. No. 16/662,956, Non Final Office Action mailed Jul. 21, 2021", 12 pgs.
"U.S. Appl. No. 16/662,956, Non Final Office Action mailed Oct. 6, 2020", 13 pgs.
"U.S. Appl. No. 16/662,956, Preliminary Amendment filed Oct. 24, 2019", 8 pgs.
"U.S. Appl. No. 16/662,956, Response filed Jun. 24, 2021 to Final Office Action mailed Mar. 29, 2021", 10 pgs.
"U.S. Appl. No. 16/662,956, Response filed Oct. 5, 2021 to Non Final Office Action mailed Jul. 21, 2021", 10 pgs.
"U.S. Appl. No. 16/662,956, Response filed Dec. 2, 2020 to Non Final Office Action mailed Oct. 6, 2020", 11 pgs.
"U.S. Appl. No. 16/667,814, Corrected Notice of Allowability mailed Mar. 2, 2021", 2 pgs.
"U.S. Appl. No. 16/667,814, Corrected Notice of Allowability mailed Dec. 23, 2020", 2 pgs.
"U.S. Appl. No. 16/667,814, Non Final Office Action mailed Aug. 17, 2020", 6 pgs.
"U.S. Appl. No. 16/667,814, Notice of Allowance mailed Nov. 23, 2020", 8 pgs.
"U.S. Appl. No. 16/667,814, Preliminary Amendment filed Apr. 20, 2020", 6 pgs.
"U.S. Appl. No. 16/667,814, Response filed Oct. 29, 2020 to Non Final Office Action mailed Aug. 17, 2020", 7 pgs.
"U.S. Appl. No. 16/703,526, Corrected Notice of Allowability mailed Sep. 2, 2020", 2 pgs.
"U.S. Appl. No. 16/703,526, Notice of Allowance mailed Jun. 19, 2020", 10 pgs.
"U.S. Appl. No. 16/703,526, Supplemental Notice of Allowability mailed Aug. 10, 2020", 2 pgs.
"U.S. Appl. No. 16/709,092, Corrected Notice of Allowability mailed Jun. 1, 2020", 2 pgs.
"U.S. Appl. No. 16/709,092, Corrected Notice of Allowability mailed Jul. 22, 2020", 2 pgs.
"U.S. Appl. No. 16/709,092, Notice of Allowance mailed Apr. 9, 2020", 9 pgs.
"U.S. Appl. No. 16/841,817, Corrected Notice of Allowability mailed Mar. 23, 2022", 2 pgs.
"U.S. Appl. No. 16/841,817, Corrected Notice of Allowability mailed Dec. 30, 2021", 2 pgs.
"U.S. Appl. No. 16/841,817, Notice of Allowance mailed Dec. 16, 2021", 8 pgs.
"U.S. Appl. No. 16/911,854, Corrected Notice of Allowability mailed Sep. 16, 2021", 2 pgs.
"U.S. Appl. No. 16/911,854, Corrected Notice of Allowability mailed Oct. 6, 2021", 2 pgs.
"U.S. Appl. No. 16/911,854, Non Final Office Action mailed Mar. 3, 2021", 12 pgs.
"U.S. Appl. No. 16/911,854, Notice of Allowance mailed Jun. 17, 2021", 8 pgs.
"U.S. Appl. No. 16/911,854, Response filed May 28, 2021 to Non Final Office Action mailed Mar. 3, 2021", 8 pgs.
"U.S. Appl. No. 16/933,205, Final Office Action mailed Nov. 29, 2021", 21 pgs.
"U.S. Appl. No. 16/933,205, Non Final Office Action mailed Apr. 16, 2021", 39 pgs.
"U.S. Appl. No. 16/933,205, Response filed Oct. 18, 2021 to Non Final Office Action mailed Apr. 16, 2021", 13 pgs.
"U.S. Appl. No. 16/933,279, Non Final Office Action mailed Mar. 25, 2021", 41 pgs.
"U.S. Appl. No. 16/933,279, Response filed Aug. 25, 2021 to Non Final Office Action mailed Mar. 25, 2021", 14 pgs.
"U.S. Appl. No. 16/933,366, Final Office Action mailed Oct. 21, 2021", 18 pgs.
"U.S. Appl. No. 16/933,366, Non Final Office Action mailed Apr. 27, 2021", 39 pgs.
"U.S. Appl. No. 16/933,366, Response filed Aug. 27, 2021 to Non Final Office Action mailed Apr. 27, 2021", 16 pgs.
"U.S. Appl. No. 16/943,706, Examiner Interview Summary mailed Feb. 15, 2022", 2 pgs.
"U.S. Appl. No. 16/943,706, Final Office Action mailed Nov. 29, 2021", 17 pgs.
"U.S. Appl. No. 16/943,706, Non Final Office Action mailed Mar. 22, 2022", 18 pgs.
"U.S. Appl. No. 16/943,706, Response filed Feb. 28, 2022 to Final Office Action mailed Nov. 29, 2021", 9 pgs.
"U.S. Appl. No. 16/943,804, Examiner Interview Summary mailed Feb. 15, 2022", 2 pgs.
"U.S. Appl. No. 16/943,804, Final Office Action mailed Nov. 29, 2021", 17 pgs.
"U.S. Appl. No. 16/943,804, Non Final Office Action mailed Apr. 1, 2022", 17 pgs.
"U.S. Appl. No. 16/943,804, Response filed Feb. 28, 2022 to Final Office Action mailed Nov. 29, 2021", 8 pgs.
"U.S. Appl. No. 17/023,175, Non Final Office Action mailed Jun. 8, 2021", 8 pgs.
"U.S. Appl. No. 17/023,175, Notice of Allowance mailed Oct. 5, 2021", 7 pgs.
"U.S. Appl. No. 17/023,175, Response filed Sep. 8, 2021 to Non Final Office Action mailed Jun. 8, 2021", 6 pgs.
"U.S. Appl. No. 17/112,676, Final Office Action mailed Feb. 10, 2022", 30 pgs.
"U.S. Appl. No. 17/112,676, Response filed Jan. 24, 2022 to Non Final Office Action mailed Sep. 23, 2021", 17 pgs.
"U.S. Appl. No. 17/112,676, Response filed Apr. 13, 2022 to Final Office Action mailed Feb. 10, 2022", 12 pgs.
"Canadian Application Serial No. 2,894,332, Request for Reinstatement filed Jun. 11, 2018", w/ Amended Claims, 17 pgs.
"Canadian Application Serial No. 2,910,158, Office Action mailed Jun. 6, 2018", 5 pgs.
"Canadian Application Serial No. 2,910,158, Response filed Dec. 6, 2018 to Office Action mailed Jun. 6, 2018", w/ English Claims, 18 pgs.

(56) References Cited

OTHER PUBLICATIONS

"Canadian Application Serial No. 2,962,822, Office Action mailed Jul. 20, 2020", 5 pgs.
"Canadian Application Serial No. 3,027,981, Office Action mailed Oct. 2, 2020", 5 pgs.
"Canadian Application Serial No. 3,027,981, Office Action mailed Dec. 5, 2019", 4 pgs.
"Canadian Application Serial No. 3,027,981, Response filed Feb. 2, 2021 to Office Action mailed Oct. 2, 2020", 15 pgs.
"Canadian Application Serial No. 3,027,981, Response filed Mar. 31, 2020 to Office Action mailed Dec. 5, 2019", 12 pgs.
"Chinese Application Serial No. 201580031616.8, Office Action mailed Jul. 2, 2018", w/ English translation, 8 pgs.
"Chinese Application Serial No. 201580031616.8, Office Action mailed Oct. 9, 2017", w/ English Translation, 18 pgs.
"Chinese Application Serial No. 201580031616.8, Response filed Feb. 26, 2018 to Office Action mailed Oct. 9, 2017", w/ English Translation, 8 pgs.
"Chinese Application Serial No. 201580065266.7, Office Action mailed Mar. 19, 2020", w/ English translation, 15 pgs.
"Chinese Application Serial No. 201580065266.7, Response filed Jul. 17, 2020 Office Action mailed Mar. 19, 2020", w/ English Claims, 11 pgs.
"Chinese Application Serial No. 201580070593.1, Office Action mailed Apr. 8, 2020", w/ English Translation, 11 pgs.
"Chinese Application Serial No. 201580070593.1, Office Action mailed Oct. 23, 2020", w/ English Translation, 9 pgs.
"Chinese Application Serial No. 201580070593.1, Response filed Aug. 13, 2020 to Office Action mailed Apr. 8, 2020", w/ English Claims, 18 pgs.
"Chinese Application Serial No. 201580070593.1, Response filed Dec. 29, 2020 to Office Action mailed Oct. 23, 2020", With concise statement of relevance, 11 pgs.
"Chinese Application Serial No. 201580076228.1, Decision of Rejection mailed Jul. 9, 2019", w/ English Translation, 19 pgs.
"Chinese Application Serial No. 201580076228.1, Office Action mailed Feb. 12, 2019", w/ English Translation, 18 pgs.
"Chinese Application Serial No. 201580076228.1, Office Action mailed Jul. 19, 2018", w/ English translation, 19 pgs.
"Chinese Application Serial No. 201580076228.1, Response filed Apr. 11, 2019 to Office Action mailed Feb. 12, 2019", w/ English Claims, 12 pgs.
"Chinese Application Serial No. 201580076228.1, Response filed Oct. 11, 2019 to Decision of Rejection mailed Jul. 9, 2019", w/ English Claims, 13 pgs.
"Chinese Application Serial No. 201580076228.1, Response filed Nov. 26, 2018 to Office Action mailed Jul. 19, 2018", w/ English Claims, 16 pgs.
"Chinese Application Serial No. 201680035076.5, Office Action mailed May 27, 2020", w/ English Translation, 28 pgs.
"Chinese Application Serial No. 201680035076.5, Office Action mailed Sep. 4, 2019", w/ English Translation, 16 pgs.
"Chinese Application Serial No. 201680035076.5, Response filed Jul. 9, 2020 to Office Action mailed May 27, 2020", w/ English Claims, 18 pgs.
"Chinese Application Serial No. 201680035076.5, Response filed Dec. 26, 2019 to Office Action mailed Sep. 4, 2019", w/ English Claims, 15 pgs.
"Chinese Application Serial No. 201780034240.5, Office Action mailed Feb. 3, 2021", w/ English Translation, 13 pgs.
"Chinese Application Serial No. 201780034240.5, Office Action mailed Jun. 3, 2020", w/ English translation, 13 pgs.
"Chinese Application Serial No. 201780034240.5, Response filed Apr. 14, 2021 to Office Action mailed Feb. 3, 2021", w/ English Claims, 13 pgs.
"Chinese Application Serial No. 201780034240.5, Response filed Jul. 8, 2021 to Office Action", w/ English Claims, 11 pgs.
"Chinese Application Serial No. 201780034240.5, Response filed Oct. 16, 2020 to Office Action mailed Jun. 3, 2020", w/ English Translation, 8 pgs.
"European Application Serial No. 14804343.3, Extended European Search Report mailed Sep. 29, 2016", 12 pgs.
"European Application Serial No. 15733026.7, Communication Pursuant to Article 94(3) EPC mailed Jul. 28, 2017", 6 pgs.
"European Application Serial No. 15733026.7, Decision to Refuse a European Patent Application mailed Nov. 18, 2019", 20 pgs.
"European Application Serial No. 15733026.7, Response filed Jan. 30, 2018 to Communication Pursuant to Article 94(3) EPC mailed Jul. 28, 2017", w/ Amended Claims, 37 pgs.
"European Application Serial No. 15733026.7, Response filed Aug. 9, 2019 to Summons to Attend Oral Proceedings mailed Jan. 10, 2019", w/ English Claims, 19 pgs.
"European Application Serial No. 15733026.7, Summons to Attend Oral Proceedings mailed Jan. 10, 2019", 7 pgs.
"European Application Serial No. 15782165.3, Communication Pursuant to Article 94(3) EPC mailed Sep. 14, 2018", 7 pgs.
"European Application Serial No. 15782165.3, Decision to Refuse a European Patent Application mailed Mar. 19, 2020", 23 pgs.
"European Application Serial No. 15782165.3, Response filed Jan. 10, 2020 to Summons to Attend Oral Proceedings mailed Sep. 18, 2019", 18 pgs.
"European Application Serial No. 15782165.3, Response filed Jan. 24, 2019 to Communication Pursuant to Article 94(3) EPC mailed Sep. 14, 2018", w/ English Claims, 54 pgs.
"European Application Serial No. 15782165.3, Response filed Oct. 17, 2017 to Communication pursuant to Rules 161(1) and 162 EPC mailed May 10, 2017", 15 pgs.
"European Application Serial No. 15782165.3, Summons to Attend Oral Proceedings mailed Sep. 18, 2019", 6 pgs.
"European Application Serial No. 15787854.7, Communication Pursuant to Article 94(3) EPC mailed Feb. 12, 2020", 7 pgs.
"European Application Serial No. 15787854.7, Response filed Dec. 11, 2017 to Communication Pursuant to Rules 161(1) and 162 EPC mailed Jun. 1, 2017", 16 pgs.
"European Application Serial No. 15841735.2, Communication Pursuant to Article 94(3) EPC mailed Jan. 17, 2019", 7 pgs.
"European Application Serial No. 15841735.2, Extended European Search Report mailed Feb. 12, 2018", 9 pgs.
"European Application Serial No. 15870861.0, Communication Pursuant to Article 94(3) EPC mailed Jul. 12, 2018", 5 pgs.
"European Application Serial No. 15870861.0, Extended European Search Report mailed Jul. 3, 2018", 4 pgs.
"European Application Serial No. 15870861.0, Response filed May 31, 2019 to Summons to Attend Oral Proceedings mailed Dec. 21, 2018", w/ English Claims, 23 pgs.
"European Application Serial No. 15870861.0, Response filed Aug. 9, 2017 to Communication Pursuant to Rules 161(2) and 162 EPC mailed Aug. 4, 2017", 10 pgs.
"European Application Serial No. 15870861.0, Response filed Nov. 14, 2018 to Communication Pursuant to Article 94(3) EPC mailed Jul. 12, 2018", w/ English Claims, 27 pgs.
"European Application Serial No. 15870861.0, Summons to Attend Oral Proceedings mailed Dec. 21, 2018", 5 pgs.
"European Application Serial No. 15870874.3, Communication Pursuant to Article 94(3) EPC mailed Feb. 22, 2021", 5 pgs.
"European Application Serial No. 15870874.3, Extended European Search Report mailed Nov. 29, 2017", 7 pgs.
"European Application Serial No. 16829020.3, Communication Pursuant to Article 94(3) EPC mailed Sep. 9, 2020", 3 pgs.
"European Application Serial No. 16829020.3, Response filed Jan. 29, 2019 to Communication Pursuant to Rules 161(1) and 162 EPC mailed Jul. 25, 2018", w/ English Claims, 17 pgs.
"European Application Serial No. 20173925.7, Extended European Search Report mailed Aug. 20, 2020", 8 pgs.
"European Application Serial No. 21195813.7, Extended European Search Report mailed Dec. 20, 2021", 8 pgs.
"International Application Serial No. PCT/US2015/037251, Written Opinion mailed Sep. 29, 2015", 4 pgs.
"International Application Serial No. PCT/US2015/050424, International Preliminary Report on Patentability mailed Mar. 30, 2017", 12 pgs.

(56) References Cited

OTHER PUBLICATIONS

"International Application Serial No. PCT/US2015/065785, International Preliminary Report on Patentability mailed Jun. 29, 2017", 7 pgs.
"International Application Serial No. PCT/US2015/065821, International Preliminary Report on Patentability mailed Jun. 29, 2017", 5 pgs.
"International Application Serial No. PCT/US2016/066976, International Preliminary Report on Patentability mailed Jun. 28, 2018", 9 pgs.
"International Application Serial No. PCT/US2016/066976, International Search Report mailed May 17, 2017", 7 pgs.
"International Application Serial No. PCT/US2016/066976, Invitation to Pay Add'l Fees and Partial Search Rpt mailed Mar. 6, 2017", 8 pgs.
"International Application Serial No. PCT/US2016/066976, Written Opinion mailed May 17, 2017", 7 pgs.
"International Application Serial No. PCT/US2017/025925, International Preliminary Report on Patentability mailed Oct. 18, 2018", 6 pgs.
"International Application Serial No. PCT/US2017/025925, International Search Report mailed Jun. 28, 2017", 2 pgs.
"International Application Serial No. PCT/US2017/025925, Written Opinion mailed Jun. 28, 2017", 4 pgs.
"International Application Serial No. PCT/US2018/024093, International Preliminary Report on Patentability mailed Oct. 10, 2019", 7 pgs.
"International Application Serial No. PCT/US2018/024093, International Search Report mailed Jul. 19, 2018", 2 pgs.
"International Application Serial No. PCT/US2018/024093, Written Opinion mailed Jul. 19, 2018", 5 pgs.
"Korean Application Serial No. 10-2017-7001104, Response filed Jul. 25, 2017 to Office Action mailed Jun. 26, 2017", w/ Translation of Claims, 20 pgs.
"Korean Application Serial No. 10-2017-7012120, Notice of Preliminary Rejection mailed Jun. 17, 2020", w/ English Translation, 8 pgs.
"Korean Application Serial No. 10-2017-7012120, Response filed Sep. 3, 2020 to Notice of Preliminary Rejection mailed Jun. 17, 2020", w/ English Claims, 22 pgs.
"Korean Application Serial No. 10-2017-7014135, Final Office Action mailed Feb. 28, 2019", w/ English Translation, 7 pgs.
"Korean Application Serial No. 10-2017-7014135, Notice of Preliminary Rejection mailed Apr. 19, 2019", w/ English Translation, 14 pgs.
"Korean Application Serial No. 10-2017-7014135, Notice of Preliminary Rejection mailed Jul. 20, 2018", w/ English Translation, 13 pgs.
"Korean Application Serial No. 10-2017-7014135, Response filed Mar. 29, 2019 to Final Office Action mailed Feb. 28, 2019", w/ English Claims, 14 pgs.
"Korean Application Serial No. 10-2017-7014135, Response filed Jun. 19, 2019 to Notice of Preliminary Rejection mailed Apr. 19, 2019", w/ English Claims, 16 pgs.
"Korean Application Serial No. 10-2017-7014135, Response filed Sep. 17, 2018 to Notice of Preliminary Rejection mailed Jul. 20, 2018", w/ English Claims, 16 pgs.
"Korean Application Serial No. 10-2017-7020217, Final Office Action mailed Jan. 31, 2018", w/ English Translation, 10 pgs.
"Korean Application Serial No. 10-2017-7020217, Office Action mailed Sep. 15, 2017", w/ English Translation, 11 pgs.
"Korean Application Serial No. 10-2017-7020217, Response filed Feb. 23, 2018 to Final Office Action mailed Jan. 31, 2018", w/ English Translation, 13 pgs.
"Korean Application Serial No. 10-2017-7020217, Response filed Nov. 2, 2017 to Office Action mailed Sep. 15, 2017", w/ English Translation, 17 pgs.
"Korean Application Serial No. 10-2017-7035789, Notice of Preliminary Rejection mailed Nov. 12, 2018", w/ English Translation, 12 pgs.
"Korean Application Serial No. 10-2017-7035789, Response filed Jan. 10, 2019 to Notice of Preliminary Rejection mailed Nov. 12, 2018", w/ English Claims, 23 pgs.
"Korean Application Serial No. 10-2018-7002127, Notice of Preliminary Rejection mailed Apr. 10, 2018", w/ English Translation, 4 pgs.
"Korean Application Serial No. 10-2018-7002127, Response filed May 16, 2018 to Notice of Preliminary Rejection mailed Apr. 10, 2018", w/ English Claims, 14 pgs.
"Korean Application Serial No. 10-2018-7016881, Notice of Preliminary Rejection mailed Oct. 19, 2018", w/ English translation, 9 pgs.
"Korean Application Serial No. 10-2018-7016881, Response filed Nov. 30, 2018 to Notice of Preliminary Rejection mailed Oct. 19, 2018", w/ English Claims, 27 pgs.
"Korean Application Serial No. 10-2018-7031943, Notice of Preliminary Rejection mailed Feb. 11, 2020", w/ English Translation, 9 pgs.
"Korean Application Serial No. 10-2018-7031943, Response filed Jun. 18, 2020 to Notice of Preliminary Rejection mailed Feb. 11, 2020", w/ English Claims, 20 pgs.
"Korean Application Serial No. 10-2018-7037070, Notice of Final Rejection mailed Sep. 30, 2019", w/ English Translation, 5 pgs.
"Korean Application Serial No. 10-2018-7037070, Notice of Final Rejection mailed Nov. 25, 2019", w/ English Translation, 5 pgs.
"Korean Application Serial No. 10-2018-7037070, Notice of Preliminary Rejection mailed Mar. 20, 2019", w/ English Translation, 10 pgs.
"Korean Application Serial No. 10-2018-7037070, Response filed Oct. 23, 2019 to Notice of Final Rejection mailed Sep. 30, 2019", w/ English Claims, 16 pgs.
"Korean Application Serial No. 10-2018-7037070, Response filed May 14, 2019 to Notice of Preliminary Rejection mailed Mar. 20, 2019", w/ English Translation, 10 pgs.
"Korean Application Serial No. 10-2019-7025443, Response filed May 3, 2021 to Notice of Preliminary Rejection mailed Feb. 2, 2021", w/ English Claims, 29 pgs.
"Korean Application Serial No. 10-2019-7031595, Notice of Preliminary Rejection mailed Sep. 1, 2020", w/ English translation, 11 pgs.
"Korean Application Serial No. 10-2019-7036962, Notice of Preliminary Rejection mailed Jan. 3, 2020", w/ English Translation, 11 pgs.
"Korean Application Serial No. 10-2019-7036962, Response filed Feb. 17, 2020 to Notice of Preliminary Rejection mailed Jan. 3, 2020", w/ English Claims, 25 pgs.
"Korean Application Serial No. 10-2019-7038483, Notice of Preliminary Rejection mailed Jan. 31, 2020", w/ English translation, 4 pgs.
"Korean Application Serial No. 10-2019-7038483, Response filed Mar. 10, 2020 to Notice of Preliminary Rejection mailed Jan. 31, 2020", w/ English Claims, 19 pgs.
"Korean Application Serial No. 10-2020-7008140, Notice of Preliminary Rejection mailed Jun. 16, 2020", w/ English Translation, 7 pgs.
"Korean Application Serial No. 10-2020-7008140, Office Action mailed Dec. 30, 2020", w/ English Translation, 7 pgs.
"Korean Application Serial No. 10-2020-7008140, Response filed Jan. 28, 2021 to Office Action mailed Dec. 30, 2020", w/ English Claims, 16 pgs.
"Korean Application Serial No. 10-2020-7008140, Response filed Aug. 14, 2020 to Notice of Preliminary Rejection mailed Jun. 16, 2020", w/ English Claims, 21 pgs.
"Korean Application Serial No. 10-2020-7024025, Notice of Preliminary Rejection mailed Sep. 1, 2020", w/ English Translation, 4 pgs.
"Korean Application Serial No. 10-2021-7001942, Notice of Preliminary Rejection mailed Apr. 20, 2021", w/ English translation, 11 pgs.
"Korean Application Serial No. 10-2021-7001942, Notice of Preliminary Rejection mailed Oct. 28, 2021", w/ English Translation, 11 pgs.

(56) References Cited

OTHER PUBLICATIONS

"Korean Application Serial No. 10-2021-7001942, Response filed Jun. 15, 2021 to Notice of Preliminary Rejection mailed Apr. 20, 2021", w/ English Claims, 22 pgs.
"Korean Application Serial No. 10-2021-7004232, Notice of Preliminary Rejection mailed Feb. 23, 2021", w/ English translation, 12 pgs.
"Korean Application Serial No. 10-2021-7004232, Response filed May 24, 2021 to Notice of Preliminary Rejection mailed Feb. 23, 2021", w/ English Claims, 22 pgs.
"Korean Application Serial No. 10-2021-7013085, Notice of Preliminary Rejection mailed Jul. 30, 2021", With English translation, 8 pgs.
"Korean Application Serial No. 10-2021-7013085, Response filed Sep. 30, 2021 to Notice of Preliminary Rejection mailed Jul. 30, 2021", w/ English Claims, 17 pgs.
"Korean Application Serial No. 10-2021-7042330, Notice of Preliminary Rejection mailed Mar. 8, 2022", w/ English translation, 12 pgs.
"Korean Office Action Application Serial No. 10-2017-7001104, Office Action mailed Jun. 26, 2017", w/ English Translation, 12 pgs.
"Surprise!", [Online] Retrieved from the Internet: <URL: https://www.snap.com/en-us/news/post/surprise>, (Oct. 3, 2013), 1 pg.
"To Err is Human. To Self Destruct Messages, There is iDelete for iOS", The Apple Google, [Online]. Retrieved from the Internet on Mar. 21, 2018: <http://theapplegoogle.com/2013/04/err-human-destruct-messages-idelete-ios/>, (2013), 2 pgs.
Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.
Chen, Datong, et al., "Protecting Personal Identification in Video", Protecting Privacy in Video Surveillance, Springer-Verlag London Ltd., (2009), 115-128.
Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.
Fajman, "An Extensible Message Format for Message Disposition Notifications", Request for Comments: 2298, National Institutes of Health, (Mar. 1998), 28 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.
Isaac, Mike, "New Mobile App Vyclone Aims to Remix Social Video From Every Angle", All Things D, The Wallstreet Journal, [Online] Retrieved from the Internet: <URL: http://allthingsd.com/20120718/new-mobile-app-vyclone-aims-to-remix-social-video-from-every-angle/>, (Jul. 18, 2012), 4 pgs.
Lorenz, Taylor, "Snapchat reveals Taylor geofilters that can only be unlocked in the right place", Daily Mail Online, [Online] Retrieved from the Internet: <URL: http://www.dailymail.co.uk/sciencetech/article-2693196/Snapchat-introduces-location-specific-Geofilters.html>, (Jul. 17, 2014), 30 pgs.
Rossignol, Joe, "How to screenshot Snapchat without sending notification", [Online] Retrieved from the Internet: <URL: https://www.idownloadblog.com/author/joerossignol/>, (May 3, 2014), 16 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.
Wagner, Kurt, "Snapchat Rolls Out Group-Sharing Feature for Concerts, Live Events", Mashable, [Online] Retrieved from the Internet on Sep. 12, 2019: <URL: https://mashable.com/2014/06/17/snapchat-our-story/?europe=true>, (Jun. 17, 2014), 16 pgs.
"U.S. Appl. No. 17/537,194, Response filed Jan. 17, 2023 to Non Final Office Action mailed Sep. 16, 2022", 11 pgs.
"U.S. Appl. No. 17/112,676, Non Final Office Action mailed Jan. 20, 2023", 13 pgs.
"U.S. Appl. No. 17/537,194, Final Office Action mailed Feb. 13, 2023", 20 pgs.
"U.S. Appl. No. 15/474,821, Non Final Office Action mailed Feb. 27, 2023", 60 pgs.
"U.S. Appl. No. 17/035,575, Corrected Notice of Allowability mailed Mar. 8, 2023", 4 pgs.
"U.S. Appl. No. 17/699,985, Response filed Mar. 21, 2023 to Final Office Action mailed Dec. 27, 2022", 9 pgs.
"U.S. Appl. No. 16/943,804, Response filed Mar. 22, 2023 to Non Final Office Action mailed Dec. 28, 2022", 10 pgs.
"U.S. Appl. No. 15/474,821, Response filed Mar. 30, 2023 to Non Final Office Action mailed Feb. 27, 2023", 11 pgs.
"U.S. Appl. No. 16/943,804, Final Office Action mailed Apr. 5, 2023", 16 pgs.
"U.S. Appl. No. 17/699,985, Notice of Allowance mailed Apr. 7, 2023", 7 pgs.
Garzon, Rodriguez Sandro, "Geofencing 2.0: Taking Location-based Notifications to the Next Level", (2012).
"U.S. Appl. No. 17/112,676, Response filed Apr. 19, 2023 to Non Final Office Action mailed Jan. 20, 2023", 10 pgs.
"U.S. Appl. No. 15/474,821, Final Office Action mailed Apr. 20, 2023", 61 pgs.
"U.S. Appl. No. 16/943,706, Notice of Non-Responsive Amendment mailed Jan. 31, 2023", 2 pgs.
"U.S. Appl. No. 16/943,706, Response filed May 1, 2023 to Notice of Non-Responsive Amendment mailed Jan. 31, 2023", 13 pgs.
"U.S. Appl. No. 16/428,210, Response filed May 5, 2023 to Notice of Non-Compliant Amendment mailed Dec. 28, 2022", 12 pgs.
"U.S. Appl. No. 17/112,676, Final Office Action mailed May 11, 2023", 17 pgs.
"U.S. Appl. No. 17/537,194, Response filed May 15, 2023 to Final Office Action mailed Feb. 13, 2023", 12 pgs.
"U.S. Appl. No. 15/474,821, Response filed May 25, 2023 to Final Office Action mailed Apr. 20, 2023", 11 pgs.
"U.S. Appl. No. 16/943,706, Non Final Office Action mailed Jun. 1, 2023", 19 pgs.
"U.S. Appl. No. 18/162,404, Non Final Office Action mailed Jun. 5, 2023", 29 pgs.
"U.S. Appl. No. 16/428,210, Final Office Action mailed Jun. 7, 2023", 16 pgs.
"Chinese Application Serial No. 201880009907.0, Response filed Mar. 11, 2023 to Office Action mailed Oct. 27, 2022", w English Claims, 17 pgs.
"Chinese Application Serial No. 201880009907.0, Office Action mailed May 18, 2023", w English Translation, 4 pgs.
"U.S. Appl. No. 16/943,804, Response filed Jul. 3, 2023 to Final Office Action mailed Apr. 5, 2023", 9 pgs.
"U.S. Appl. No. 16/943,804, Examiner Interview Summary mailed Jul. 10, 2023", 2 pgs.
"U.S. Appl. No. 17/035,575, Notice of Allowance mailed Oct. 17, 2022", 8 pgs.
"U.S. Appl. No. 17/699,985, Response filed Oct. 25, 2022 to Non Final Office Action mailed Jul. 25, 2022", 10 pgs.
"Korean Application Serial No. 10-2022-7007037, Response filed Sep. 5, 2022 to Notice of Preliminary Rejection mailed Jul. 5, 2022", w English Claims, 18 pgs.
"U.S. Appl. No. 17/943,804, Response filed Oct. 25, 2022 to Final Office Action mailed Aug. 12, 2022", 10 pgs.
"U.S. Appl. No. 16/943,706, Response filed Nov. 11, 2022 to Final Office Action mailed Aug. 12, 2022", 8 pgs.
"U.S. Appl. No. 15/474,821, Final Office Action mailed Nov. 17, 2022", 40 pgs.
"U.S. Appl. No. 17/112,676, Response filed Nov. 17, 2022 to Non Final Office Action mailed Sep. 9, 2022", 13 pgs.
"U.S. Appl. No. 16/428,210, Response filed Nov. 21, 2022 to Non Final Office Action mailed Sep. 9, 2022", 8 pgs.
"U.S. Appl. No. 17/112,676, Final Office Action mailed Dec. 1, 2022", 14 pgs.
"U.S. Appl. No. 17/699,985, Final Office Action mailed Dec. 27, 2022", 7 pgs.

(56) References Cited

OTHER PUBLICATIONS

"U.S. Appl. No. 16/943,804, Non Final Office Action mailed Dec. 28, 2022", 18 pgs.
"Chinese Application Serial No. 201880009907.0, Office Action mailed Oct. 27, 2022", W English Translation, 13 pgs.
"U.S. Appl. No. 16/428,210, Notice of Non-Compliant Amendment mailed Dec. 28, 2022", 2 pgs.
"U.S. Appl. No. 15/474,821, Response filed Jan. 12, 2023 to Final Office Action mailed Nov. 17, 2022", 10 pgs.
"U.S. Appl. No. 17/112,676, Response filed Jan. 12, 2023 to Final Office Action mailed Dec. 1, 2022", 10 pgs.
Constantinides, Stephen, "Real time geo-social visualization platform", U.S. Appl. No. 15/189,691 filed Jun. 22, 2016, 57 pgs.
Feldman, Douglas E, "Map-based remarks", U.S. Appl. No. 60/994,591 filed May 16, 2014, 43 pgs.
Rush, David, "Real Time Relevancy Scoring System for Social Media Posts", U.S. Appl. No. 60/038,837 filed Aug. 19, 2014, 7 pgs.
U.S. Appl. No. 17/537,194, filed Nov. 29, 2021, Accessing Medita at a Geographic Location.
U.S. Appl. No. 17/699,985, filed Mar. 21, 2022, Geolocation-Based Pictographs.
U.S. Appl. No. 17/035,575, filed Sep. 28, 2020, Geo-Fence Authorization Provisioning.
U.S. Appl. No. 14/529,064, filed Oct. 30, 2014, Priority Based Placement of Messages in Geo-Location Based Event Gallery.
U.S. Appl. No. 15/474,821, filed Mar. 30, 2017, Mutable Geo-Fencing System.
U.S. Appl. No. 16/428,210, filed May 31, 2019, Location-Based Messaging.
U.S. Appl. No. 16/943,706, filed Jul. 30, 2020, Map Interface with Icon for Location-Based Messages.
U.S. Appl. No. 16/943,804, filed Jul. 30, 2020, Map Interface with Message Marker for Location-Based Messages.
U.S. Appl. No. 17/112,676, filed Dec. 4, 2020, System to Determine A Price-Schedule to Distribute Media Content to Users at Geo-Fenced Events Based on A Number of Unique Client Devices.
"U.S. Appl. No. 15/474,821, Response filed Jul. 27, 2022 to Non Final Office Action mailed Jun. 20, 2022", 10 pgs.
"U.S. Appl. No. 16/428,210, Response filed Jul. 29, 2022 to Final Office Action mailed Apr. 1, 2022", 13 pgs.
"U.S. Appl. No. 16/943,706, Response filed Jul. 29, 2022 to Non Final Office Action mailed Mar. 22, 2022", 12 pgs.
"U.S. Appl. No. 16/943,804, Response filed Jul. 29, 2022 to Non Final Office Action mailed Apr. 1, 2022", 10 pgs.
"U.S. Appl. No. 17/537,194, Preliminary Amendment filed Aug. 3, 2022", 8 pgs.
"Chinese Application Serial No. 202010978249.5, Response filed Jul. 7, 2022 to Office Action mailed Mar. 11, 2022", w English claims, 8 pgs.
"U.S. Appl. No. 16/943,706, Final Office Action mailed Aug. 12, 2022", 17 pgs.
"U.S. Appl. No. 16/943,804, Final Office Action mailed Aug. 12, 2022", 17 pgs.
"U.S. Appl. No. 17/112,676, Response filed Aug. 24, 2022 to Final Office Action mailed Jun. 29, 2022", 13 pgs.
"U.S. Appl. No. 17/035,575, Response filed Aug. 25, 2022 to Non Final Office Action mailed May 26, 2022", 12 pgs.
"U.S. Appl. No. 16/428,210, Non Final Office Action mailed Sep. 9, 2022", 15 pgs.
"U.S. Appl. No. 17/112,676, Non Final Office Action mailed Sep. 9, 2022", 24 pgs.
"U.S. Appl. No. 17/537,194, Non Final Office Action mailed Sep. 16, 2022", 17 pgs.
"U.S. Appl. No. 15/474,821, Notice of Allowance mailed Sep. 27, 2023", 12 pgs.
"U.S. Appl. No. 16/428,210, Examiner Interview Summary mailed Sep. 7, 2023", 2 pgs.
"U.S. Appl. No. 16/428,210, Non Final Office Action mailed Oct. 26, 2023", 14 pgs.
"U.S. Appl. No. 16/428,210, Response filed Sep. 7, 2023 to Final Office Action mailed Jun. 7, 2023", 9 pgs.
"U.S. Appl. No. 16/943,706, Examiner Interview Summary mailed Aug. 28, 2023", 2 pgs.
"U.S. Appl. No. 16/943,706, Final Office Action mailed Oct. 30, 2023", 20 pgs.
"U.S. Appl. No. 16/943,706, Response filed Sep. 1, 2023 to Non Final Office Action mailed Jun. 1, 2023", 10 pgs.
"U.S. Appl. No. 16/943,804, Examiner Interview Summary mailed Nov. 14, 2023", 2 pgs.
"U.S. Appl. No. 16/943,804, Non Final Office Action mailed Aug. 18, 2023", 16 pgs.
"U.S. Appl. No. 16/943,804, Response filed Nov. 17, 2023 to Non Final Office Action mailed Aug. 18, 2023", 10 pgs.
"U.S. Appl. No. 17/112,676, Advisory Action mailed Aug. 4, 2023", 5 pgs.
"U.S. Appl. No. 17/112,676, Final Office Action mailed Nov. 24, 2023", 21 pgs.
"U.S. Appl. No. 17/112,676, Non Final Office Action mailed Sep. 1, 2023", 19 pgs.
"U.S. Appl. No. 17/112,676, Response filed Jul. 24, 2023 to Final Office Action mailed May 11, 2023", 14 pgs.
"U.S. Appl. No. 17/112,676, Response filed Nov. 14, 2023 to Non Final Office Action mailed Sep. 1, 2023", 15 pgs.
"U.S. Appl. No. 17/537,194, Non Final Office Action mailed Aug. 4, 2023", 23 pgs.
"U.S. Appl. No. 17/537,194, Notice of Allowance mailed Dec. 7, 2023", 10 pgs.
"U.S. Appl. No. 17/537,194, Response filed Nov. 6, 2023 to Non Final Office Action mailed Aug. 4, 2023", 12 pgs.
"U.S. Appl. No. 18/162,404, Notice of Allowance mailed Oct. 2, 2023", 11 pgs.
"U.S. Appl. No. 18/162,404, Response filed Aug. 22, 2023 to Non Final Office Action mailed Jun. 5, 2023", 11 pgs.
"Korean Application Serial No. 10-2023-7003584, Notice of Preliminary Rejection mailed Sep. 14, 2023", With English machine translation, 15 pgs.
"Korean Application Serial No. 10-2023-7003584, Response filed Nov. 14, 2023 to Notice of Preliminary Rejection mailed Sep. 14, 2023", w/ current English claims, 20 pgs.
"U.S. Appl. No. 16/428,210, Supplemental Notice of Allowability mailed Apr. 11, 2024", 3 pgs.
"U.S. Appl. No. 16/428,210, Examiner Interview Summary mailed Jan. 26, 2024", 2 pgs.
"U.S. Appl. No. 16/943,706, Examiner Interview Summary mailed Jan. 26, 2024", 2 pgs.
"U.S. Appl. No. 16/428,210, Response filed Jan. 26, 2024 to Non Final Office Action mailed Oct. 26, 2023", 12 pgs.
"U.S. Appl. No. 16/943,706, Response filed Jan. 30, 2024 to Final Office Action mailed Oct. 30, 2023", 13 pgs.
"U.S. Appl. No. 16/943,804, Final Office Action mailed Feb. 22, 2024", 18 pgs.
"U.S. Appl. No. 16/428,210, Notice of Allowance mailed Mar. 6, 2024", 14 pgs.
"European Application Serial No. 24150528.8, Extended European Search Report mailed Apr. 18, 2024", 7 pgs.
"U.S. Appl. No. 16/428,210, 312 Amendment filed Jun. 5, 2024", 3 pgs.
"U.S. Appl. No. 16/428,210, PTO Response to Rule 312 Communication mailed Jun. 17, 2024", 2 pgs.
"U.S. Appl. No. 16/943,706, Corrected Notice of Allowability mailed Jun. 14, 2024", 3 pgs.
"U.S. Appl. No. 16/943,706, Notice of Allowance mailed Jun. 6, 2024", 17 pgs.
"U.S. Appl. No. 16/943,804, Response filed Jun. 24, 2024 to Final Office Action mailed Feb. 22, 2024", 12 pgs.
"U.S. Appl. No. 18/521,752, Non Final Office Action mailed Jul. 3, 2024", 30 pgs.
"European Application Serial No. 24150528.8, Response filed Jul. 18, 2024 to Extended European Search Report mailed Apr. 18, 2024", 13 pgs.
"U.S. Appl. No. 16/943,706, 312 Amendment filed Sep. 5, 2024", 11 pgs.

(56) References Cited

OTHER PUBLICATIONS

"U.S. Appl. No. 18/521,752, Response filed Sep. 10, 2024 to Non Final Office Action mailed Jul. 3, 2024", 10 pgs.
"U.S. Appl. No. 16/943,804, Notice of Allowance mailed Sep. 11, 2024", 14 pgs.
"U.S. Appl. No. 18/521,752, Examiner Interview Summary mailed Sep. 12, 2024", 2 pgs.
"U.S. Appl. No. 16/943,706, PTO Response to Rule 312 Communication mailed Sep. 12, 2024", 2 pgs.
"U.S. Appl. No. 18/521,752, Notice of Allowance mailed Oct. 9, 2024", 11 pgs.
"U.S. Appl. No. 16/943,804, Corrected Notice of Allowability mailed Nov. 26, 2024", 3 pgs.

* cited by examiner

FIG. 4B
414
416
418
420
UPLOAD IMAGE
SELECT LOCATION
FILTER TITLE
SUBMIT
410
412

USER INTERFACE TO AUGMENT AN IMAGE USING GEOLOCATION

CROSS-REFERENCE TO RELATED APPLICATION

This application is a continuation of U.S. patent application Ser. No. 14/494,226, filed Sep. 23, 2014, which is incorporated by reference herein in its entirety.

TECHNICAL FIELD

The subject matter disclosed herein generally relates to user interface technology. Specifically, the present disclosure addresses systems and methods for a platform for publishing context relevant media filters, for presentation on the user interfaces of mobile devices.

BACKGROUND

The number of digital photographs taken with mobile wireless devices is increasingly outnumbering photographs taken with dedicated digital and film based cameras. Thus, there are growing needs to improve the experience associated with mobile wireless digital photography.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
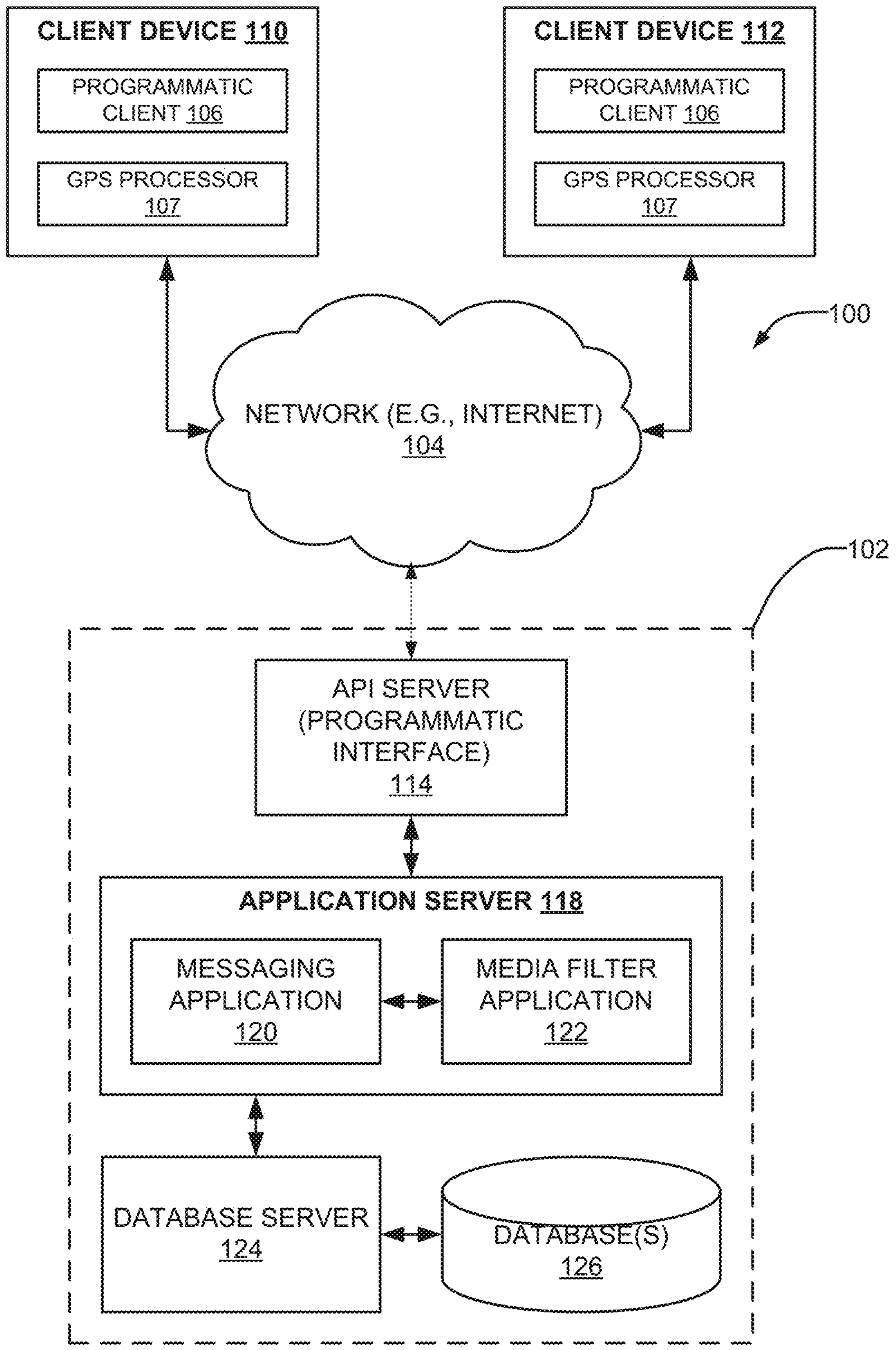
FIG. 1 is a network diagram depicting a network system having a client-server architecture configured for exchanging data over a network, according to one embodiment.

Although the present disclosure is described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The addition of labels, drawings and other artwork to images (e.g., pictures or video) provides a compelling way for users to personalize, supplement and enhance these images before storage or publication to a broader audience. An example embodiment seeks to provide users with a set of the geo-filters (e.g., enhancement and augmentations) that can be applied to an image. The set of enhancements and augmentations, in the example form of image overlays, may be determined based on a location associated with the image. The image overlays are presented to a user for selection and combining with an image based on a determined location of the image, or content of the image. For example, where a user takes a picture on a mobile device in Disneyland, an image overlay indicating the name "Disneyland", in a particular style, is presented to the user. Further Disneyland-themed image overlays may also be presented to the user. The presentation of the image overlay may be in response to the user performing a gesture (e.g. a swipe operation) on a screen of the mobile device. The user is then able to select the image overlay and have it applied to the image, in this way to personalize and enhance the image.

Third party entities (e.g., merchants, restaurants, individuals, etc.) may, in one example embodiment, seek to have geo-filters included in the set presented for user selection at a particular geographic location. For example, a restaurant at a particular location in San Francisco may wish to have their restaurant name and logo included in a set of geo-filters presented to a user, for the purposes of augmenting a photograph taken by the user proximate to the restaurant. According to one example embodiment, such third party entities may bid (or otherwise purchase opportunities) to have a particular geo-filter included in a set presented to a user for augmentation of a particular image. Below described are various systems and methodologies that may be used to technically implement the above described image enhancement technologies and capabilities.

More specifically, various examples of a media filter publication application are described. The media filter publication application operates at a server and generates media filters that include content based on geographic locations (also referred to as geolocation). A media filter may include audio and visual content or visual effects that can be applied to augment a media item at a mobile device. The media item may be a picture or a video. The media filter publication application includes a user-based media filter publication platform and a merchant-based publication platform.

In the user-based media filter publication platform, the media filter publication application provides a Graphical User interface (GUI) for a user to upload content and select a geolocation on a map. For example, the user may upload a logo and define boundaries on the map to identify a particular geolocation associated with the logo. Once the user submits the logo and identifies the particular geolocation, the media filter publication application generates a media filter that includes the logo associated with the particular geolocation. As such, mobile devices that are located within the particular geolocation have access to the media filter.

In the merchant-based media filter publication platform, the media filter publication application provides a GUI for merchants to upload content, select geolocations on a map, and submit bids for the corresponding geolocations. A bidding process determines the merchant with the highest bid amount. That merchant can then exclude publication of media filters from other merchants at a selected geolocation of the merchant. Therefore, the media filter of the highest bidding merchant may be the only media filter that can be accessed by mobile devices that are located at the selected geolocation.

In other examples, the media filter includes context relevant data, such as, a current temperature, an identification of a geolocation of the mobile device (e.g., Venice beach), a name of a live event associated with the geolocation of the mobile device, or a name of a business.

In one example embodiment, a media filter application at a server provides a live event media filter to a mobile device. The live event media filter includes live event data associated with a live event, such as a sporting event or an award ceremony, at a geolocation of the mobile device. For example, a user attending a football game can access a sports media filter that includes the current score of the football game. In another example, a user attending the Oscars award ceremony can access an entertainment media filter that includes a name of an Oscar winner.

In one example embodiment, the media filter application at the server provides a social network media filter to the mobile device. The social network media filter may be based on social network activities of the user of the mobile device. For example, if the user follows a brand such as McDonald's on a social network service, and the mobile device of the user is located at a McDonald's restaurant, the mobile device of the user can access a McDonald's media filter. Other users located at the same restaurant would not have access to the McDonald's media filter unless they also follow McDonald's on the social network service. In another example, the order in which the media filters are presented to users located at a McDonald's restaurant may be modified so that the McDonald's media filter is served higher for users following McDonald's on the social network service.

In one example embodiment, the media filter application at the server provides a promotion media filter to a mobile device. The promotion media filter may be based on promotions from a merchant. For example, the media filter may be used to implement a Monopoly™ game at McDonald's by randomly selecting a media filter every time the user of the mobile device walks into a McDonald's restaurant and purchases an item. The media filter can be used to obtain Monopoly puzzle pieces that can be redeemed towards prizes.

In one example embodiment, the media filter application at the server enables the mobile device to collect media filters. For example, the mobile filter application provides the mobile device with permanent access to collected media filters. The collected media filters may be stored in a collection portfolio for the mobile device. The mobile device may access any of the media filters in the collection portfolio at any time.

In one example embodiment, the media filter application at the server provides a history media filter to the mobile device. The history media filter may be based on geographic locations of historical sites visited by the user of the mobile device. For example, the mobile device is awarded with a unique media filter associated with one of the Seven Wonders of the World when the mobile device is located at one of the corresponding Seven Wonders geographic locations.

In one example embodiment, the media filter application at the server provides a progressive use media filter to the mobile device. The content in the progressive use media filter changes depending on the number of people that have previously used the progressive use media filter.

In one example embodiment, users can "purchase" a geolocation for a predetermined amount of time and select a media filter associated with the geolocation. For example, a college can purchase and select a particular media filter associated with the geolocation of its campus.

In one example embodiment, the media filter application provides a viral media filter to the mobile device. For example, when the user of the mobile device obtains the viral media filter at a geolocation, that user can send the viral media filter to mobile devices located outside the geolocation of the original user. Users of the mobile devices located outside the geolocation of the original user can make use of the viral media filter for the next hour. Those users can also forward the viral media filter to other users.

In one example embodiment, the media filter application 122 provides an actionable media filter to the mobile device. For example, the actionable media filter can be a link to open a browser page in the mobile device to obtain a coupon. The actionable media filter can trigger other functions of the mobile device.

System Architecture

FIG. 1 is a network diagram depicting a network system 100 having a client-server architecture configured for exchanging data over a network, according to one embodiment. For example, the network system 100 may be a messaging system where clients may communicate and exchange data within the network system 100. The data may pertain to various functions (e.g., sending and receiving text and media communication, determining geolocation) and aspects (e.g., publication of media filters, management of media filters) associated with the network system 100 and its users. Although illustrated herein as client-server architecture, other embodiments may include other network architectures, such as peer-to-peer or distributed network environments.

A data exchange platform, in an example, includes a messaging application 120 and a media filter application 122, and may provide server-side functionality via a network 104 (e.g., the Internet) to one or more clients. The one or more clients may include users that utilize the network system 100 and, more specifically, the messaging application 120 and the media filter application 122, to exchange data over the network 104. These operations may include transmitting, receiving (communicating), and processing data to, from, and regarding content and users of the network system 100. The data may include, but is not limited to, content and user data such as user profiles, messaging content, messaging attributes, media attributes, client device information, geolocation information, photo filters content, messaging content persistence conditions, social network information, and live event data information, among others.

In various embodiments, the data exchanges within the network system 100 may be dependent upon user-selected functions available through one or more client or user interfaces (UIs). The Ills may be associated with a client machine, such as client devices 110, 112 using a programmatic client 106, such as a client application. The programmatic client 106 may be in communication with the messaging application 120 and media filter application 122 via an application server 118. The client devices 110, 112 include mobile devices with wireless communication components, and audio and optical components for capturing various forms of media including photos and videos.

Turning specifically to the messaging application 120 and the media filter application 122, an application program interface (API) server 114 is coupled to, and provides programmatic interface to one or more application server(s) 118. The application server 118 hosts the messaging application 120 and the media filter application 122. The application server 118 is, in turn, shown to be coupled to one or more database servers 124 that facilitate access to one or more databases 126.

The API server 114 communicates and receives data pertaining to messages and media filters, among other things, via various user input tools. For example, the API server 114 may send and receive data to and from an application (e.g., the programmatic client 106) running on another client machine (e.g., client devices 110, 112 or a third party server).

In one example embodiment, the messaging application 120 provides messaging mechanisms for users of the client devices 110, 112 to send messages that include text and media content such as pictures and video. The client devices 110, 112 can access and view the messages from the messaging application 120 for a limited period of time. For example, the client device 110 can send a message to the client device 112 via the message application 120. Once the client device 112 accesses the message from the message application 120, the message is deleted after a predefined duration has elapsed from the time the client device 112 started viewing the message. Components of the messaging application 120 are described in more detail below with respect to FIG. 2.

In one example embodiment, the media filter application 122 provides a system and a method for operating and publishing media filters for messages processed by the messaging application 120. The media filter application 122 supplies a media filter to the client device 110 based on a geolocation of the client device 110. In another example, the media filter application 122 supplies a media filter to the client device 110 based on other information, such as, social network information of the user of the client device 110.

The media filter may include audio and visual content and visual effects. Examples of audio and visual content include pictures, texts, logos, animations, and sound effects. An example of a visual effect includes color filtering. The audio and visual content or the visual effects can be applied to a media content item (e.g., a photo) at the client device 110. For example, the media filter includes text that can be overlaid on top of a photo generated at the client device 110. In another example, the media filter includes an identification of a location overlay (e.g., Venice beach), a name of a live event, or a name of a merchant overlay (e.g., Beach Coffee House). In another example, the media filter application 122 uses the geolocation of the client device 110 to identify a media filter that includes the name of a merchant at the geolocation of the client device 110. The media filter may include other indicia associated with the merchant. Examples of indicia include logos and other pictures related to the merchant. The media filters may be stored in the database(s) 126 and accessed through the database server 124.

In one example embodiment, the media filter application 122 includes a user-based publication platform that enables users to select a geolocation on a map, and upload content associated with the selected geolocation. The user may also indicate other circumstances under which a particular media filter should be provided. The media filter application 122 generates a media filter that includes the uploaded content and associates the uploaded content with the selected geolocation.

In another example embodiment, the media filter application 122 includes a merchant-based publication platform that enables merchants to select a particular media filter associated with a geolocation via a bidding process. For example, the media filter application 122 associates the media filter of a highest bidding merchant with a corresponding geolocation for a predefined amount of time. Components of the media filter application 122 are described in more detail below with respect to FIG. 3.

Messaging Application

Figure 2:
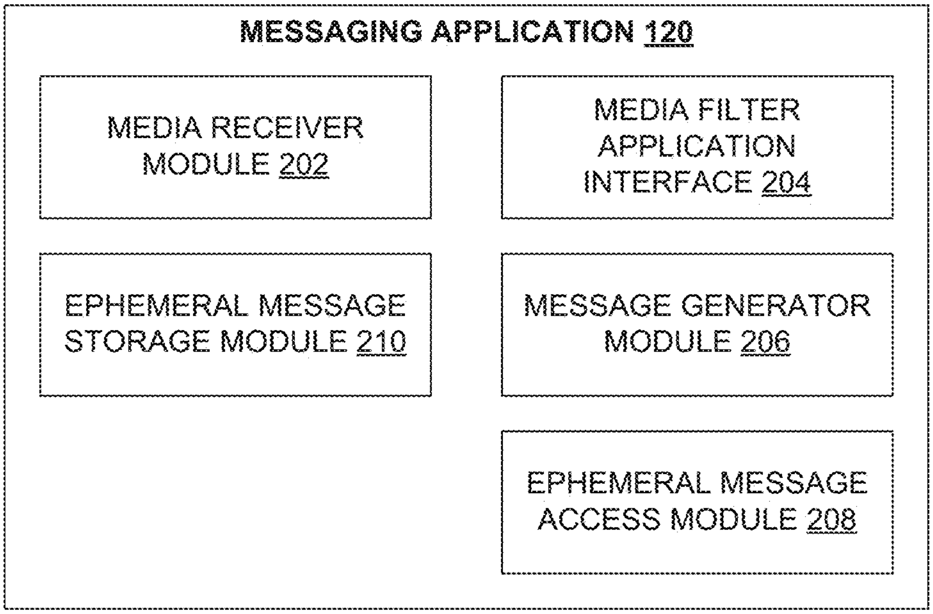
FIG. 2 shows a block diagram illustrating one example embodiment of a messaging application.

FIG. 2 shows a block diagram illustrating one example embodiment of the messaging application 120. The messaging application 120 may be hosted on dedicated or shared server machines (not shown) that are communicatively coupled to enable communications between server machines. The messaging application 120 and the media filter application 122 themselves are communicatively coupled (e.g., via appropriate interfaces) to each other and to various data sources, so as to allow information to be passed between the messaging application 120 and the media filter application 122, or so as to allow the messaging application 120 and the media filter application 122 to share and access common data. The messaging application 120 and the media filter application 122 may, furthermore, access the one or more databases 126 via the database server(s) 124.

The messaging application 120 is responsible for the generation and delivery of messages between users of the programmatic client 106. The messaging application 120 may utilize any one of a number of message delivery networks and platforms to deliver messages to users. For example, the messaging application 120 may deliver messages using electronic mail (e-mail), instant message (IM) Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

In one example embodiment, the messaging application 120 includes a media receiver module 202, a media filter application interface 204, a message generator module 206, an ephemeral message access module 208, and an ephemeral message storage module 210. The media receiver module 202 receives a message from the programmatic client 106 of the client device 110. The message may include a combination of text, photo, or video. The media receiver module 202 also receives persistence metadata associated with the message. The persistence metadata defines how long a message can be viewed. For example, the user of client device 110 may specify that the message be persistent or can only be viewed or accessed for a user-determined amount of time (e.g., ten seconds). The media filter application interface 204 communicates with the media filter application 122 to access and retrieve a media filter associated with the metadata in the message. The message generator module 206 applies the media filter to the message from the programmatic client 106 to create an ephemeral message and temporarily store the ephemeral message with the ephemeral message storage module 210.

The ephemeral message access module 208 notifies a recipient of the message of the availability of the ephemeral message. The ephemeral message access module 208 receives a request to access the ephemeral message from the recipient and causes the ephemeral message to be displayed on a client device of the recipient for the maximum duration specified in the persistence metadata. Once the recipient views the message for the maximum duration, the ephemeral message access module 208 causes the client device of the recipient to stop displaying the ephemeral message, and deletes the ephemeral message from the ephemeral message storage module 210.

Media Filter Application

Figure 3:
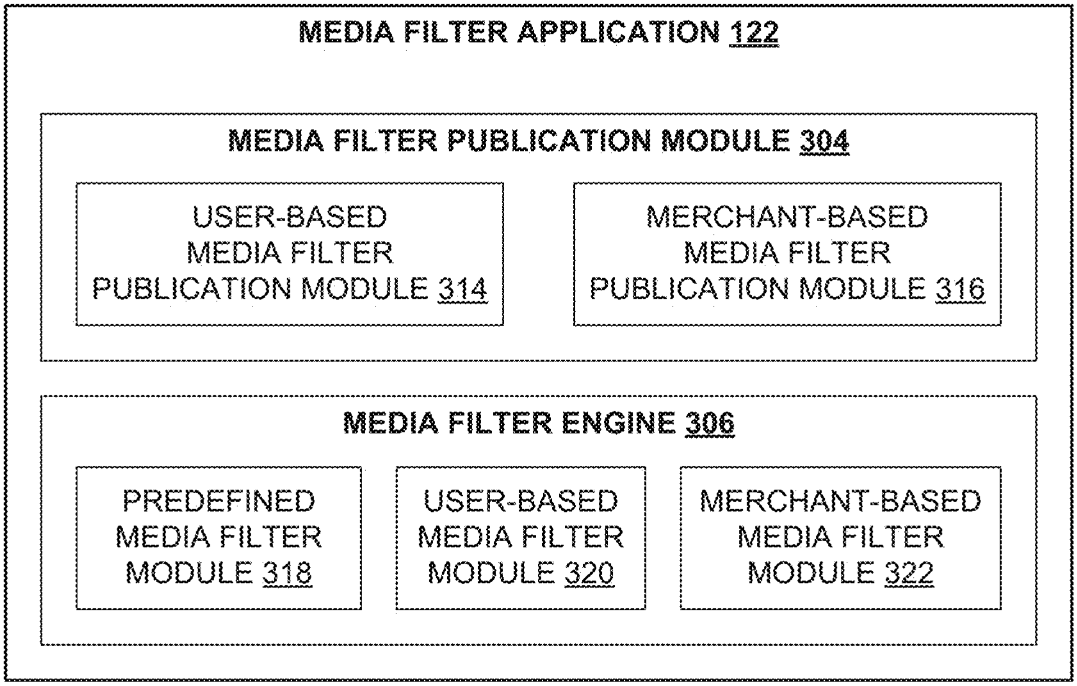
FIG. 3 shows a block diagram illustrating one example embodiment of a media filter application.

FIG. 3 shows a block diagram illustrating one example embodiment of the media filter application 122. The media filter application 122 includes a media filter publication module 304 and a media filter engine 306.

The media filter publication module 304 provides a platform for publication of media filters. In an example embodiment, the media filter publication module 304 includes a user-based media filter publication module 314 and a merchant-based media filter publication module 316. The user-based media filter publication module 314 enables users of client devices (either mobile or web clients) to upload content and select a geolocation for a user-based media filter. The merchant-based media filter publication module 316 enables merchants to upload content, select a geolocation, and submit a bid amount for a merchant-based media filter. The user-based media filter publication module 314 is described in more detail below with respect to FIG. 4A. The merchant-based media filter publication module 316 is described in more detail below with respect to FIG. 5A.

The media filter engine 306 generates and supplies a media filter based on the geolocation of a client device. In one example embodiment, the media filter engine 306 includes a predefined media filter module 318, a user-based media filter module 320, and a merchant-based media filter module 322. The media filter may be based on predefined media filters from the predefined media filter module 318, user-based media filters from the user-based media filter module 320, and merchant-based media filters from the merchant-based media filter module 322.

The predefined media filter module 318 supplies the client device with one of predefined media filters. Examples of predefined media filters are described in more detail below with respect to FIG. 6.

The user-based media filter module 320 supplies the client device with a user-based media filter generated by the user-based media filter publication module 314. The merchant-based media filter module 322 supplies the client device with a merchant-based media filter generated by the merchant-based media filter publication module 316.

Figure 4A:
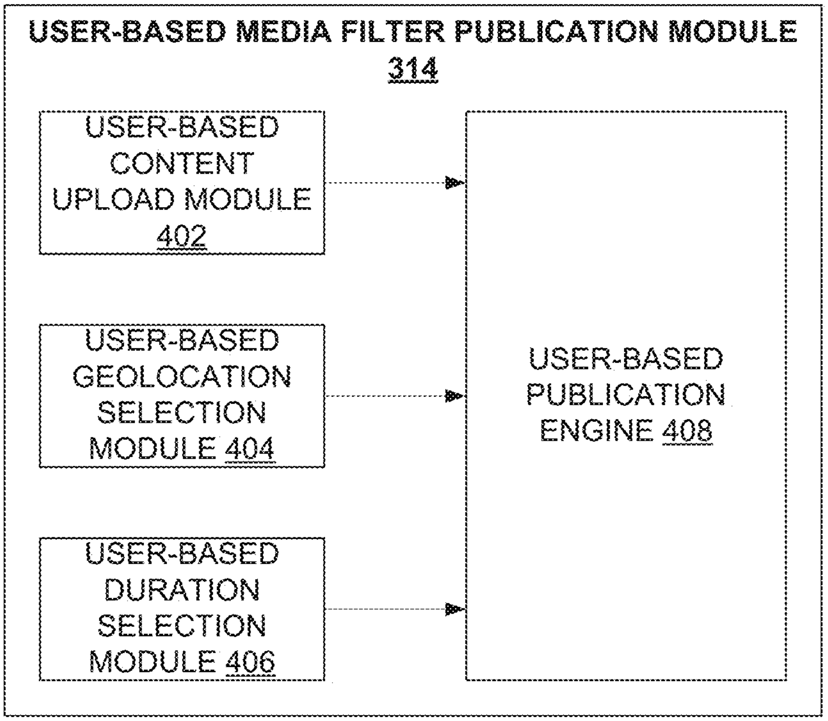
FIG. 4A shows a block diagram illustrating one example embodiment of a user-based media filter publication module.

FIG. 4A shows a block diagram illustrating one example embodiment of the user-based media filter publication module 314. The user-based media filter publication module 314 includes a user-based content upload module 402, a user-based geolocation selection module 404, a user-based duration selection module 406, and a user-based publication engine 408.

Figure 4B:
FIG. 4B shows an example of a graphical user interface for a user-based media filter publication module.

The user-based content upload module 402 receives uploaded content from a user. The content may include a media item such as a photo or a video. The user-based content upload module 402 may be implemented on a web server to allow a user to upload the content using a GUI as illustrated in FIG. 4B.

The user-based geolocation selection module 404 receives geolocation identification information from the user to identify a selected geolocation. The geolocation identification information may include an address, an identification of an establishment already associated with the address, Global Positioning System (GPS) coordinates, or a geographic, boundary. For example, the address may include a street number, street address, city, state, and country. The user may also identify a location based on an existing establishment. For example, the geolocation information may include "restaurant x" in Venice Beach. The geographic boundary identifies a region or a zone. For example, the geographic boundary may define a region located within a predetermined radius of an address, a point of interest, or a name of an existing establishment.

Figure 4C:
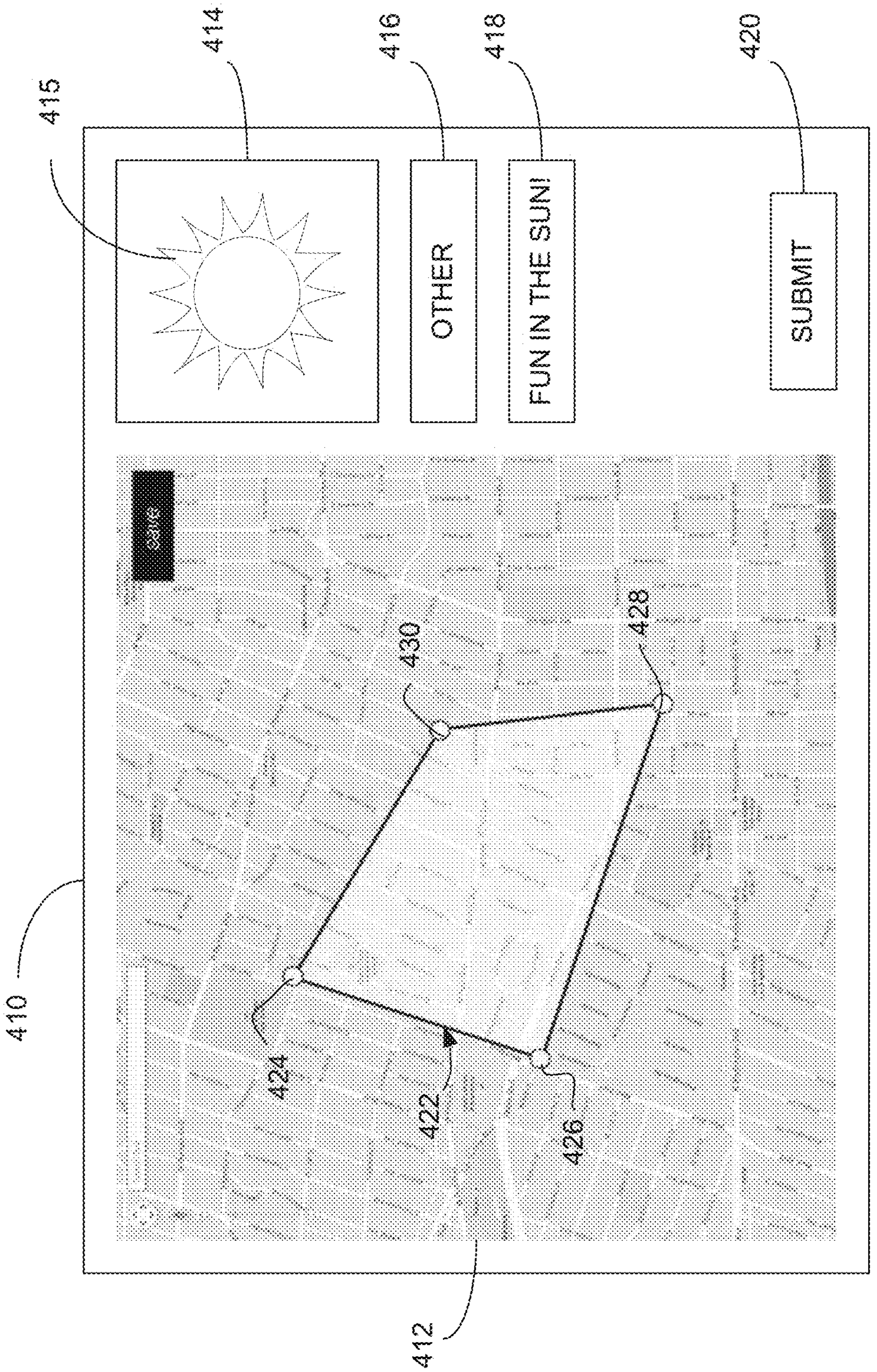
FIG. 4C shows an example of an operation of the graphical user interface of FIG. 4B.

In one example embodiment, the geolocation identification information may be embedded in a message or communication from a client device to the user-based geolocation selection module 404. For example, the user of the client device may take a picture of a sunset at Venice Beach and send the picture to the user-based geolocation selection module 404 that may then extract the geolocation attribute from the metadata associated with the picture of the sunset. The user-based geolocation selection module 404 may be implemented on a web server to present a user with a GUI in a web page that allows the user to select the geolocation for the content as illustrated in FIG. 4C.

The user-based duration selection module 406 receives, from the user, time duration information related to the uploaded content and selected geolocation. The time duration may identify a period of time during which the uploaded content is associated with the selected geolocation. Once the period of time has elapsed, the uploaded content is no longer associated with the selected geolocation. For example, if the time duration indicates twenty four hours, the media filter engine 306 makes the user-based media filter available to client devices that are located at the selected geolocation. Once twenty four hours has elapsed, the user-based media filter is no longer accessible by the client devices at the selected geolocation.

Other embodiments include a periodic time duration information or specific time duration information. For example, for the periodic time duration information, the user-based media filter is published and made available at the selected geolocation every Sunday (e.g., a religion related media filter available on days of religious services). For the specific time duration information, the user-based media filter is published and made available at the selected geolocation around a specific holiday or date (e.g., Thanksgiving weekend, New Year's day).

The user-based publication engine 408 generates a user-based media filter that associates the uploaded content from the user-based content upload module 402 with the selected geolocation from the user-based geolocation selection module 404. The user-based publication engine 408 publishes the user-based media filter to client devices that are located within the selected geolocation for the time duration identified with the user-based duration selection module 406.

In another example embodiment, the user-based publication engine 408 determines that no other user-based media filters exist during the same period of time for the same selected geolocation. The user-based media filter publication engine 408 may publish just one user-based media filter at any time for the same selected geolocation. In another example embodiment, a limit may be placed on the number of user-based media filters available at any time for the same selected geolocation. Thus, the user-based media filter publication engine 408 may publish and make available a limited number of user-based media filters at any time for the same selected geolocation. In another example embodiment, user-based media filters may be published to only contacts or 'friends' of the uploading user.

FIG. 4B illustrates an example of a GUI 410 for uploading content and for selecting a geographic region on a map. The GUI 410 includes a map 412, an upload image box 414, a select location button 416, a filter title box 418, and a submit button 420. The upload image box 414 enables a user to upload content, (e.g., a picture) to the user-based content upload module 402. The select location button 416 enables the user to identify a geolocation by drawing boundaries on the map 312 or by inputting an address or a zip code. The identified geolocation is submitted to the user-based geolocation selection module 404. The filter title box 418 enables the user to submit a name for the media filter. The user may submit the content and the requested geolocation by clicking on the submit button 420. Once the content and requested geolocation are submitted, the user-based publication engine 408 generates a user-based media filter that includes the uploaded content for the identified geolocation.

FIG. 4C illustrates an example where user identified boundaries points 424, 426, 428, and 430 on the map 412 define a geolocation 422. The user has uploaded a picture of the sun 415 displayed in the upload image box 414. The user has entered the title of the content "Fun in the sun!" in the filter title box 418. The user may submit the picture of the sun 415 and the geolocation 422 by clicking on the submit button 420. Once the picture of the sun 415 and the geolocation 422 are submitted, the user-based publication engine 408 generates a user-based media filter.

Figure 4D:
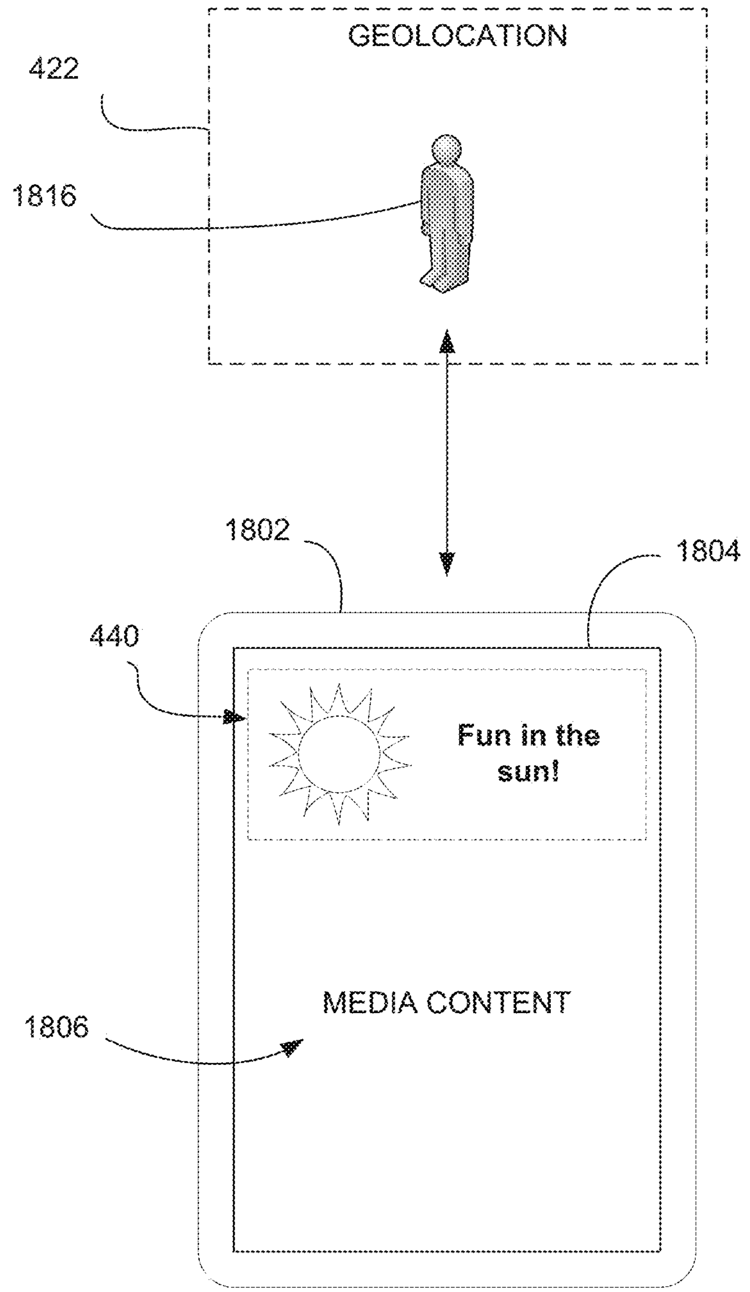
FIG. 4D illustrates an example of a publication of a user-based media filter.

FIG. 4D illustrates an example of a publication of a user-based media filter. The media filter application 122 detects that a mobile device 1802 of a user 1816 is located at the geolocation 422. The media filter application 122 retrieves the user-based media filter 440 corresponding to the geolocation 422 and publishes the user-based media filter 440 to the mobile device 1802. The user-based media filter 440 is applied to media content 1806 in a display 1804 of the mobile device 1802.

Figure 5A:
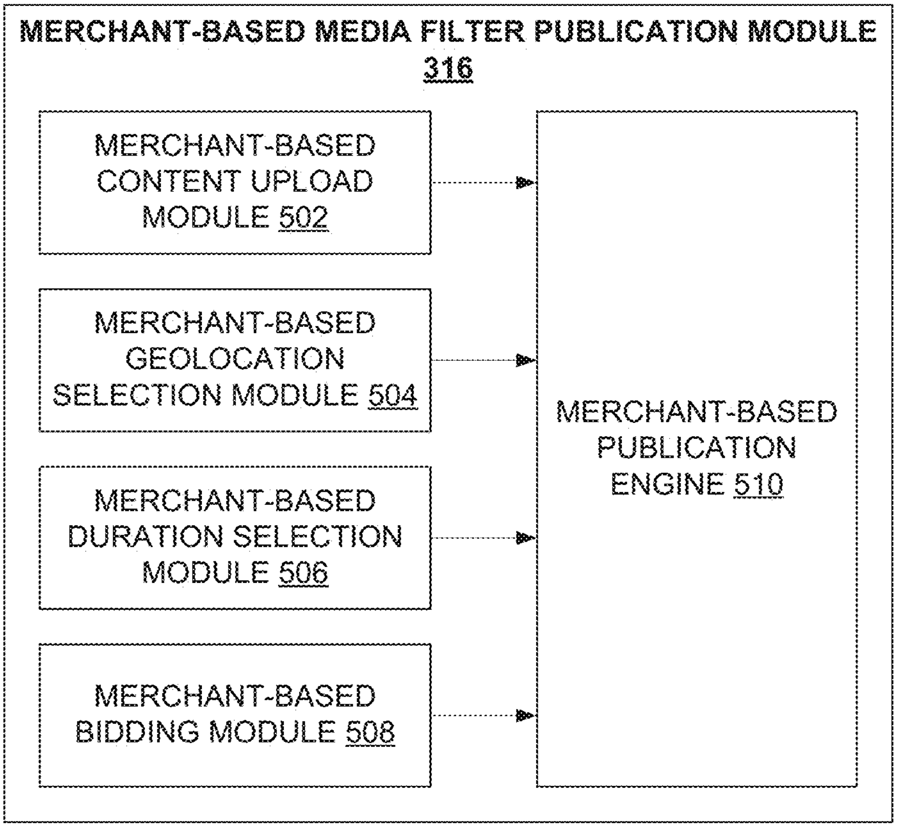
FIG. 5A shows a block diagram illustrating one example embodiment of a merchant-based media filter publication module.

FIG. 5A shows a block diagram illustrating one example embodiment of the merchant-based media filter publication module 316. The merchant-based media filter publication module 316 includes a merchant-based content upload module 502, a merchant-based geolocation selection module 504, a merchant-based duration selection module 506, a merchant-based bidding module 508, and a merchant-based publication engine 510.

The merchant-based content upload module 502 receives content from a merchant. The content may include a media item such as a picture, a video, a graphic, or a text. The merchant-based content upload module 502 may be implemented on a web server to allow a merchant to upload the content using a webpage.

The merchant-based geolocation selection module 504 receives geolocation identification information from the merchant to identify a selected geolocation. The geolocation identification information may include an address of an establishment, an identification of an establishment already associated with the address, GPS coordinates, or a geographic boundary. For example, the address of the establishment may include a street number, street address, city, state, and country. The merchant may also identify a location based on an existing establishment. For example, the geolocation information may include "restaurant x" in Venice beach. The geographic boundary identifies a region or a zone. For example, the geographic boundary may define a region located within a predetermined radius of an address, a point of interest, or a name of an existing establishment. The merchant may further define the geographic boundary by drawing a virtual fence on a map. The merchant-based geolocation selection module 504 may be implemented on a web server to allow a merchant to draw boundaries on a map in a web page.

The merchant-based duration selection module 506 receives, from the merchant, time duration information related to the uploaded content and selected geolocation. The time duration may identify a period of time in which the uploaded content is associated with the selected geolocation. Once the period of time has elapsed, the uploaded content is no longer associated with the selected geolocation. Other embodiments include periodic time duration information or specific time duration information. For example, for the periodic time duration information, the merchant-based media filter is published or made available at the selected geolocation (e.g., corner of two identified streets) every Saturday night (e.g., a night club related media filter available every Saturday night). For the specific time duration information, the selected media filter is published or made available at the selected geolocation around a specific date (e.g., party event date).

Figure 5B:
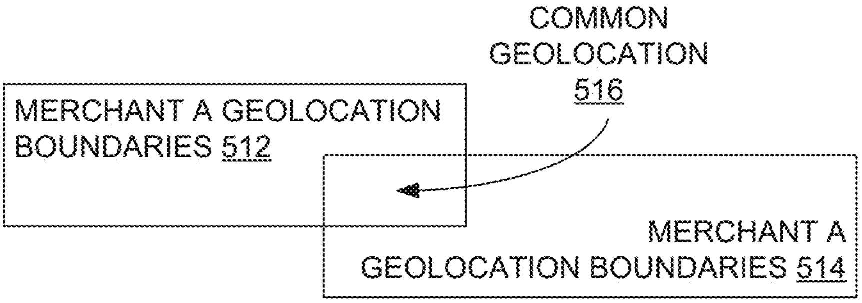
FIG. 5B illustrates an example of a common geolocation.

The merchant-based bidding module 508 provides an interface to enable merchants to submit a bid amount for a common geolocation. The common geolocation may include, for example, a same street address. For example, several businesses may have the same street address but different suite numbers in a shopping center. FIG. 5B illustrates an example of a common geolocation.

Merchant A geolocation boundaries 512 overlaps with merchant B geolocation boundaries 514 to define a common geolocation 516. Thus, merchants A and B may submit respective bids corresponding to the common geolocation 516. In one example embodiment, the merchant-based geolocation selection module 504 determines common geolocations from the geolocations selected by the merchants. The merchant-based bidding module 508 identifies a highest bidder for the common geolocation and awards the highest bidder with the ability to exclude other merchant-based media filters from the common geolocation 516 for a predefined amount of time.

In another example embodiment, the merchant-based bidding module 508 prorates bid amounts based on their corresponding time duration information. For example, merchant A submits a bid amount of $100 for one day for a specific geolocation. Merchant B submits a bid amount of $160 for two days for the same specific geolocation. The merchant-based bidding module 508 may prorate the bid from merchant B for one day (e.g., $80) and compare both bids for the same period of time (e.g., one day) to determine a highest bidder.

The merchant-based publication engine 510 generates a merchant-based media filter that associates the uploaded content of the highest bidder with the geolocation identified by the highest bidder. The merchant-based publication engine 510 publishes the merchant-based media filter to client devices that are located at the geolocation selected by the highest bidder for the time duration identified with the merchant-based duration selection module 506. Merchant-based media filters from other merchants in the common geolocation 516 are excluded from publication. In another embodiment, a quota may be placed on the number of merchant-based media filters available for the common geolocation 516. For example, the merchant-based publication engine 510 may publish and make available a limited number of merchant-based media filters (e.g., a maximum of two merchant-based media filters) for the common geolocation 516.

In another example embodiment, the merchant-based publication engine 510 forms a priority relationship that associates the uploaded content of the highest bidder with the geolocation selected by the highest bidder. For example, an order in which media filters are displayed at the client device 110 may be manipulated based on the results from the merchant-based bidding module 508. A media filter of a merchant with the highest bid may be prioritized and displayed first at the client device 110. Media filters from other merchants may be displayed at the client device 110 after the media filter of the highest bidder. In another example embodiment, a merchant may be able to bid on all locations at which it maintains a presence. Thus, a restaurant chain may be able to have its media filter(s) published at each of its restaurant chain locations.

Figure 5C:
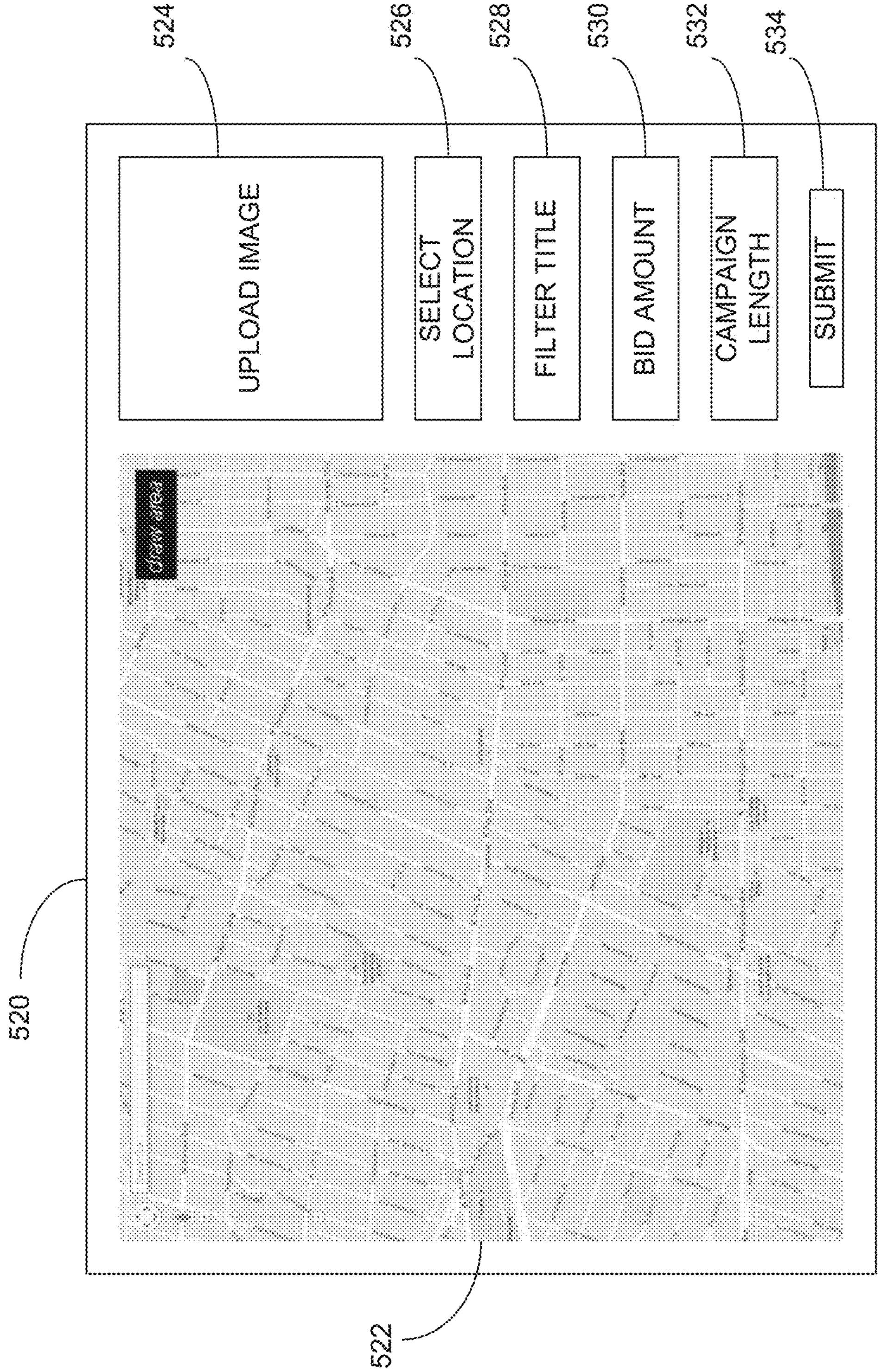
FIG. 5C illustrates an example of a graphical user interface for a merchant-based media filter publication module.

FIG. 5C illustrates an example of a GUI 520 for uploading content and for selecting a geolocation on a map. The GUI 520 includes a map 522, an upload image box 524, a select location button 526, a filter title box 528, a bid amount entry box 530, a campaign length entry box 532, and a submission button 534. The upload image box 524 enables a merchant to upload content (e.g., a picture, a video, or an animation) to the merchant-based content upload module 502. The selection location button 526 enables the merchant to identify a geolocation by drawing boundaries on the map 522 or by inputting an address or a zip code. The filter title box 528 enables the merchant to submit a name for the media filter. The bid amount entry box 530 enables the merchant to enter a bid amount for the identified geolocation. The campaign length entry box 532 enables the merchant to specify a length of a campaign in which the uploaded content is associated with the identified geolocation. The merchant may submit the uploaded content and entered information by clicking on the submit button 534.

Figure 5D:
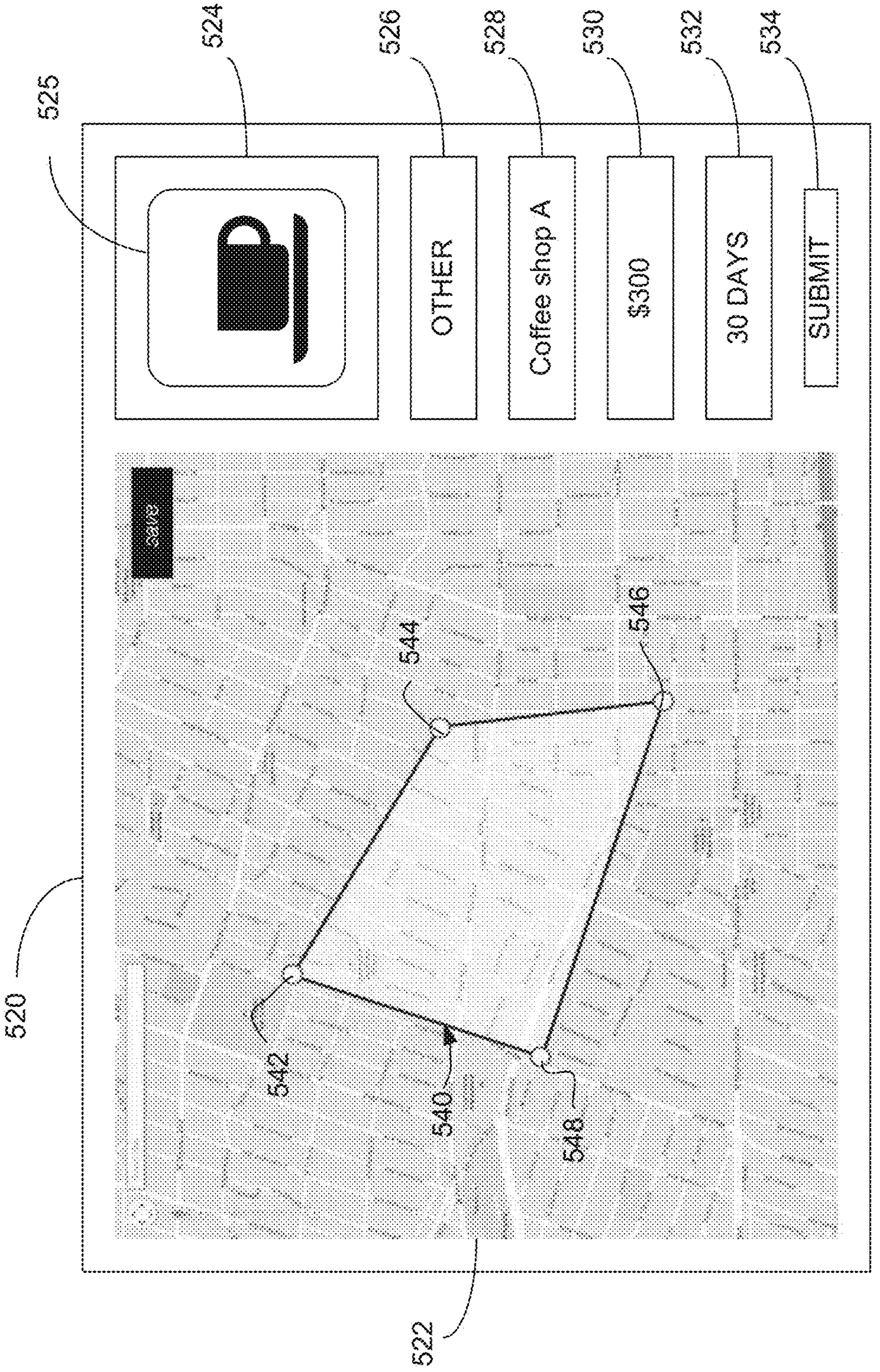
FIG. 5D illustrates an example of a bid from a first merchant using the graphical user interface of FIG. 5C.

FIG. 5D illustrates an example where a merchant A has identified boundaries points 542, 544, 546, and 548 on the map 522 to define a geolocation 540. Merchant A has uploaded a picture 525 displayed in the upload image box 524. Merchant A has entered a title "Coffee shop A" in the filter title box 528, a bid amount of $300 in the bid amount entry box 530, and a campaign length of 30 days in the campaign length entry box 532. Merchant B submits the picture 525, the requested geolocation 540, and other entered information by clicking on the submit button 534. The merchant-based publication engine 510 generates a media filter for merchant A.

Figure 5E:
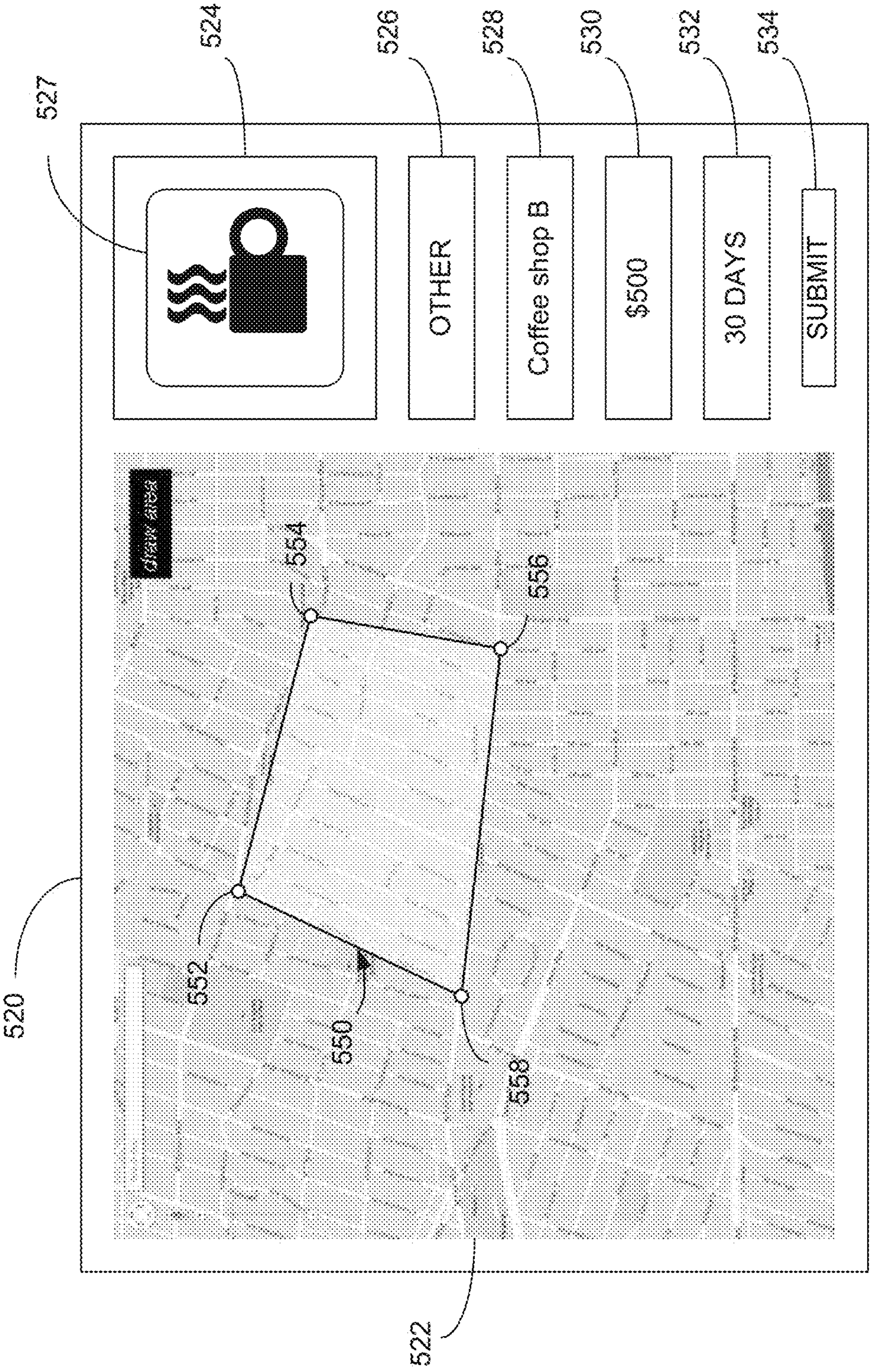
FIG. 5E illustrates an example of a bid from a second merchant using the graphical user interface of FIG. 5C.

FIG. 5E illustrates an example where another merchant, merchant B, has identified boundaries points 552, 554, 556, and 558 on the map 522 to define a geolocation 550. Merchant B has uploaded a picture 527 displayed in the content upload box 524. Merchant B has entered a title "Coffee shop B" in the filter title box 528, a bid amount of $500 in the bid amount entry box 530, and a campaign length of 30 days in the campaign length entry box 532. Merchant B may submit the picture 527, the requested geolocation 550, bid amount, and campaign length by clicking on the submission button 534. The merchant-based publication engine 510 generates a media filter for merchant B.

Figure 5F:
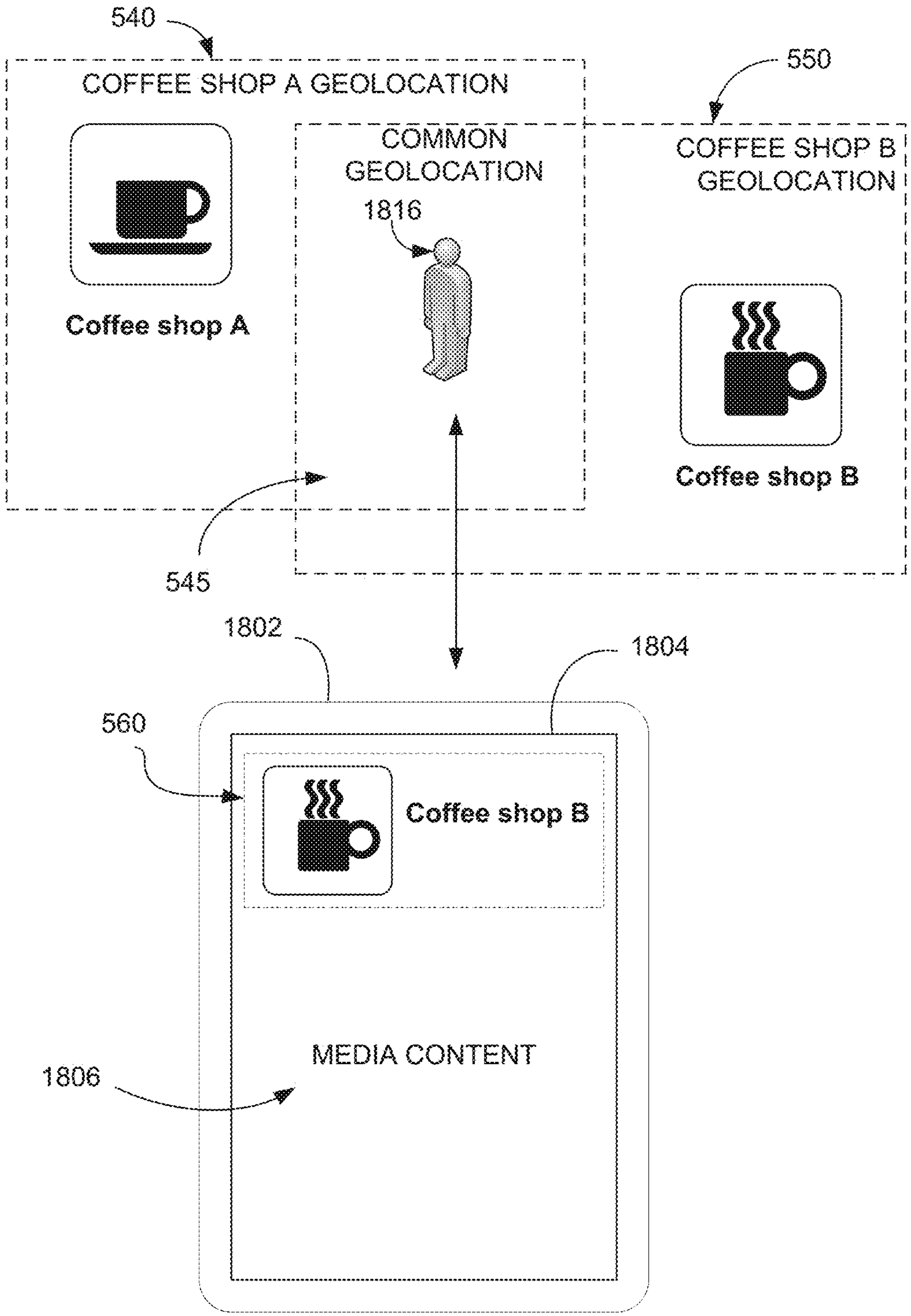
FIG. 5F illustrates an example of an operation of a merchant-based media filter.

FIG. 5F shows a diagram illustrating an example of a merchant-based media filter selected based on a bidding process. The geolocation 540 of merchant A and the geolocation 550 of merchant B overlap at a common geolocation 545. The user 1816 is located at the common geolocation 545 and uses his mobile device 1802 to generate the media content 1806 (e.g., user 1816 takes a picture) in the display 1804 of the mobile device 1802. The media filter of the merchant with the highest bid for the common location 545 is published to the mobile device 1802. In the present example, merchant B has outbid merchant A. As such, media filter 560 of merchant B is provided and displayed in the display 1804 on top of the media content 1806. The media filter 560 contains the uploaded content from merchant B. In addition, it should be noted that 'merchant' in the context of the current example embodiments may include not only entities involved in the trade or sale of merchandise but any other entity as well, including individuals, universities, non-profit organizations, student organizations, clubs, etc.

Figure 6A:
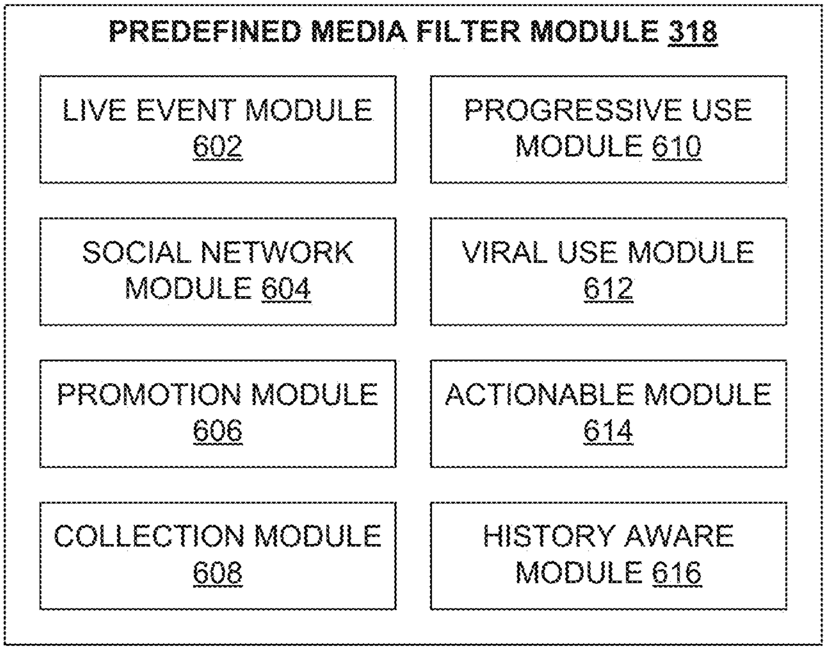
FIG. 6A shows a block diagram illustrating one example embodiment of a predefined media filter module.

FIG. 6A shows a block diagram illustrating one example embodiment of the predefined media filter module 318. The predefined media filter module 318 includes, for example, a live event module 602, a social network module 604, a promotion module 606, a collection module 608, a progressive use module 610, a viral use module 612, an actionable module 614, and a history aware module 616.

The live event module 602 generates a media filter based on live event information. The live event information may be related to a live game score of a sporting event associated with a corresponding geolocation, or a live news event related to an entertainment or social event associated with a corresponding geolocation. For example, a user of the client device 110 attends a game at a stadium. As such, media metadata from the client device 110 may identify the location of the stadium with a date and time. The live event module 402 uses that information to search for a live event associated with the location of the stadium, date, and time. The live event module 602 retrieves a current or nearly current game score associated with the live sporting event at the stadium (via e.g., the ESPN API). The live event module

602 may also retrieve insignias or team logos associated with the live sporting event. As such, the live event module 602 generates a media filter containing the latest score based on news sources covering the live sporting event.

In another example, the user of the client device 110 attends a social event at a venue. Similarly, media metadata identifies the location of the venue with a date and time. The live event module 602 uses that information to search for a live event associated with the location of the venue, date, and time from sources such as a social network server or news media service. The live event module 602 retrieves a news feed associated with the live social event at the venue. As such, the live event module 602 generates a media filter containing information or content based on news retrieved from a news feed associated with the live social event at the venue.

The social network module 604 generates a media filter based on social network information of a user of the client device 110. The social network information may include social network data retrieved from a social network service provider. The social network data may include profile data of the user, "likes" of the user, establishments that the user follows, friends of the user, and postings of the user among others. For example, the media filter associated with a restaurant may be available to the user at the location of the restaurant if the user has identified himself as a fan of the restaurant or indicates a "like" of the restaurant with the social network service provider. In another example, the ranking or priority of displaying the media filter in the client device 110 of the user may be based on the profile of the user or the number of "check-ins" of the user at the restaurant.

In another example embodiment, the media filter may be restricted and available only to the user and the social network (e.g., friends or other users in different categories) of the user of the client device 110. As such, the user may forward the media filter to his friends.

The promotion module 606 generates media filters for a promotion (e.g., a game, contest, lottery). For example, a set of unique media filters may be generated. One media filter from the set of unique media filters may be provided to the client device 110 when the client device 110 is at a predefined location associated with the media filters. For example, the user may visit a fast food restaurant. The media metadata from the client device 110 identifies the location of the fast food restaurant. The promotion module 606 retrieves a unique media filter from the set of unique media filters and provides it to the client device 110. The promotion module 606 may remove the unique media filter from the set of unique media filters after it has been provided to the client device 110. In another embodiment, the promotion module 406 removes the unique media filter from the set of unique media filters after it has been provided to other client devices for a predefined number of times.

The media filter includes content related to a game or promotion. In another example, the media filter may include dynamic content adjusted based on the game or promotion. For example, the dynamic content may include a current number of remaining media filters of the game or promotion. The media filters from the promotion module 606 may be "collected" by the client device 110. For example, the client device 110 may store the media filter in a collection at the client device 110. A prize may be redeemed upon collection of each filter of a predefined set of media filters.

The collection module 608 generates collectible media filters. For example, the client device 110 is provided with a media filter associated with the geolocation of the client device 110. The media filter may be collected by the client device 110 and be made permanently available to the client device 110. The client device 110 may store the collected media filter in a collection folder at the client device 110.

The progressive use module 610 generates media filters with dynamic content that changes based on a number of uses of the media filters. For example, a media filter can be set to be used for a limited number of times. Every time the media filter is provided to a client device, a content of the media filter is adjusted. For example, the media filter may include a fundraising progress bar in which a level of the bar rises every time the media filter is used. The dynamic content in the media filter may include a countdown displaying the number of remaining usage of the media filter.

The viral use module 612 generates media filters that can be forwarded to other users outside a geolocation associated with the media filters. For example, the client device 110 receives a media filter based on a geolocation of the mobile device 110. The client device 110 can send the media filter to mobile device 112 that is outside the geolocation of the mobile device 110. The forwarded media filter may be available for use by the mobile device 112 for a predefined time limit (e.g., one hour). Similarly, the mobile device 112 may forward the media filter to other mobile devices outside the geolocation of the mobile device 110 for use within the predefined time limit.

The actionable module 614 generates media filters with an action associated with a content of the media filter. For example, the media filter can start a browser of the client device 110 and open a predetermined website in the browser. In another embodiment, the media filter is capable of opening other functionalities (e.g., payment application) or executing other programs at the client device 110. For example, a user can tap on the media filter to download or display a coupon associated with the media filter at the client device 110.

The history aware module 616 generates media filters based on geolocation of the mobile device 110 and historical events associated with the geolocation. For example, a media filter may include pictures of a pyramid associated with the geolocation of the mobile device 110. The media filters may be collected based on the historical events or, for example, for each of the Seven Natural Wonders of the World. For example, a media filter associated with a national park may be collected when the user visits the national park. The device can collect all media filters associated with all national parks.

Figure 6B:
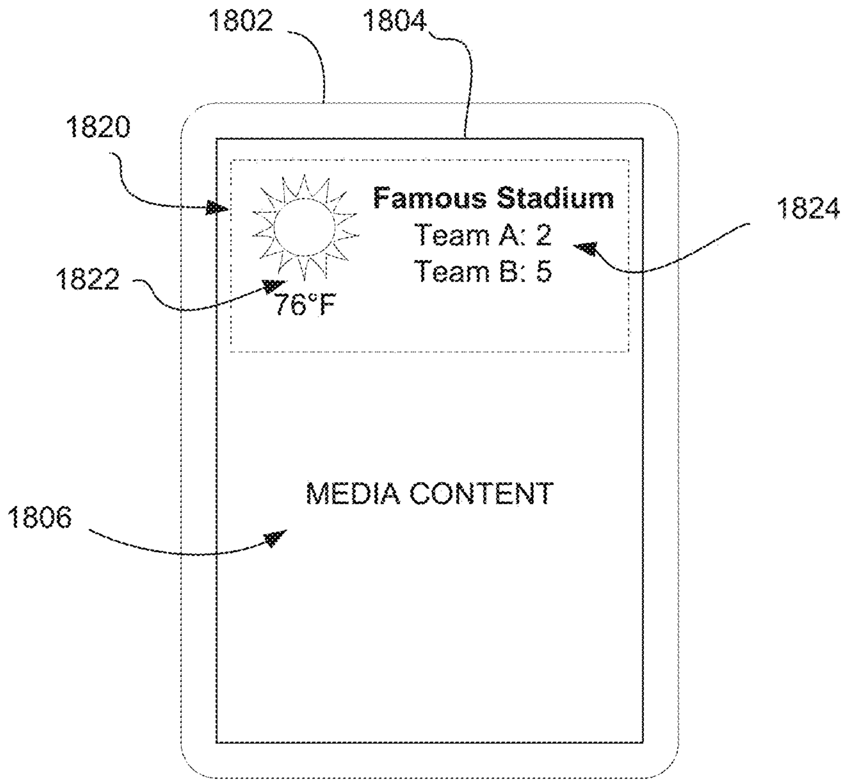
FIG. 6B shows a diagram illustrating an example of a media filter with live data content.

FIG. 6B shows a diagram illustrating an example of a media filter 1820 with live data content. The media filter 1820 contains live data associated with a geolocation of the mobile device 1802. For example, the live data contains a live weather status 1822 and latest score update 1824 of a sporting event associated with the geolocation of the mobile device 1802. The mobile device 1802 displays the media filter 1820 on top of (i.e., as a transparent overlay) the media content 1806. In one example embodiment, the media filter 1820 may be implemented with the live event module 602 of FIG. 6A.

Figure 6C:
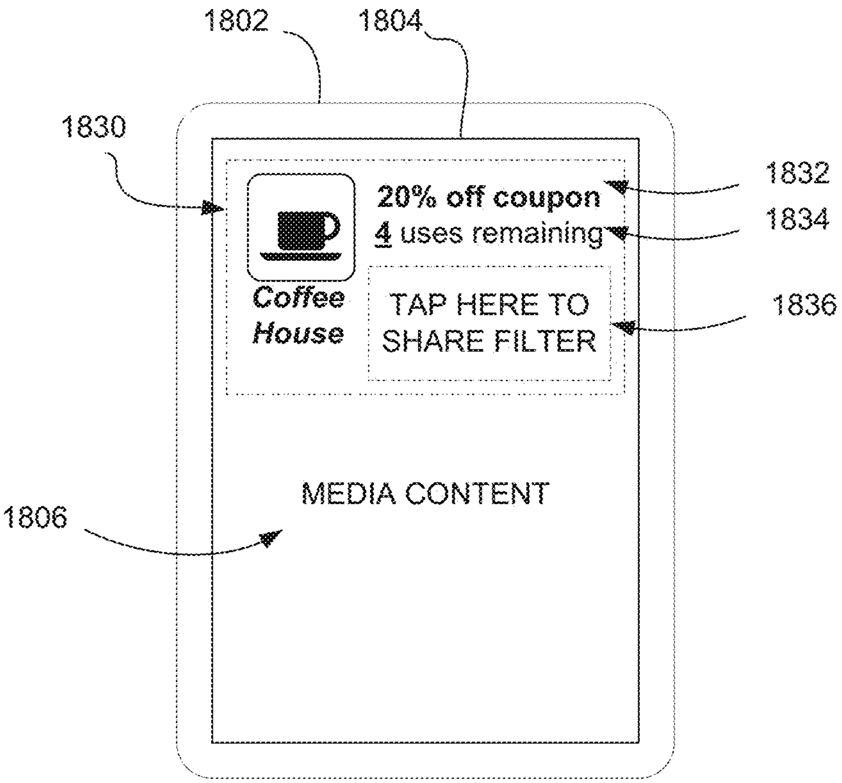
FIG. 6C shows a diagram illustrating an example of a media filter with dynamic progressive use content.

FIG. 6C shows a diagram illustrating an example of a media filter 1830 with promotional content. For example, the media filter 1830 includes a digital coupon 1832 that can be redeemed at a coffee shop. The media filter 1830 may include dynamic content 1834. For example, the dynamic content 1834 may include a remaining number of times the coupon can be used. Furthermore, the media filter 1830 may include an actionable area 1836 that is associated with an executable function. For example, when the user taps the actionable area 1836, the media filter 1830 is forwarded to a mobile device of a friend of the user. The mobile device 1802 displays the media filter 1830 on top of the media content 1806. In one example embodiment, the media filter 1830 may be implemented with the social network module 604, the promotion module 606, the progressive use module 610, and the actionable module 614 of FIG. 6A.

Figure 6D:
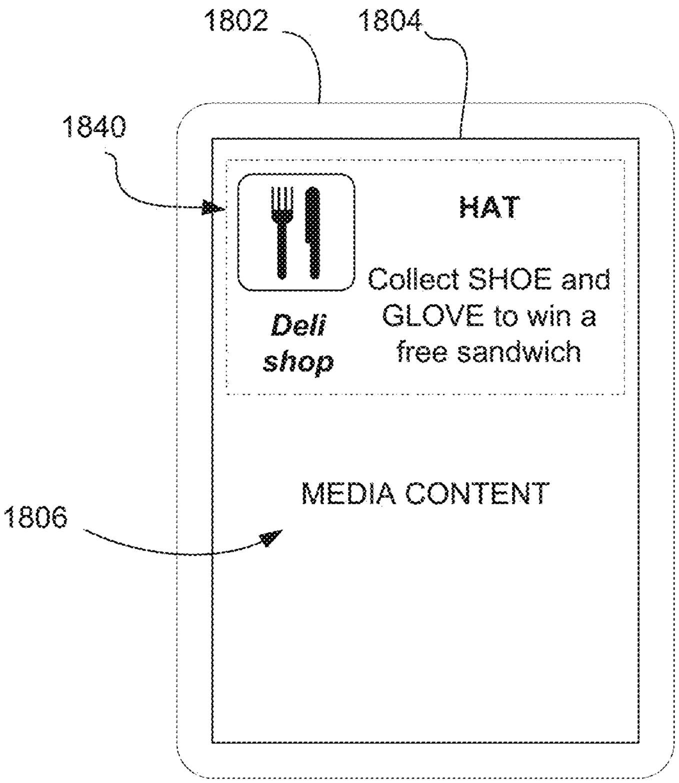
FIG. 6D shows a diagram illustrating an example of a media filter with promotional content.

FIG. 6D shows a diagram illustrating an example of a collectible media filter 1840. The collectible media filter 1840 may be randomly supplied to the mobile device 1802 in response to detecting the mobile device 1802 at a geolocation associated with the collectible media filter 1840. The collectible media filter 1840 can be stored at the mobile device 1802. Once the mobile device 1802 detects that related collectible media filters have been stored, the mobile device 1802 may cause the related collectible media filters or a corresponding unique media filter to be displayed in the display 1804. The mobile device 1802 displays the media filter 1840 on top of the media content 1806. In one example embodiment, the media filter 1840 may be implemented with the collection module 608 of FIG. 6A.

Figure 6E:
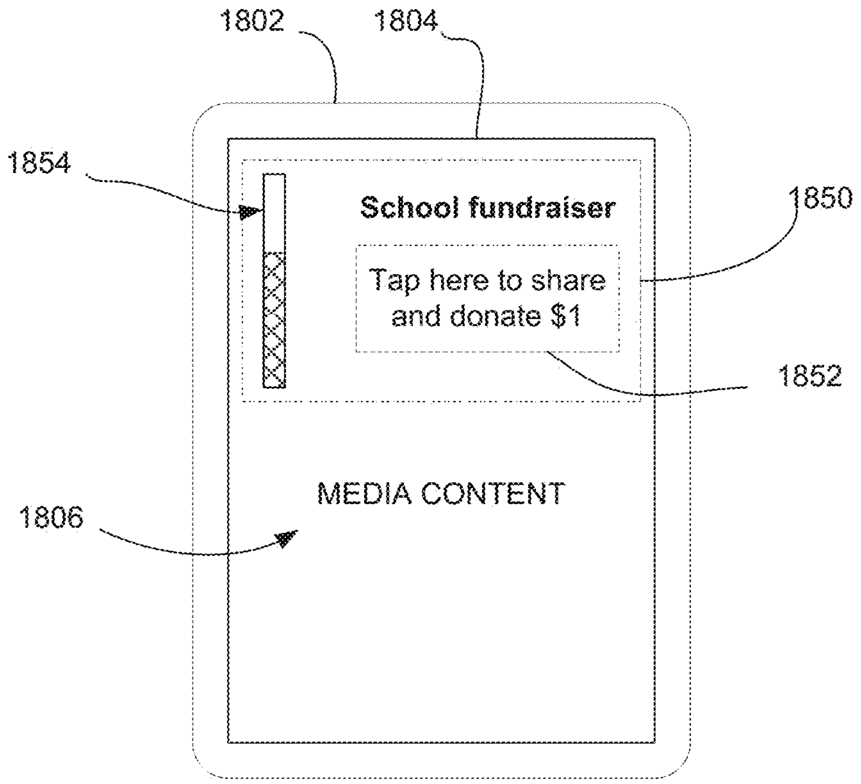
FIG. 6E shows a diagram illustrating an example of a media filter with viral content.

FIG. 6E shows a diagram illustrating an example of a viral media filter 1850. The viral media filter 1850 may include dynamic content 1854 and an actionable area 1852. For example, the dynamic content 1854 shows a progress bar and goal of a fundraising event. The progress bar is adjusted based on a latest amount raised. The actionable area 1852 may trigger the mobile device 1802 to cause a financial transaction (e.g., donation) and a communication to another mobile device (e.g., message to another mobile device using the messaging application 120). The mobile device 1802 displays the media filter 1850 on top of the media content 1806. In one example embodiment, the media filter 1850 may be implemented with the progressive use module 610, the viral use module 612, and an actionable module 614 of FIG. 6A.

Figure 7:
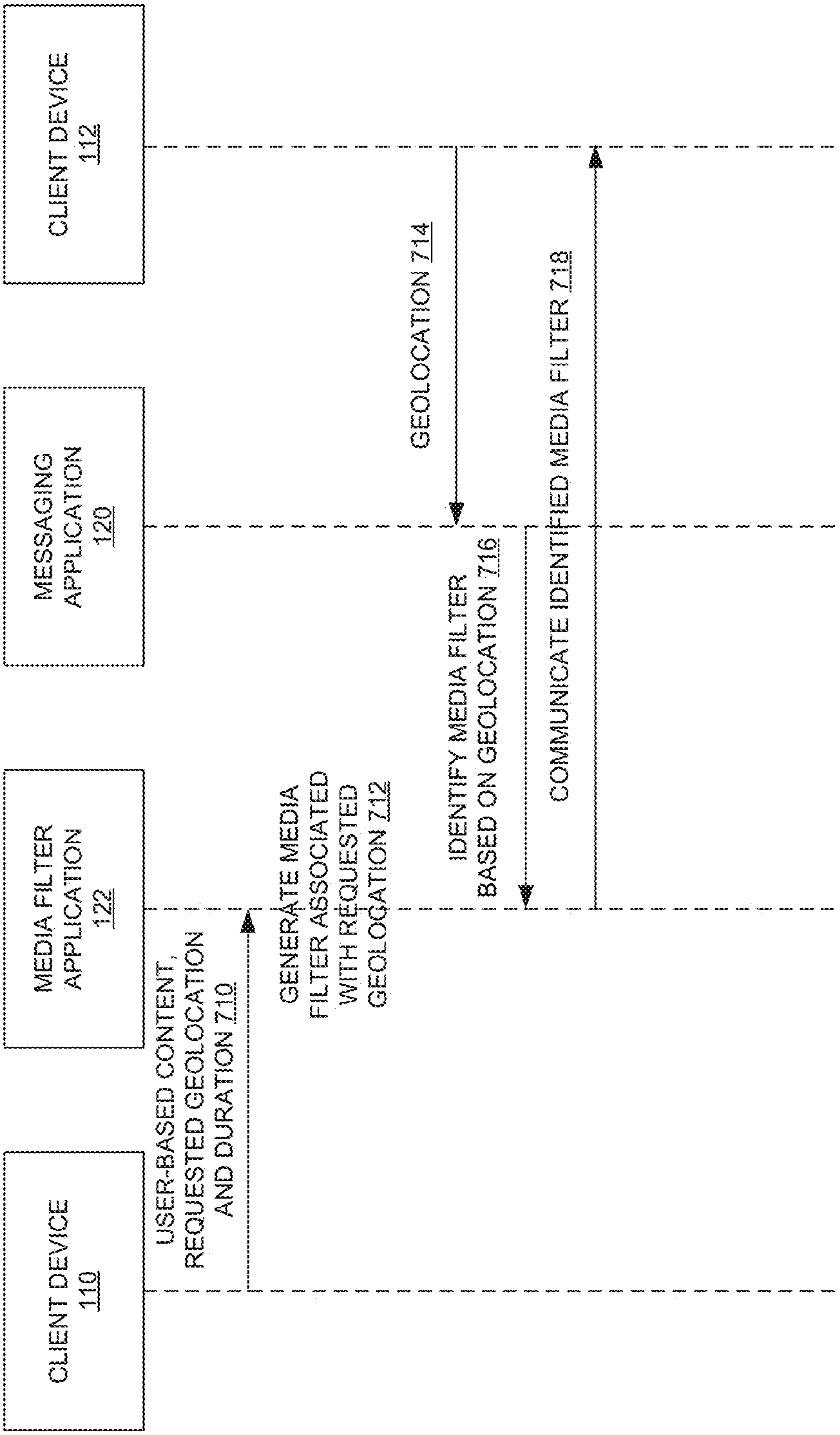
FIG. 7 shows an interaction diagram illustrating one example embodiment of an operation of the user-based media filter publication module.

FIG. 7 shows an interaction diagram illustrating one example embodiment of an operation of the user-based media filter publication module 314. At operation 710, the client device 110 of a first user uploads content and sends a requested geolocation and a requested time duration to the media filter application 122. At operation 712, the media filter application 122 generates a media filter based on the uploaded content and associates the media filter with the requested geolocation for the requested time duration. In one example embodiment, operations 710 and 712 may be implemented with the user-based media filter publication module 314 of FIG. 3.

At operation 714, the client device 112 of a second user sends geolocation information to the messaging application 120, At operation 716, the messaging application 120 identifies, from the media filter application 122, a media filter based on the geolocation of the client device 112. At operation 718, the media filter application 122 supplies the client device 112 with the identified media filter. In one example embodiment, operations 716 and 718 may be implemented with the media filter engine 306 of FIG. 3.

Figure 8:
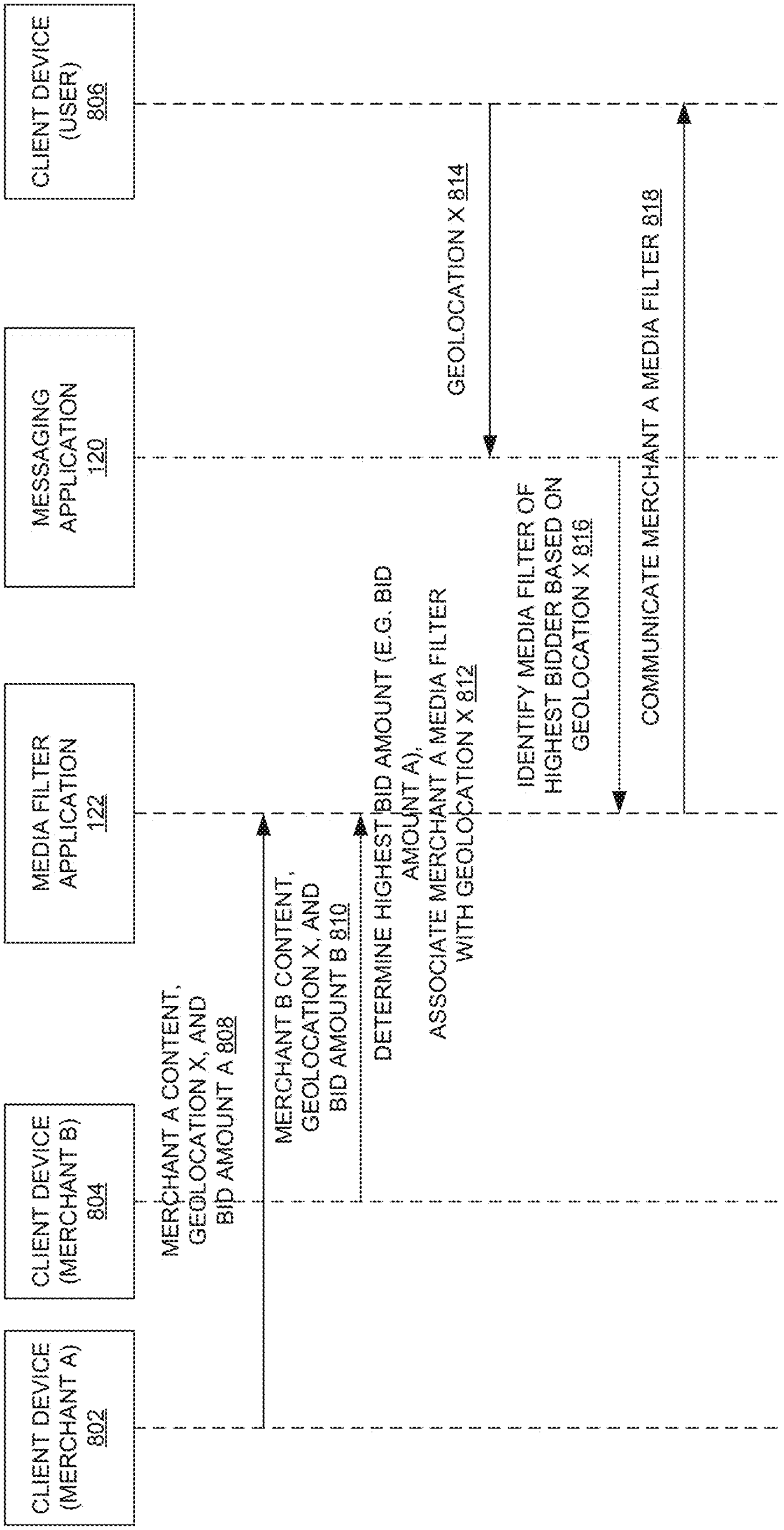
FIG. 8 shows an interaction diagram illustrating another example embodiment of an operation of the merchant-based media filter publication module.

FIG. 8 shows an interaction diagram illustrating another example embodiment of an operation of the merchant-based media filter publication module 316. At operation 808, a client device 802 of merchant A uploads content with geolocation information (e.g., geolocation X) and a bid amount (e.g., bid amount A) to the media filter application 122 to form media filter A. At operation 810, a client device 804 of merchant B uploads content with the same geolocation information (e.g., geolocation X) and a bid amount (e.g., bid amount B) to the media filter application 122 to form media filter B. At operation 812, the media filter application 122 determines a highest bidder, and associates the media filter of the highest bidder with geolocation X. For example, if bid amount A is greater than bid amount B, media filter A is provided to client devices that are located at geolocation X. In one example embodiment, operations 808, 810, 812 may be implemented with the merchant-based media filter publication module 316 of FIG. 3.

At operation 814, a client device 806 at geolocation X sends its geolocation information to the messaging application 120. At operation 816, the messaging application 120 identifies, from the media filter application 122, the media filter associated with the geolocation X. At operation 818, the media filter application 122 supplies the client device 806 with media filter A. In one example embodiment, operations 816 and 818 may be implemented with the media filter engine 306 of FIG. 3. In another example embodiment, the media filter application 122 supplies both media filters A and B to the client device 806 with instructions for the client device 806 to display media filter A first before media filter B since merchant A was the highest bidder.

Figure 9:
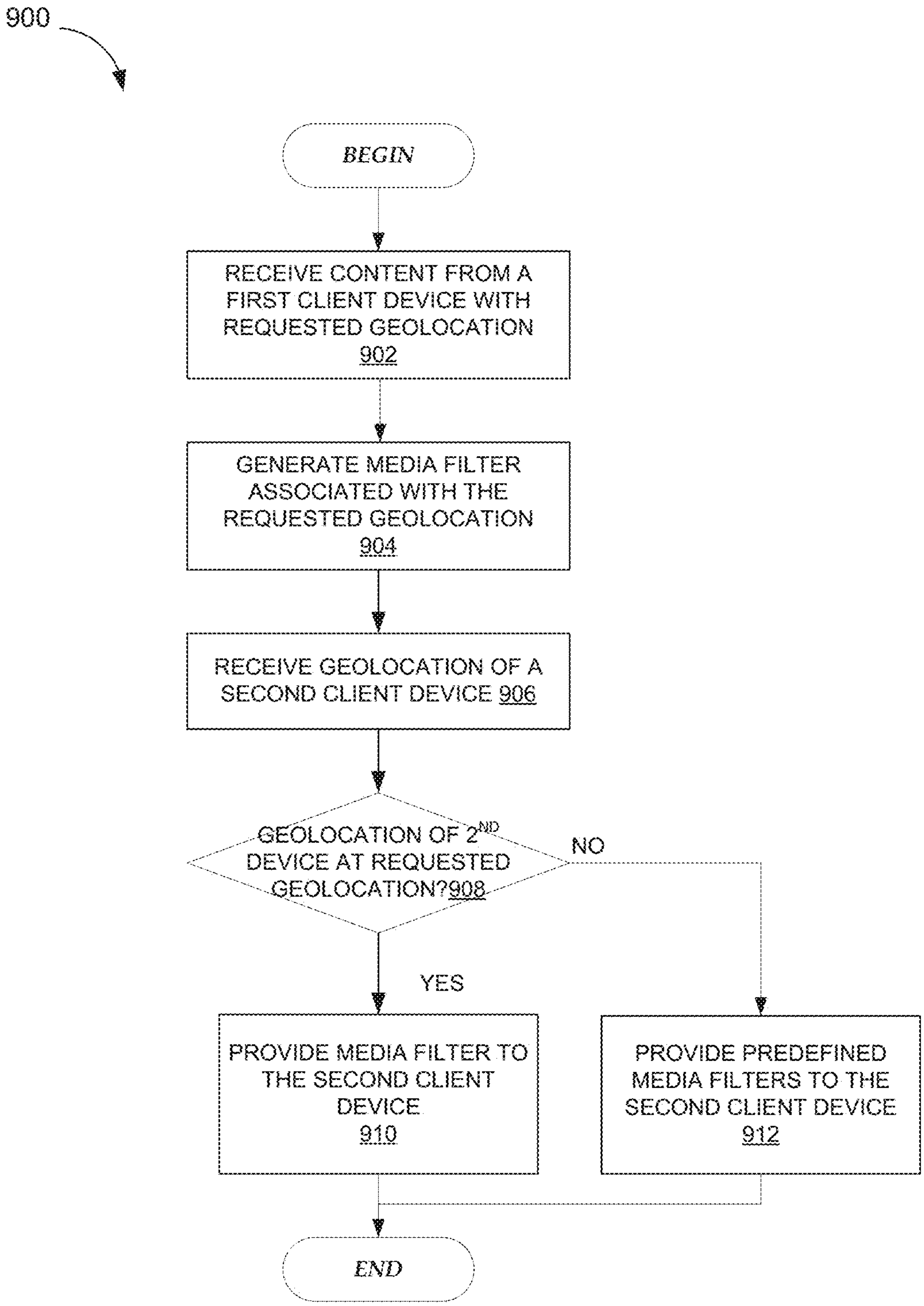
FIG. 9 shows a flow diagram illustrating one example embodiment of an operation of the user-based media filter publication module.

FIG. 9 shows a flow diagram illustrating one example embodiment of a method 900 of the user-based media filter publication module 314. At operation 902, the user-based media filter publication module 314 receives uploaded content and a requested geolocation information from a first client device. In one example embodiment, operation 902 may be implemented with the user-based content upload module 402, the user-based geolocation selection module 404, and the user-based duration selection module 406 of FIG. 4A.

At operation 904, the user-based media filter publication module 314 forms a user-based media filter that includes the uploaded content, and is associated with the requested geolocation. In one example embodiment, operation 904 may be implemented with the user-based publication engine 408 of FIG. 4A.

At operation 906, the user-based media filter publication module 314 receives geolocation information from a second client device. At operation 908, the user-based media filter publication module 314 determines whether the geolocation of the second client device is within the requested geolocation from the first client device. At operation 910, the user-based media filter publication module 314 publishes the user-based media filter from the first client device to the second client device in response to the geolocation of the second client device being within the requested geolocation from the first client device. In one example embodiment, operation 910 may be implemented with the user-based media filter module 320 of FIG. 3.

At operation 912, the media filter engine 306 supplies predefined media filters corresponding to the geolocation of the second client provided to the second device. In one example embodiment, operation 912 may be implemented with the predefined media filter module 318 of FIG. 3.

Figure 10:
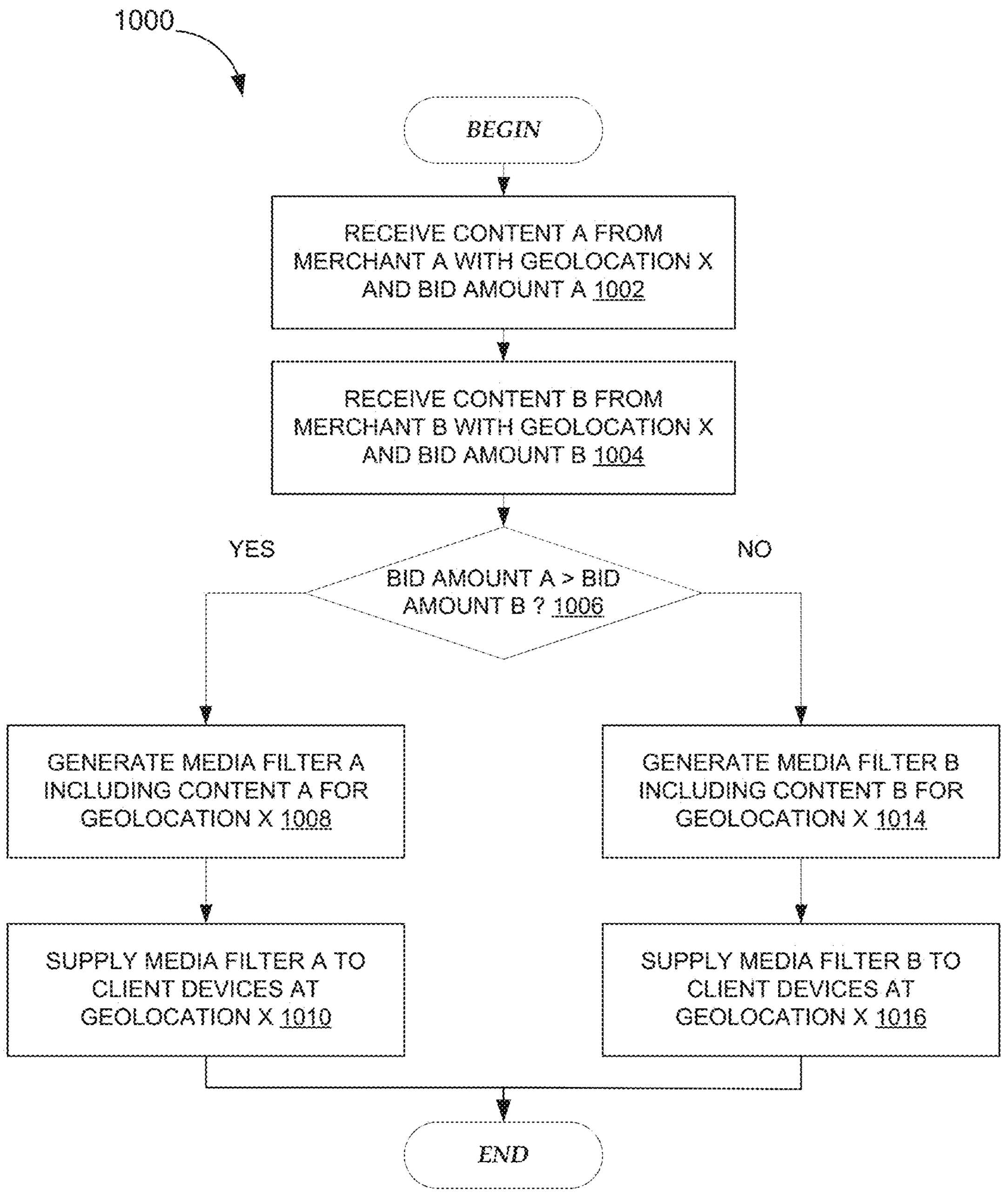
FIG. 10 shows a flow diagram illustrating one example embodiment of an operation of the merchant-based media filter publication module.

FIG. 10 shows a flow diagram illustrating one example embodiment of a method 1000 of operation for the merchant-based media filter publication module 316. At operations 1002 and 1004, the merchant-based media filter publication module 316 receives uploaded content, geolocation information, and corresponding bid amounts from merchants. For example, at operation 1002, the merchant-based content upload module 502 receives content A from merchant A. The merchant-based geolocation selection module 504 receives geolocation X from merchant A. The merchant-based bidding module 508 receives bid amount A from merchant A.

At operation 1004, the merchant-based content upload module 502 receives content B from merchant B. The merchant-based geolocation selection module 504 receives geolocation X from merchant B. The merchant-based bidding module 508 receives bid amount. B from merchant B. The merchant-based publication engine 510 generates a merchant-based media filter 13 based on content B and geolocation X.

At operation 1006, the highest bid amount is determined. In one example embodiment, operation 1006 may be implemented with the merchant-based bidding module 508 of FIG. 6A. If bid amount A is greater than bid amount B, the merchant-based publication engine 510 generates a merchant-based media filter A based on content A and geolocation X at operation 1008. At operation 1010, the merchant-based media filter module 322 supplies merchant-based media filter A to client devices that are located at geolocation X.

If bid amount B is greater than bid amount A, the merchant-based publication engine 510 generates a merchant-based media filter B based on content B and geolocation X at operation 1014. At operation 1016, the merchant-based media filter module 322 supplies merchant-based media filter B to client devices that are located at geolocation X.

Figure 11:
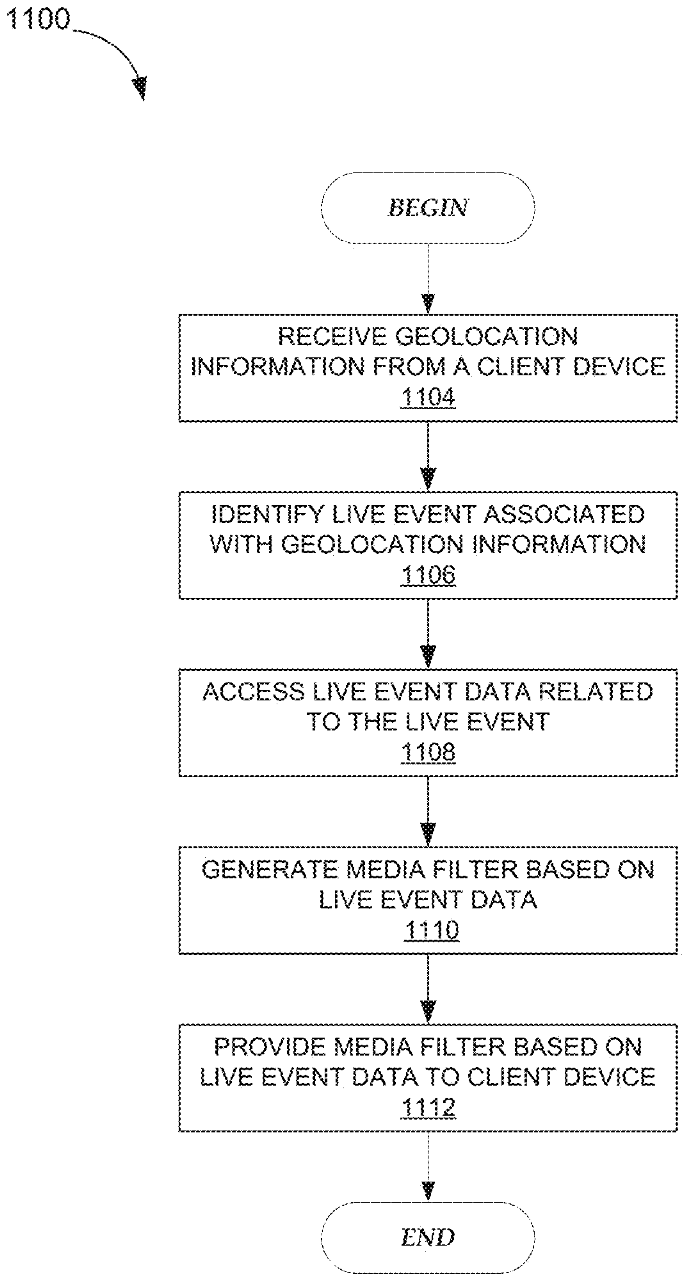
FIG. 11 shows a flow diagram illustrating one example embodiment of an operation of the live event module.

FIG. 11 shows a flow diagram illustrating one example embodiment of a method 1100 of operation for the live event module 602. At operation 1104, the live event module 602 receives geolocation information from a client device. At operation 1106, the live event module 602 identifies a live event associated with the geolocation. At operation 1108, the live event module 602 accesses live event data related to the live event. At operation 1110, the live event module 602 generates a live event media filter based on the live event data. At operation 1112, the live event module 602 supplies the live event media filter to the client device.

Figure 12:
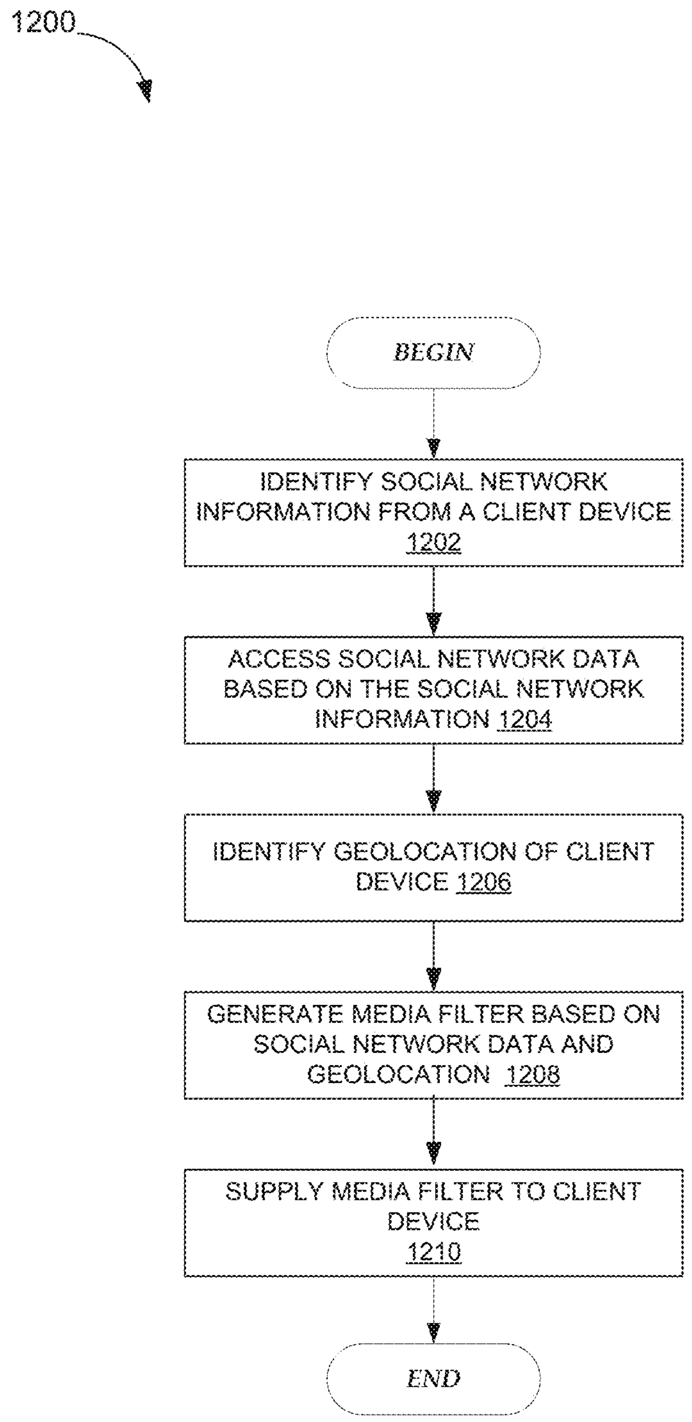
FIG. 12 shows a flow diagram illustrating one example embodiment of an operation of the social network module.

FIG. 12 shows a flow diagram illustrating one example embodiment of a method 1200 of operation for the social network module 604. At operation 1202, the social network module 604 receives social network information from a client device. At operation 1204, the social network module 604 accesses social network data from social network service providers based on social network information from the client device. At operation 1206, the social network module 604 identifies a geolocation from the geolocation information of the client device. At operation 1208, the social network module 604 generates a social network-based media filter based on the social network data and geolocation of the client device. At operation 1210, the social network module 604 supplies the social network-based media filter to the client device.

Figure 13:
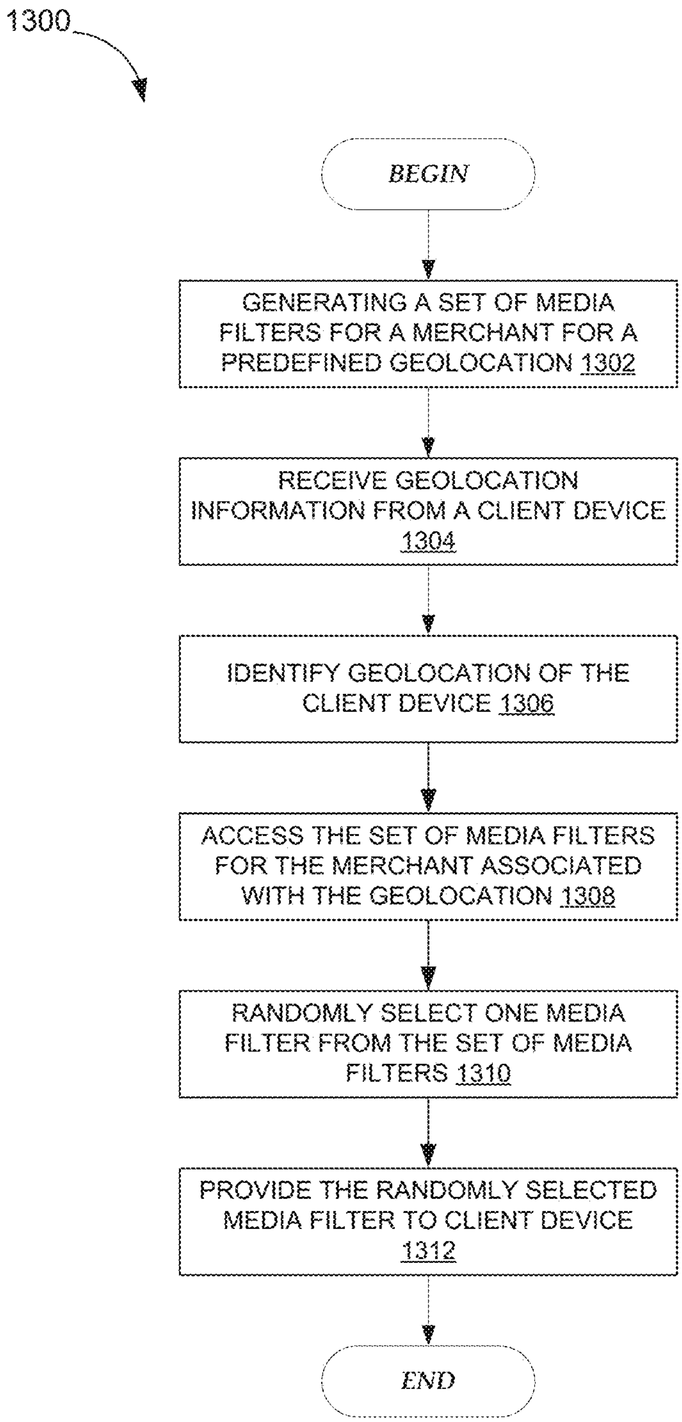
FIG. 13 shows a flow diagram illustrating one example embodiment of an operation of the promotion module.

FIG. 13 shows a flow diagram illustrating one example embodiment of a method 1300 of operation for the promotion module 606. At operation 1302, the promotion module 606 generates a set of media filters for a merchant for a predefined geolocation. At operation 1304, the promotion module 606 receives geolocation information from a client device. At operation 1306, the promotion module 606 identifies the geolocation of the client device from the geolocation information. At operation 1308, the promotion module 606 accesses the set of media filters for the merchant associated with the geolocation. At operation 1310, the promotion module 606 randomly selects at least one media filter from the set of media filters. At operation 1312, the promotion module 606 supplies the randomly selected media filter(s) to the client device.

Figure 14:
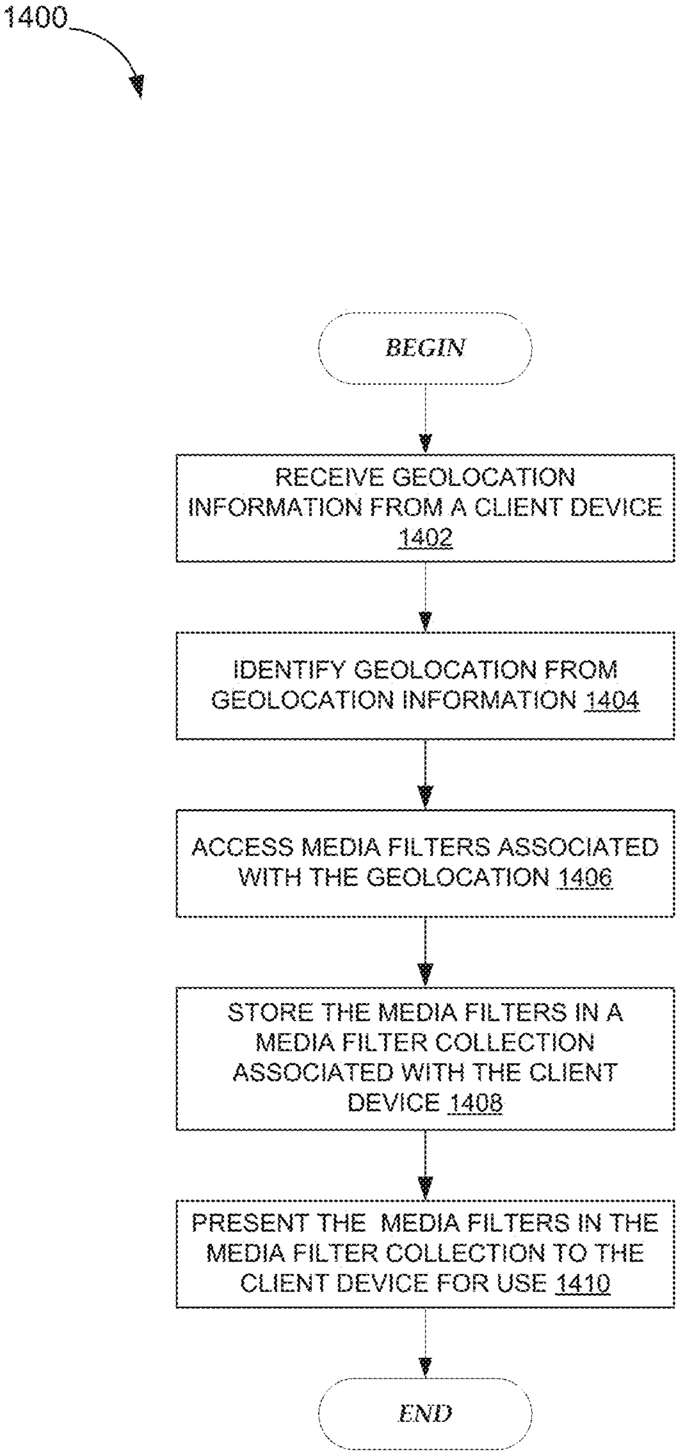
FIG. 14 shows a flow diagram illustrating one example embodiment of an operation of the collection module.

FIG. 14 shows a flow diagram illustrating one example embodiment of a method 1400 of operation for the collection module 608. At operation 1402, the collection module 608 receives geolocation information from a client device. At operation 1404, the collection module 608 determines the geolocation of the client device from the geolocation information. At operation 1406, the collection module 608 accesses media filters associated with the geolocation of the client device. At operation 1408, the collection module 608 stores the media filters in a media filter collection associated with the client device. At operation 1410, the collection module 608 presents the media filters in the media fitter collection to the client device for use.

Figure 15:
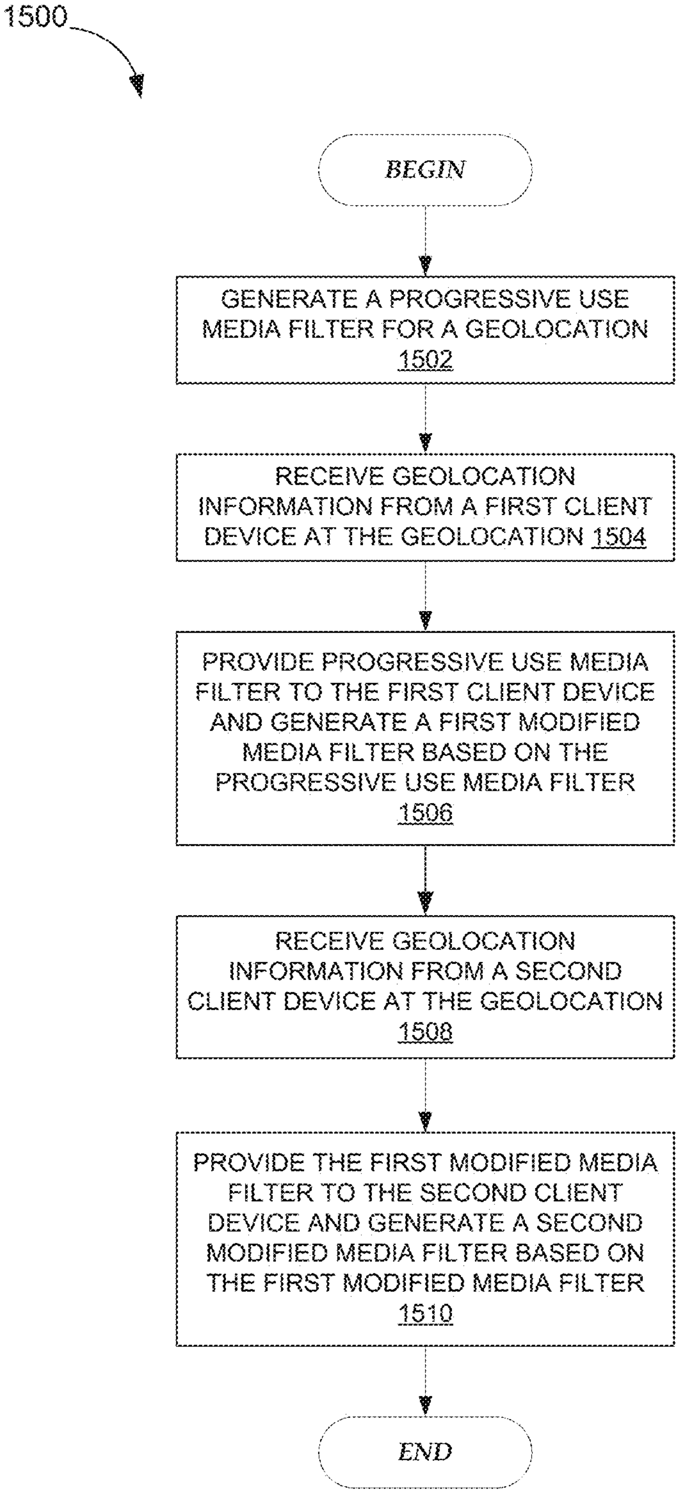
FIG. 15 shows a flow diagram illustrating one example embodiment of an operation of the progressive use module.

FIG. 15 shows a flow diagram illustrating one example embodiment of a method 1500 of operation for the progressive use module 610. At operation 1502, the progressive use module 610 generates a progressive use media filter for a geolocation. At operation 1504, the progressive use module 610 receives geolocation information from a first client device at the geolocation. At operation 1506, the progressive use module 610 supplies the progressive use media filter to the first client device, and generates a first modified media filter based on the progressive use media filter. At operation 1508, the progressive use module 610 receives geolocation information from a second client at the geolocation. At operation 1510, the progressive use module 610 supplies the first modified media filter to the second client device, and generates a second modified media filter based on the first modified media filter.

Figure 16:
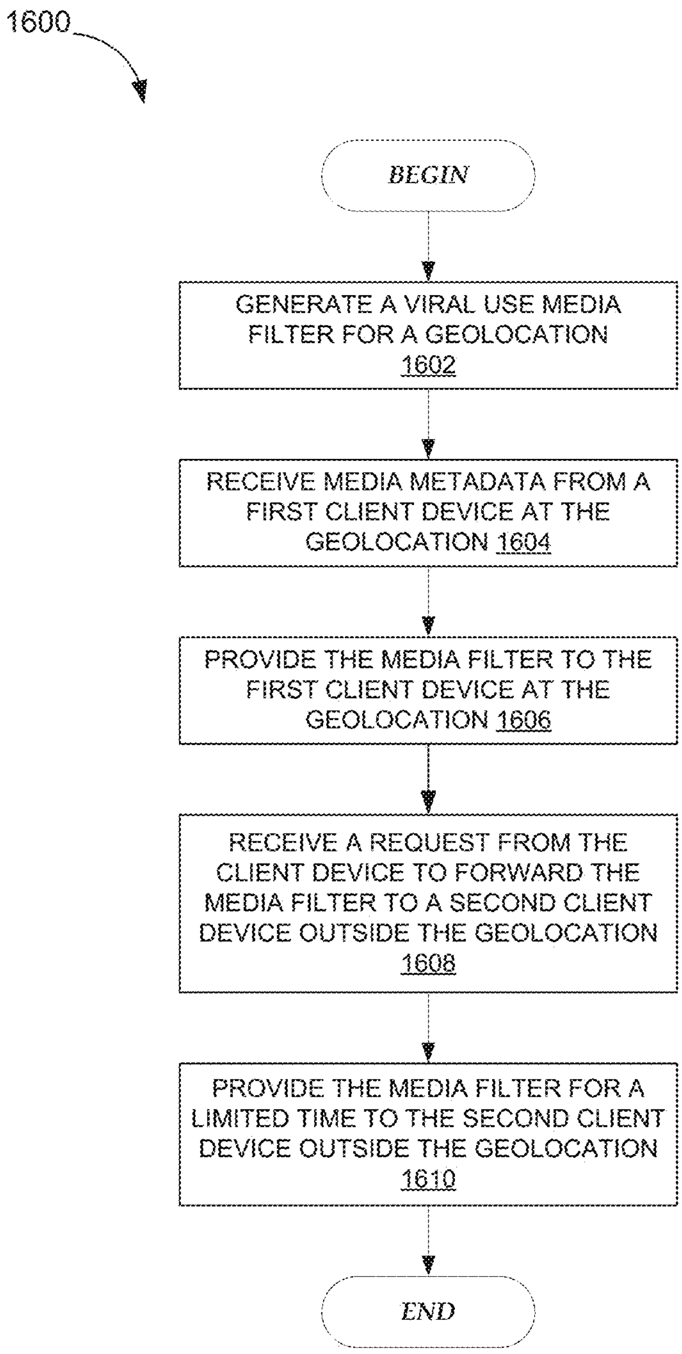
FIG. 16 shows a flow diagram illustrating one example embodiment of an operation of the viral use module.

FIG. 16 shows a flow diagram illustrating one example embodiment of a method 1600 of operation for the viral use module 612. At operation 1602, the viral use module 612 generates a media filter for a geolocation. At operation 1604, the viral use module 612 receives geolocation information from a first client device at the geolocation. At operation 1606, the viral use module 612 supplies the media filter to the first client device at the geolocation. At operation 1608, the viral use module 612 receives a request from the first client device to forward the media filter to a second client device outside the geolocation. At operation 1610, the viral use module 612 provides the media filter for a limited time to the second client device outside the geolocation.

Figure 17:
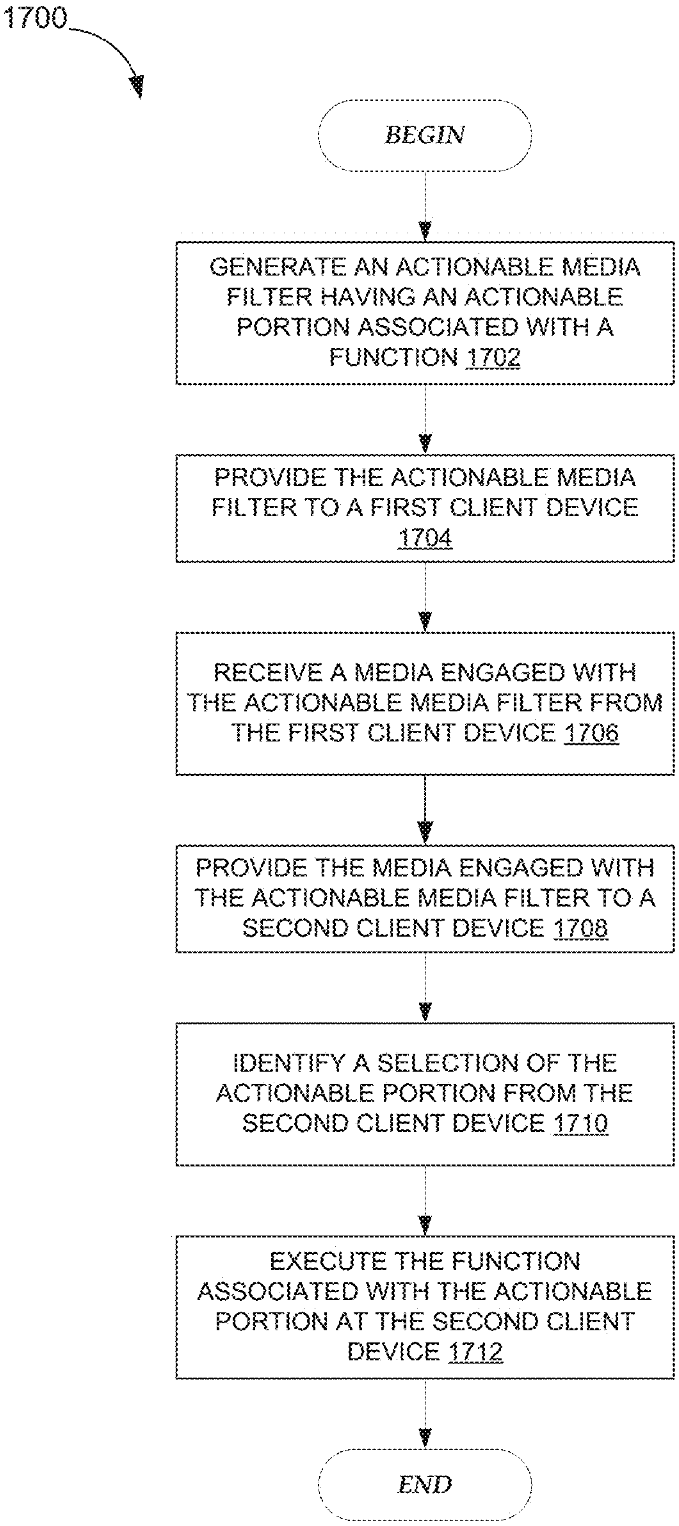
FIG. 17 shows a flow diagram illustrating one example embodiment of an operation of the actionable module.

FIG. 17 shows a flow diagram illustrating one example embodiment of a method 1700 of operation for the actionable module 614. At operation 1702, the actionable module 614 generates an actionable media filter having an actionable portion associated with a function. At operation 1704, the actionable module 614 provides the actionable media filter to a first client device. At operation 1706, the actionable module 614 receives a media item (e.g., a photo) with the media filter from the first client device. At operation 1708, the actionable module 614 supplies the media item with the media filter to the second client device. At operation 1710, the actionable module 614 identifies a selection of the actionable portion from the second client device. At operation 1712, the actionable module 614 executes a function associated with the actionable portion at the second client device.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via the network 104 (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed in various example embodiments.

Example Computer System

Figure 18:
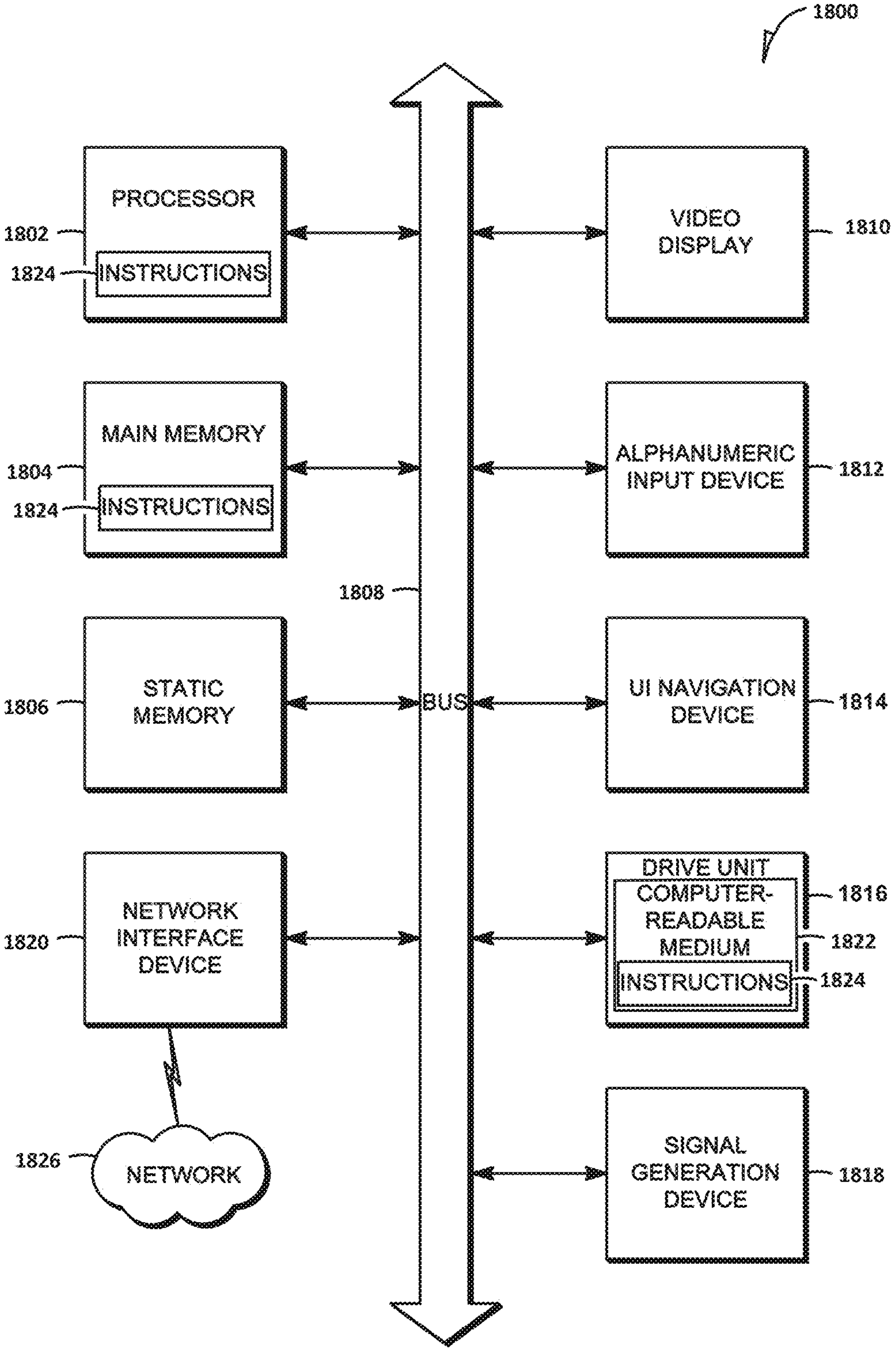
FIG. 18 shows a diagrammatic representation of machine, in the example form of a computer system, within which a set of instructions may be executed to cause the machine to perform any one or more of the methodologies discussed herein.

FIG. 18 shows a diagrammatic representation of a machine in the example form of a machine or computer system 1800 within which a set of instructions 1824 may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine 110 and 112 in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions 1824 (sequential or otherwise) that specify actions to be taken by that machine. Further, while only a single machine is illustrated, the term "machine" shall also be taken to include any collection of machines that individually or jointly execute a set (or multiple sets) of instructions 1824 to perform any one or more of the methodologies discussed herein.

The example computer system 1800 includes a processor 1802 (.e.g., a central processing unit (CPU), a graphics processing unit (GPU), or both), a main memory 1804, and a static memory 1806, which communicate with each other via a bus 1808. The computer system 1800 may further include a video display unit 1810 (e.g., a liquid crystal display (LCD) or a cathode ray tube (CRT)), The computer system 1800 also includes an alphanumeric input device 1812 (e.g., a keyboard), a UI navigation device 1814 (e.g., a mouse), a drive unit 1816, a signal generation device 1818 (e.g, a speaker), and a network interface device 1820.

The drive unit 1816 includes a computer-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 or within the processor 1802 during execution thereof by the computer system 1800, with the main memory 1804 and the processor 1802 also constituting machine-readable media.

The instructions 1824 may further be transmitted or received over a network 1826 via the network interface device 1820 utilizing any one of a number of well-known transfer protocols (e.g., HTTP).

While the computer-readable medium 1822 is shown in an example embodiment to be a single medium, the term "computer-readable medium" should be taken to include a single medium or multiple media (e.g., a centralized or distributed database, and/or associated caches and servers) that store the one or more sets of instructions 1824. The term "computer-readable medium" shall also be taken to include any medium that is capable of storing, encoding, or carrying a set of instructions 1824 for execution by the machine that cause the machine to perform any one or more of the methodologies of the present disclosure, or that is capable of storing, encoding, or carrying data structures utilized by or associated with such a set of instructions 1824. The term "computer-readable medium" shall, accordingly, be taken to include, but not be limited to, solid-state memories, optical media., and magnetic media.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one physical location to another. Additionally, since the machine-readable medium is tangible, the medium may be considered to be a machine-readable device.

Example Mobile Device

Figure 19:
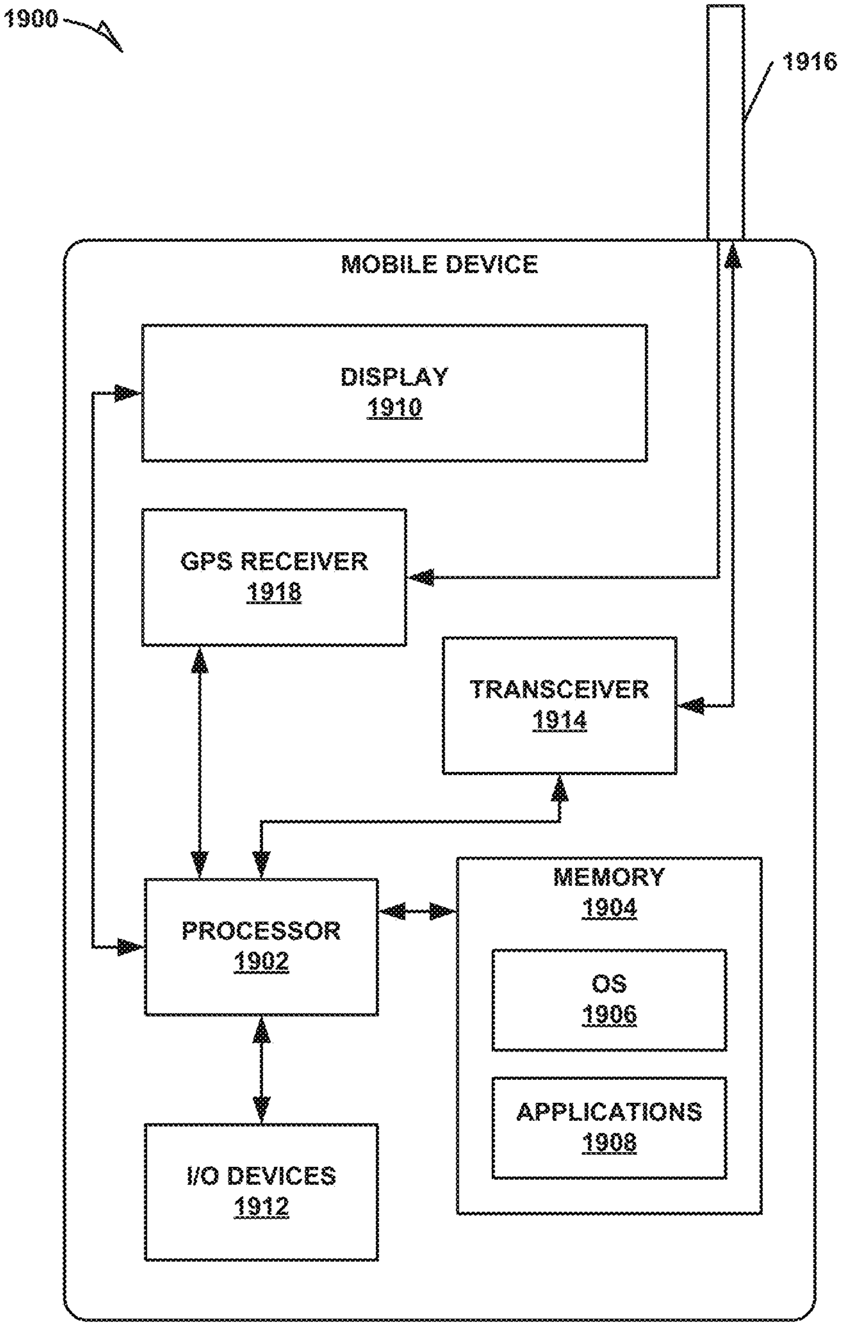
FIG. 19 is a block diagram illustrating a mobile device, according to an example embodiment.

FIG. 19 is a block diagram illustrating a mobile device 1900, according to an example embodiment. The mobile device 1900 may include a processor 1902. The processor 1902 may be any of a variety of different types of commercially available processors 1902 suitable for mobile devices 1900 (for example, an XScale architecture microprocessor, a microprocessor without interlocked pipeline stages (MIPS) architecture processor, or another type of processor 1902). A memory 1904, such as a random access memory (RAM), a flash memory, or another type of memory, is typically accessible to the processor 1902. The memory 1904 may be adapted to store an operating system (OS) 1906, as well as applications 1908, such as a mobile location enabled application that may provide location-based services (LBSs) to a user. The processor 1902 may be coupled, either directly or via appropriate intermediary hardware, to a display 1910 and to one or more input/output (I/O) devices 1912, such as a keypad, a touch panel sensor, a microphone, and the like. Similarly, in some embodiments, the processor 1902 may be coupled to a transceiver 1914 that interfaces with an antenna 1916. The transceiver 1914 may be configured to both transmit and receive cellular network signals, wireless data signals, or other types of signals via the antenna 1916, depending on the nature of the mobile device 1900. Further, in some configurations, a GPS receiver 1918 may also make use of the antenna 1916 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:

at least one processor;

a memory storing instructions that, when executed by the at least one processor, configure the at least one processor to perform operations comprising:

receiving, from a first client device, a content item and a first geolocation, the first geolocation having been manually selected by a user of the first client device;

generating a media filter from the content item, the media filter being associated with the first geolocation;

assigning a priority value to the media filter in association with the first geolocation, the priority value determining an order in which the media filter is presented relative to other media filters;

sending, to a second client device, identification of a plurality of filters comprising at least the media filter based at least in part on a second geolocation associated with the second client device, the plurality of filters for presenting on the second device based at least in part on the priority value assigned to the media filter in association with the first geolocation; and receiving, from the second client device, a message comprising media content overlaid by the media filter.

2. The system of claim 1, the operations comprising:

supplying the second client device with the media filter in response to the second geolocation being within the first geolocation.

3. The system of claim 1, the operations comprising:

receiving an identification of a period of time associated with the content item and the first geolocation.

4. The system of claim 1, the operations comprising:

receiving a first content item from a first merchant and a second content item from a second merchant;

receiving a first geolocation information from the first merchant, and a second geolocation information from the second merchant to identify a common geolocation based on the first geolocation information and the second geolocation information, the common geolocation corresponding to the first geolocation;

receiving a first bid amount from the first merchant and a second bid amount from the second merchant; and identifying a highest bid amount from the first and second bid amounts.

5. The system of claim 4, the operations comprising:

generating a merchant-based media filter based on a respective content item of the merchant with the highest bid amount and the common geolocation, the merchant-based media filter corresponding to the media filter; and disabling the merchant-based media filter after a predetermined duration has elapsed.

6. The system of claim 5, wherein the common geolocation includes a common region formed between a first geolocation from the first merchant and a second geolocation from the second merchant.

7. The system of claim 1, the operations comprising:

identifying a live event associated with the second geolocation;

accessing live event data related to the live event; and generating a live event media filter based on the live event data and the second geolocation.

8. The system of claim 1, the operations comprising:

accessing social network data based on social network information from second client device; and generating a social network media filter based on the social network data and the social network information from second client device.

9. The system of claim 1, the operations comprising:

generating a set of media filters including the media filter for a merchant for a predefined geolocation of the merchant, the predefined geolocation corresponding to the first geolocation;

randomly selecting the media filter from the set of media filters; and providing the media filter to the second client device, in response to the second geolocation corresponding to the predefined geolocation of the merchant.

10. The system of claim 1, the operations comprising:

storing previously provided media filters in a media filter collection associated with the second client device; and presenting media filters from the media filter collection associated with second client device in response to receiving a geolocation associated with the media filters.

11. The system of claim 1, the operations comprising:

generating a progressive use media filter for a predefined geolocation; and adjusting a content of the progressive use media filter in response to a number of prior uses of the progressive use media filter.

12. The system of claim 11, the operations comprising:

disabling the progressive use media filter after the number of prior uses of the progressive use media filter reaches a predefined progressive use limit.

13. The system of claim 1, the operations comprising:
generating a viral use media filter for a predefined geolocation;
providing the viral use media filter to a first client device located at the predefined geolocation;
receiving a request from the first client device located at the predefined geolocation to provide the viral use media filter to the second client device located outside the predefined geolocation; and
providing the viral use media filter to the second client device located outside the predefined geolocation.

14. The system of claim 1, the operations comprising:
executing a programmable function associated with an actionable area in response to detecting a selection of the actionable area from a user of second client device.

15. The system of claim 1, the operations comprising:
generating a graphical user interface for displaying a map, receiving a selection of boundaries in the map, and including a geographic region formed with the selection of boundaries in the first geolocation.

16. A method comprising:
receiving, from a first client device, a content item and a first geolocation, the first geolocation having been manually selected by a user of the first client device;
generating a media filter from the content item, the media filter associated with the first geolocation;
assigning a priority value to the media filter in association with the first geolocation, the priority value determining an order in which the media filter is presented relative to other media filters;
sending, to a second client device, identification of a plurality of filters comprising at least the media filter based at least in part on a second geolocation associated with the second client device, the plurality of filters for presenting on the second device based at least in part on the priority value assigned to the media filter in association with the first geolocation; and
receiving, from the second client device, a message comprising media content overlaid by the media filter.

17. A non-transitory computer-readable storage medium storing a set of instructions that, when executed by a processor of a machine, cause the machine to perform operations comprising:
receiving, from a first client device, a content item and a first geolocation, the first geolocation having been manually selected by a user of the first client device;
generating a media filter from the content item, the media filter associated with the first geolocation;
assigning a priority value to the media filter in association with the first geolocation, the priority value determining an order in which the media filter is presented relative to other media filters;
sending, to a second client device, identification of a plurality of filters comprising at least the media filter based at least in part on a second geolocation associated with the second client device, the plurality of filters for presenting on the second device based at least in part on the priority value assigned to the media filter in association with the first geolocation; and
receiving, from the second client device, a message comprising media content overlaid by the media filter.

18. The non-transitory computer-readable storage medium of claim 17, wherein the first geolocation is selected by the user of the first client device by a drawing input received via a graphic user interface of the first client device, the input drawing generating a geometric shape drawn on a map, and
wherein the second geolocation is determined by a global positioning system (GPS) measurement taken by the second client device.

* * * * *